United States Patent
Yamaoka et al.

(10) Patent No.: US 7,957,253 B2
(45) Date of Patent: Jun. 7, 2011

(54) MULTIPLE RECORDING LAYERS OPTICAL DISC HAVING PHYSICAL POSITION INFORMATION OF PRE-RECORDING MARKS

(75) Inventors: Masaru Yamaoka, Osaka (JP); Mamoru Shoji, Osaka (JP); Kenji Kondo, Osaka (JP); Keiji Nishikiori, Kyoto (JP)

(73) Assignee: Panasonic Corporation, Osaka (JP)

( * ) Notice: Subject to any disclaimer, the term of this patent is extended or adjusted under 35 U.S.C. 154(b) by 457 days.

(21) Appl. No.: 12/297,392

(22) PCT Filed: Apr. 16, 2007

(86) PCT No.: PCT/JP2007/058277
§ 371 (c)(1),
(2), (4) Date: Oct. 16, 2008

(87) PCT Pub. No.: WO2007/123083
PCT Pub. Date: Nov. 1, 2007

(65) Prior Publication Data
US 2009/0097376 A1    Apr. 16, 2009

(30) Foreign Application Priority Data
Apr. 18, 2006  (JP) ................................. 2006-114166

(51) Int. Cl.
*G11B 7/24* (2006.01)
(52) U.S. Cl. .................................. 369/275.4; 369/275.1
(58) Field of Classification Search .............. 369/275.4, 369/275.1, 275.3, 275.2, 84, 83; 428/64.1, 428/64.2, 64.4; 430/321, 320, 270.11, 270.13; 720/718
See application file for complete search history.

(56) References Cited

U.S. PATENT DOCUMENTS
2002/0048225 A1    4/2002   Shinoda
(Continued)

FOREIGN PATENT DOCUMENTS
JP        11-149642       6/1999
(Continued)

OTHER PUBLICATIONS
International Search Report issued Jul. 17, 2007in the International (PCT) Application No. PCT/JP2007/058277.

*Primary Examiner* — Tan X Dinh
(74) *Attorney, Agent, or Firm* — Wenderoth, Lind & Ponack, L.L.P.

(57) ABSTRACT

An optical disc (101) to and from which information can be reproduced and recorded by laser irradiation is provided with a first recording layer (102) and a second recording layer (104). The first recording layer (102) has a first recording mark (103) that is formed in a spiral track. The second recording layer (104) is behind or in front of the read-side surface of the first recording layer (102), and neither a wobble track nor a track for reproducing or recording information by laser irradiation is formed on the second recording layer (104). On the second recording layer (104) are formed, by laser irradiation, a second recording mark (105) that is positioned in the radial direction of the optical disc according to a predetermined position on the spiral track of the first recording layer. The optical disc (101) ensures the secrecy of the copyright protected information that is recorded thereto and the copyright protection function of the optical disc (101), and is resistant against illegal copying.

20 Claims, 31 Drawing Sheets

U.S. PATENT DOCUMENTS

2006/0203702 A1* 9/2006 Woerlee et al. ............ 369/275.3
2009/0175151 A1* 7/2009 Miyashita et al. ......... 369/275.3

FOREIGN PATENT DOCUMENTS

| | | |
|---|---|---|
| JP | 2000-113452 | 4/2000 |
| JP | 2002-15468 | 1/2002 |
| JP | 2003-67939 | 3/2003 |
| JP | 2003-217171 | 7/2003 |
| JP | 2006-107612 | 4/2006 |
| WO | 96/16401 | 5/1996 |

* cited by examiner

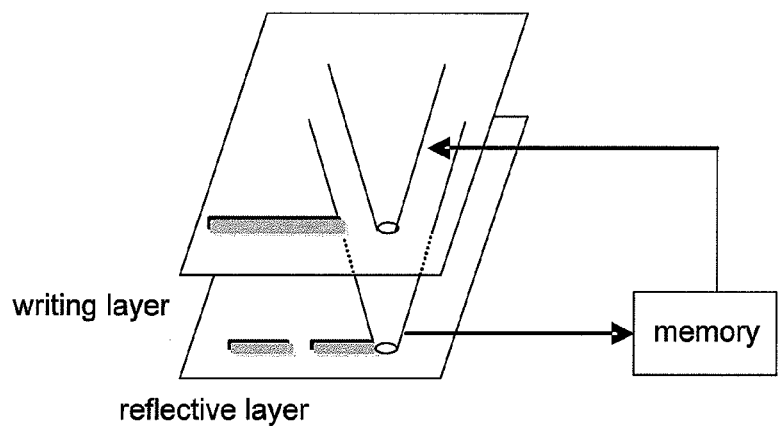
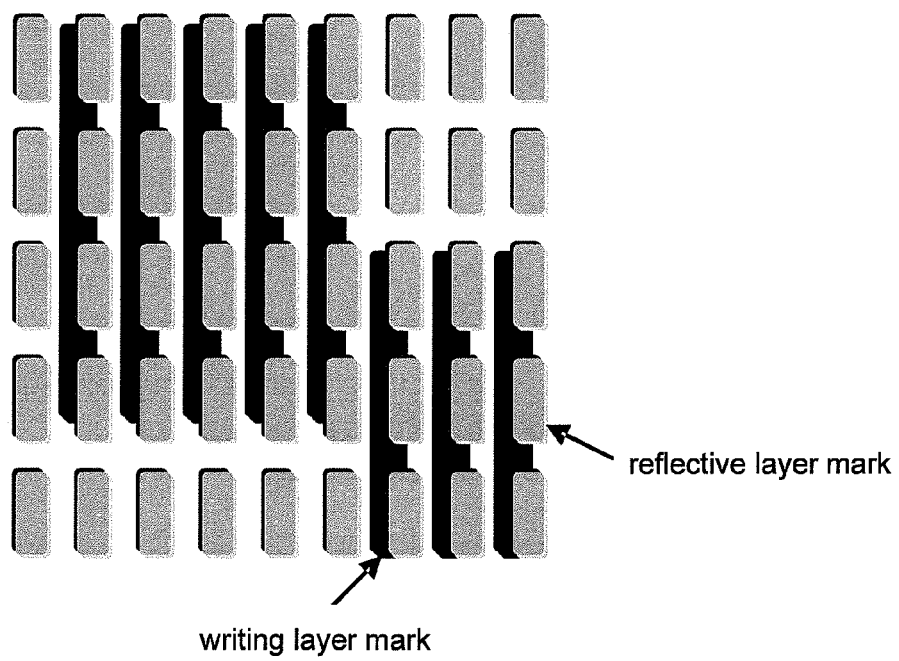
FIG. 29

MULTIPLE RECORDING LAYERS OPTICAL DISC HAVING PHYSICAL POSITION INFORMATION OF PRE-RECORDING MARKS

TECHNICAL FIELD

The present invention relates to optical discs, reproducing devices, recording devices, and manufacturing methods for the same, and integrated circuits for the same. In particular, it relates to optical discs that have information for copyright protection and that function (referred to hereinafter as copyright protection information and copyright protection function), devices for reproducing the same, devices for recording the same, methods for manufacturing the same, and integrated circuits for the same.

BACKGROUND ART

At the present moment, there has been remarkable growth in the memory capacity of optical discs. In particular, Blu-ray discs, which are recorded and reproduced using a blue laser, can achieve tremendously large memory capacities on the order of 25 G bytes for single layered and 50 G bytes for double layered discs, allowing more than four hours of high-quality, high-definition video to be recorded. This increase in capacity per disc is expected to affect not only video content but also music, games, and various other applications as well.

As the memory capacity increases, however, the value of the copyrighted material that is contained on the disc increases as well. Copyright protection of the digital copyrighted material that is recorded is one matter that becomes an issue here.

The conventional approach for copyrighted material that is stored on an optical disc is to record the copyrighted material in an encoded form in order to preclude illegal use of the copyrighted material. Such encoding technology, however, is applicable only when the key remains secret, and the copyright of the copyrighted material cannot be protected once the key information is leaked. The key information thus must be strictly guarded.

With optical discs, the encoded copyrighted material and the key information are recorded onto the disc together. It was thus possible to make illegal copies of the copyrighted material by making an analog copy of the reproduced signal, which is obtained by reproducing the optical disc, by copying it to a master disc as is, or by stripping off, for example, the protective film to expose the recording surface and then copying that recording surface.

At the present time, such illegal copying techniques have hurt the distribution of ordinary copyrighted material on CD and DVD, resulting in significant loss.

One method that has been proposed in light of these issues is the method of trimming a part of the disc reflective layer by irradiating a laser so as to mark each disc individually, and then determining whether or not a disc is a normal disc or an illegally copied disc by confirming the location of this mark (for example, Patent Citation 1). This method allows a mark to be added as separate information to each disc individually, even read-only optical discs that are fabricated by stamping. Although the marks and space columns that are recorded as primary information in a track of the optical disc can be copied to a master disk based on the reproduction signals that are reproduced by tracking the marks and spaces as they are, after disc molding it is extremely difficult to produce a mark by trimming the reflective film at the same position as the optical disc serving as the copy source, and normally there are discrepancies with that marking on the copy source. The present invention allows shifting in the position of the marking to be detected in order to determine whether the disk is a normal disc or an illegal disc.

Another technology that has been proposed involves utilizing changes in the refractive index, changes in the extinction coefficient, changes in the light transmissibility, or changes in the reflectance of a light-transmissible recording member, such as the substrate or protective film, of the optical disc in order to write distinct information to the disc after molding (for example, see Patent Citation 2). This approach involves providing a marking based on changes in the optical constant of the light-transmissible substrate or the protective film when irradiated by an electron beam or ultraviolet radiation. The reproducing device can detect this mark by confirming a sudden change in the reflected light when the reflective film of the disc is irradiated with the reproducing laser. In other words, the mark can be detected as an intensity of the reflected light of the reproducing laser because the optical properties of the light-transmissible substrate are changed. Further, providing the marking by action on the light-transmissible substrate makes the disc resistant against the illegal act of stripping off and copying its recording face.

Another approach that has been proposed involves forming the reflective film of a write-once optical disc as the reflective film of a read-only disc, and then, after disc molding, recording disc-specific information such as key information with a write-once optical disc recording device (for example, Patent Citation 3). With write-once optical discs, the change in the reflectance of the recording film is utilized to record information by irradiating a recording laser. Thus, such discs are resistant against illegal copying in which the protective film is stripped off and then the recording layer is exposed and copied. An added benefit is that because conventional write-once optical disc recording devices can be used, a special device for recording disc-specific information is not required.

Patent Citation 1: International Patent Publication Pamphlet No. 96/016401

Patent Citation 2: Japanese Laid-Open Patent Publication No. 2002-15468

Patent Citation 3: Japanese Laid-Open Patent Publication No. 2000-113452

DISCLOSURE OF INVENTION

Technical Problem

With regard to the method of providing marks by trimming the reflective film, it is difficult to fabricate the marks with the same positional accuracy as the original, and although this method allows illegal discs to be distinguished easily, it lowers the fidelity with which the primary information is reproduced. Ordinarily, loss of primary information due to a trimming mark can be compensated for by error correction coding; however, the recording of a trimming mark undeniably reduces the reproduction margin of the primary information. A special recording device for trimming the reflective film is required as well.

Further, depending on the properties of the optical disc, it is difficult to say whether or not this method provides sufficient resistance against illegal copying, such as analog copying in which an optical disc master is produced from the reproduction signal. This is because with optical discs in which the reflected light intensity (degree of modulation) of the marks and spaces formed in the recording layer of the optical disc is comparable to the reflected light intensity of sections formed by laser trimming, it is possible for the marks that are formed by trimming the recording film to be recorded as an ordinary mark or space. The presence of marks that are produced by trimming the reflective layer can be clearly determined by viewing the recording layer surface with an electron microscope or by confirming the reproduction waveform, and the marks may become the target of illegal decoding by those with ill intentions.

The marks that are formed by changes in the optical constant of the light-transmissible substrate also affect the reflected light from the reproducing laser that is irradiated, and thus lower the precision with which the primary information is read. When the reproduction signal that is obtained from the reflected light of the irradiated reproducing laser is confirmed, then there is a possibility that its presence will be clearly identified and similarly become a target for illegal decoding. Further, a special recording device is necessary in order to record information to a light-transmissible substrate.

The method of forming a reflective film for writing onto an optical disc substrate that has an uneven shape consisting of marks and spaces, and then, after forming the disc, recording key information to the disc with a write-once optical disc recording device has the following problem. If, for example, the recording layer is exposed and copied, and then the reflective film of a write-once disc is formed and the key information is read from a normal disc and similarly recorded with a recording device for write-once optical discs, such discs can be copied easily. Copies also can be easily produced by making so-called analog copies, in which the reproduction signal that is obtained by irradiating with the reproduction laser is used to copy the marks and spaces to a master disc as they are unchanged.

Technical Solution

The present invention was achieved in light of the foregoing issues, and it provides an optical disc, and a reproducing device, a recording device, and a manufacturing method for the same, and an integrated circuit for reproducing and recording to the same, with an excellent ability to conceal the copyright protected information that is recorded to the optical disc and the copyright protection function of the disc, as well as superb resistance against illegal copying of the optical disc. The detailed means thereof are illustrated below.

An optical disc according to the invention is an optical disc to and from which information can be reproduced and recorded by laser irradiation, and is provided with a first recording layer and a second recording layer. The first recording layer has a first recording mark that is formed in a spiral track. The second recording layer is behind or in front of a read-side surface of the first recording layer, and has neither a wobble track nor a track for reproducing or recording information by laser irradiation, and the second recording layer can be formed with, by laser irradiation, a second recording mark that is positioned in the radial direction of the optical disc according to a predetermined position on the spiral track of the first recording layer.

A separate optical disc according to the invention is an optical disc to and from which information can be reproduced and recorded by laser irradiation, and is provided with a first recording layer and a second recording layer. The first recording layer has a first recording mark that is formed in a spiral track. The second recording layer is behind or in front of a read-side surface of the first recording layer, and has neither a wobble track nor a track for reproducing or recording information by laser irradiation, and the second recording layer can be recorded to by laser irradiation and has a second recording mark that is positioned in the radial direction of the optical disc, according to a predetermined position on the spiral track of the first recording layer.

With these, a recording mark is formed in the second recording layer which has neither a wobble track nor a track for reproducing or recording information, at substantially the same radial position as the position of the track in the first recording layer. Thus, it is possible to conceal copyright protected information and the copyright protection function of the optical disc, and to increase resistance against illegal copying of the optical disc.

Further, the first recording mark of the first recording layer is recorded after adding synchronization code thereto at a predetermined interval, and the second recording mark of the second recording layer is recorded in synchronization with the predetermined interval at which the synchronization code is added to the first recording layer.

Thus, because a recording mark is recorded to the second recording layer in synchronization with the synchronization code of the first recording layer, it is not necessary to add special synchronization code to the recording mark of the second recording layer.

Further, the first recording mark of the first recording layer is recorded after adding synchronization code to them at a predetermined interval, the second recording mark of the second recording layer includes identification information for the optical disc and made from a plurality of bits, and the identification information is recorded at least one bit at a time in synchronization with the predetermined interval at which the synchronization code of the first recording layer is added.

Thus, it is possible to record identification information having a plurality of bits.

Further, the second recording mark of the second recording layer includes identification information for the optical disc, and the identification information is recorded repeatedly in a plurality of regions of the second recording layer.

Thus, the identification information can be stably reproduced even if the disc has defects like scratches.

Further, the second recording mark of the recording layer includes information that is recorded after being subjected to spectrum diffusion.

Thus, it is possible to protect the recording mark of the second recording layer from being decoded based on their frequency.

Further, the first recording layer has address information and identification information for the optical disc, and the identification information is information that has been subjected to spectrum diffusion with a pseudo-random number sequence that was created based on the address information.

Thus, back analysis becomes more difficult.

Further, the second recording mark of the second recording layer is recorded with a different modulation mode than the first recording mark of the first recording layer.

That modulation mode is PE modulation.

Thus, the second recording mark can be kept from affecting the precision of reproduction of the first recording mark of the first recording layer.

Further, the second recording mark of the second recording layer is recorded in synchronization with a PLL clock that is obtained by reproducing the first recording mark of the first recording layer.

Thus, the second recording layer does not have a track and has a recording mark only intermittently, and can be reproduced based on the positional relationship with the first recording mark of the first recording layer.

Further, the width in the radial direction of the second recording mark of the second recording layer is larger than a width in the radial direction of the first recording mark of the first recording layer.

Thus, it is possible to use a low-cost, long-wavelength laser as the light source for recording the second recording mark of the second recording layer, and the recording mark of the second recording layer can be detected with increased precision.

Further, the width in the radial direction of the second recording mark of the second recording layer is smaller than a width in the radial direction of the first recording mark of the first recording layer.

Thus, the secrecy of the second recording mark of the second recording layer can be increased, and the recording region for recording a mark of the second recording layer is reduced and thus the amount of time required for detection of the recording mark can be shortened.

Further, the width in the radial direction of the second recording mark of the second recording layer is larger than the track pitch of the first recording mark of the first recording layer.

Thus, it is possible to use a low-cost, long-wavelength laser as the light source for recording the second recording mark of the second recording layer, and the recording mark of the second recording layer can be detected with increased precision.

Further, the width in the radial direction of the second recording mark of the second recording layer is smaller than the track pitch of the first recording mark of the first recording layer.

Thus, the secrecy of the second recording mark of the second recording layer can be increased, and the recording region for recording a mark of the second recording layer is reduced and thus the amount of time required for detection of the recording mark can be shortened.

Further, the track of the second recording mark of the second recording layer is always at the same radial position as the track of the first recording mark of the first recording layer.

Further, the second recording mark of the second recording layer is formed only at a radial position that corresponds to a position of a region of the first recording layer in which control data have been recorded.

Thus, when the optical disc is started, control data are reproduced from the first recording mark of the first recording layer, and at the same time it is also possible to reproduce the second recording mark of the second recording layer from the change in the reflectance of that reproduction signal. Even if the recording mark of the second recording layer is applied, it is not necessary to provide special time for reproducing these, and the startup time, for example, is not increased.

Further, the period in which the second recording mark of the second recording layer is recorded is three or more times a period in which the first recording mark of the first recording layer with a space therebetween is recorded.

Further, the period in which the second recording mark of the second recording layer is recorded is an integer multiple of a period in which the first recording mark of the first recording layer is recorded.

Further, the second recording mark of the second recording layer is longer than the longest mark length of the first recording mark of the first recording layer.

Further, the second recording mark of the second recording layer is three or more times longer than the longest mark length of the first recording mark of the first recording layer.

These allow the resistance against illegal copying of the optical disc to be increased.

Further, the second recording mark of the second recording layer is created based on a signal that is modulated at a frequency outside a tracking band for central position control of a signal reproduced from the first recording mark of the first recording layer.

Thus, the second recording mark can be kept from affecting the precision of reproduction of the recording mark of the first recording layer.

Further, the first recording mark of the first recording layer is content information that has been encoded, and the second recording mark of the second recording layer records a decoding key.

Further, the first recording mark of the first recording layer is content information that has been encoded, and the second recording mark of the second recording layer is authentication information of the optical disc.

Thus, it is possible to prevent illegal tampering of the identification information of the optical disc and illegal recording of its physical position information.

Further, the second recording layer has a marking region in which a pre-recording mark that is long in the radial direction is formed, on an inner circumferential side or an outer circumferential side from the region in which the second recording mark is formed, the second recording mark of the second recording layer includes physical position information for the pre-recording mark, and the physical position information is information on a distance or an angle of the pre-recording mark of the second recording layer, with respect to a fixed position of the first recording mark of the first recording layer.

Thus, the physical position information of the marking of the second recording layer can be recorded as information pertaining to the length or the angle with respect to the first recording mark of the first recording layer.

Further, the length of the pre-recording mark in the radial direction is larger than the width of the track of the first recording layer.

Thus, the marking of the second recording layer can be formed as a recording mark that are long in the radial direction of the disk.

Further, the first recording mark of the first recording layer includes address information for each predetermined interval, and the physical position information is recorded in association with the position of the address information of the first recording mark of the first recording layer.

Thus, the physical position information of the markings of the second recording layer can be detected at a unique address position for each disc.

Further, the physical position information is recorded encoded or a digital signature is added thereto.

Thus, the physical position information cannot be illegally tampered and illegal information cannot be recorded.

Further, if M is a distance between the first recording layer and the second recording layer, $\lambda$ is a wavelength of a laser light that is emitted when recording the first recording mark, and NA is a numerical aperture of a light system that emits the laser light, then M is equal to or less than $\lambda/(NA^2)$.

Thus, the second recording mark of the second recording layer can be more simply and accurately recorded.

An optical disc reproducing device of the invention is a reproducing device for an optical disc that has a first recording layer on which a spiral track is formed by a first recording mark, and a second recording layer that is behind or in front of a read-side surface of the first recording layer and on which a second recording mark that includes identification information of the optical disc is formed, and the optical disc reproducing device is provided with a focus portion, a tracking portion, a reproduction signal extraction portion, a first reproduction portion, and a second reproduction portion. The focus portion controls a focal position of the laser that irradiates the first recording layer. The tracking portion controls the laser irradiation spot based on the track of the first recording layer. The reproduction signal extraction portion causes irradiates the optical disc with a laser based on the focus portion and the tracking portion, and extracts a reproduction signal from the light that is reflected from the laser irradiation. The first reproduction portion reproduces the first recording mark of the first recording layer, based on a first amplitude component of the reproduction signal. The second reproduction portion reproduces the second recording mark of the second recording layer from a second amplitude component, which is smaller than the first amplitude component, of the reproduction signal, and extracts the identification information.

Thus, the second recording mark, which is recorded to the second recording layer at substantially the same radial position as the radial position of the track of the first recording layer, can be detected by the second amplitude component when the first recording layer is reproduced. Consequently, it is possible to faithfully extract the identification information of the optical disc while concealing the copyright protected information and the copyright protection function on the optical disc.

Further, the second recording layer of the optical disc has a marking region in which a pre-recording mark that is long in the radial direction is recorded, and the identification information includes first physical position information that indicates a physical position of the pre-recording mark as recorded, with respect to a fixed position of the first recording mark of the first recording layer. The reproducing device further includes a physical position information extraction portion that extracts second physical position information that indicates a physical position of the pre-recording mark as reproduced, with respect to a fixed position of the first recording mark of the first recording layer, a comparing and verifying portion that compares and verifies the first physical position information and the second physical position information, and a reproduction stopping portion that stops the reproduction operation based on the results of the comparing and verifying portion.

Thus, it is possible to compare the physical position information when recording and the physical position information when reproducing, and to determine whether or not the disc has been copied illegally.

The reproducing device further includes a focal position movement portion that moves the focal position from the first recording layer to the second recording layer, and a focus storage portion that stores focus control information of the second recording layer, after the focal position has been moved. The physical position information extraction portion extracts the second physical position information based on the focus control information that is stored in the focus storage portion after the focal position has been moved.

Thus, the focal position on the second recording layer is stored in advance and the focal position can be moved from the first recording layer to the second recording layer according to the focal position that has been stored to extract the physical position information of the second recording layer, thus allowing the time for moving the focal position to the second recording layer to be significantly shortened.

The reproducing device further includes an address extraction portion that extracts address information that has been added at a predetermined interval of the first recording mark of the first recording layer. The address extraction portion extracts a target address for extracting the second physical position information. The physical position information extraction portion extracts information pertaining to a distance or an angle from a sector position of the first recording layer at the target address up to the pre-recording mark of the second recording layer, as the second physical position information. The comparing and verifying portion compares and verifies the first physical position information, which is information on the distance or the angle when recording the pre-recording mark, and the second physical position information that has been extracted by the physical position information extraction portion, which is information on the distance or the angle when reproducing the pre-recording mark. The reproduction stopping portion stops the reproduction operation if the comparing and verifying portion determines that they do not match one another.

Thus, it is possible to obtain information pertaining to the distance or the angle of the markings of the second recording layer with respect to the recording mark of the first recording layer, as the physical position information.

Further, the second reproduction portion includes a synchronization code detection portion that detects synchronization code from the first recording mark of the first recording layer, and a correlation sequence creation portion that creates a correlation sequence in synchronization with a timing at which the synchronization code is detected, and the second reproduction portion extracts the identification information based on a correlation computation of the correlation sequence and the second amplitude component.

Thus, it is possible to reproduce the recording mark of the second recording layer using the synchronization code that is recorded to the first recording layer.

Further, the second reproduction portion also includes a PE modulation portion that applies PE modulation to the correlation sequence, and the second reproduction portion extracts the identification information based on a correlation computation of the PE-modulated correlation sequence and the second amplitude component.

The reproducing device further includes a decoding portion that decodes the identification information that has been recorded encoded, and a reproduction stopping portion that stops the reproduction operation based on the results of the decoding portion.

The reproducing device further includes a signature verification portion that verifies a digital signal of the identification information that is recorded after adding a digital signature, and a reproduction stopping portion that stops the reproduction operation based on the results of the signal verification portion.

An optical disc recording device of the invention is a recording device for an optical disc that has a first recording layer on which a spiral track is formed by a first recording mark, and a second recording layer that is behind or in front of a read-side surface of the first recording layer and on which a recording mark can be formed by laser irradiation, and the recording device is provided with a focus portion, a tracking portion, and an identification information recording portion. The focus portion controls a focal position of a laser that irradiates the first recording layer. The tracking portion controls a radial position of laser irradiation according to the track of the first recording layer. The identification information recording portion records identification information for the optical disc by forming a second recording mark on the second recording layer, based on the control by the tracking portion.

Thus, it is possible to form a recording mark in the second recording layer, in which neither a wobble track nor a track for reproducing or recording information is formed, at substantially the same radial position as the track position of the first recording layer. Consequently, the copyright protected information on the optical disc and its copyright protection function can be kept secret, and resistance against illegal copying of the optical disc can be increased.

The optical disc recording device further includes a marking portion that records a pre-recording mark in the second recording layer, and a position information extraction portion that extracts physical position information, with respect to a fixed position of the first recording mark of the first recording layer, of the pre-recording mark, and the identification information includes the physical position information.

Thus, it is possible to provide a mark in the second recording layer and extract the physical position information of the mark in reference to the first recording mark of the first recording layer, and then record that physical position information as a recording mark in the second recording layer.

Further, the marking portion records a pre-recording mark to the second recording layer of the optical disc through CAV (Constant Angular Velocity)-type rotation control, and the pre-recording mark is recorded such that in the radial direction of the optical disc, the pre-recording mark is equal to or greater than a width of the track of the first recording mark of the first recording layer.

Thus, it is possible to form recording mark that is long in the radial direction of the disc as the marking of the second recording layer.

The optical disc recording device further includes an address extraction portion that extracts address information from the first recording mark of the first recording layer. The position information extraction portion extracts information pertaining to a distance or an angle of the pre-recording mark of the second recording layer, with respect to the fixed position of the first recording layer, based on the address information that is extracted.

Thus, it is possible to extract information that pertains to the distance or angle in reference to the recording mark of the first recording layer, as the physical position information.

The optical disc recording device is further provided with an address extraction portion that extracts address information from the first recording mark of the first recording layer, and the physical position information is information that correlates the address information and the fixed position of the first recording layer.

Thus, it is possible to detect the marking position of the second recording layer from a disc-specific address location.

The optical disc recording device further includes a focus movement portion that moves focus control from the first recording layer to the second recording layer, and a focus storage portion that stores the result of the focus control to the second recording layer. The position information extraction portion extracts the physical position information of the pre-recording mark based on the focus control result that is stored in the focus storage portion.

Thus, the focal position of the second recording layer is stored in advance, and it is possible to significantly shorten the time for moving the focal position from the first recording layer to the second recording layer in order to detect the physical position information of the marking of the second recording layer.

The tracking portion further includes a tracking storage portion that performs tracking control in accordance with the first recording mark of the first recording layer, and stores tracking control information that is extracted through the tracking control. The identification information recording portion records identification information to the second recording layer by performing control of the position of laser irradiation based on the tracking control information that is stored in the tracking storage portion.

Thus, it is possible to form the recording mark in the second recording layer at substantially the same radial position as the track of the first recording layer.

The optical disc recording device further includes a focus movement portion that moves the focal position from the first recording layer to the second recording layer, and a focus storage portion that stores the focus control information of the second recording layer, after the focus movement portion has completed movement of the focal position from the first recording layer to the second recording layer. The identification information recording portion moves focus control from the first recording layer to the second recording layer based on the focus control information that is stored in the focus storage portion, and records identification information to the second recording layer.

Thus, it is possible to significantly shorten the time for moving the focal position from the first recording layer to the second recording layer for forming a recording mark to the second recording layer.

The first recording layer is a recording layer that is made from a read-only recording film, and the identification information recording portion records the identification information to the second recording layer by performing laser irradiation with the focus on the first recording layer and with the focal position off-focus with respect to the second recording layer by the focus portion.

Thus, it is possible to reproduce the first recording layer, as well as form a second recording mark in the second recording layer at the same radial position as the track of the first recording layer with a defocused recording laser emission that is shifted off of the focal position.

Further, the first recording mark of the first recording layer is recorded after synchronization code is added thereto at a predetermined interval, and the identification information recording portion records the identification information at least one bit at a time at the predetermined interval, so as to synchronize with the predetermined interval at which the synchronization code is added to the first recording mark.

Thus, a recording mark can be formed in the second recording layer in synchronization with the synchronization code that is recorded to the first recording layer, and thus the recording mark of the second recording layer does not require a special synchronization code.

Further, the identification information is repeatedly recorded in a plurality of regions of the second recording layer.

Thus, the identification information can be stably reproduced even if the disc has defects like scratches.

The optical disc recording device further includes an encoding portion that performs an encoding of the identification information, and the identification information recording portion records the identification information that has been encoded by the encoding portion.

The optical disc recording device further includes a signature creation portion that creates a digital signature of the identification information, and the identification information recording portion records the identification information to which the signature creation portion has added a digital signature.

Thus, it is possible to prevent illegal tampering of the identification information that is recorded.

The optical disc recording device further includes a synchronization code detection portion that detects synchronization code that is added to the first recording mark of the first recording layer, a pseudo-random number sequence generation portion that generates a pseudo-random number sequence in synchronization with the timing at which the synchronization code is detected, and a spectrum diffusion portion that performs spectrum diffusion on the identification information based on the pseudo-random number sequence. The identification information recording portion records the identification information that has been subjected to spectrum diffusion.

Thus, the second recording mark that is recorded to the second recording layer is recorded after being subjected to spectrum diffusion, and therefore it is possible to prevent frequency analysis with the intent of misuse.

The optical disc recording device further includes a PE modulation portion that executes PE modulation on the identification information that has been subjected to spectrum diffusion, and the identification information recording portion records the identification information that has been subjected to spectrum diffusion and PE modulation.

Thus, with PE modulation, the section in which the degree of modulation changes when the first recording layer is reproduced, and the section in which it does not change, become the same length, and the center position of the reproduction signal when the first recording mark of the first recording layer is reproduced does not change, and therefore there is no effect on the precision of reproduction of the first recording layer.

In the optical disc recording device, the identification information recording portion is disposed in at least the same head as a head that tracks the first recording mark of the first recording layer.

Thus, it is possible to easily, and at low cost, introduce a device that forms an optical disc with a structure that conceals the copyright protected information or the copyright protection function on the disc, and that has increased resistance against illegal copying of the optical disc.

In the optical disc recording device, if M is a distance between the first recording layer and the second recording layer of the optical disc, λ is a wavelength of a laser light that is emitted when recording the first recording mark, and NA is a numerical aperture of a light system that emits the laser light, then M is equal to or less than $\lambda/(NA^2)$.

Thus, the second recording mark of the second recording layer can be more simply and accurately recorded.

An optical disc manufacturing method of the invention has a mastering step, a first recording layer creation step, a second recording layer creation step, a tracking step, and an identification information recording step. The mastering step involves creating a stamper for an optical disc in which a first recording mark is formed, producing a spiral track structure. The first recording layer creation step involves forming a first recording layer by adding a reflective film to a substrate of the optical disc after stamping with the stamper. The second recording layer creation step involves forming a second recording layer, either in front of or behind the first recording layer from the direction of stamping by the stamper, that is furnished with a recording film to which a recording mark can be formed by laser irradiation. The tracking step involves performing tracking control that is in accordance with the first recording mark of the first recording layer. The identification information recording step involves recording the identification information of the optical disc by forming a second recording mark in the second recording layer, based on the tracking control of the tracking step.

Thus, it is possible to form a recording mark in the second recording layer, in which neither a wobble track nor a track for reproducing or recording information is formed, at substantially the same radial position as the track position of the first recording layer. Consequently, the copyright protected information on the optical disc and its copyright protection function can be kept secret, and resistance against illegal copying of the optical disc can be increased.

The optical disc manufacturing method of the invention further includes a marking step and a position information extraction step. The marking step involves recording a pre-recording mark to the second recording layer, prior to recording the identification information in the identification information recording step. The position information extraction step involves extracting physical position information, with reference to a fixed position of the first recording mark of the first recording layer, of the pre-recording mark that is recorded to the second recording layer in the marking step. The identification information is recorded to include the physical position information.

Thus, after providing a mark in the second recording layer, the physical position of the marking of the second recording layer is extracted in reference to the recording mark of the first recording layer. Thus, the physical position information becomes a value that is unique for that disc, and it is necessary to align positions of the first recording mark of the first recording layer and the second recording mark of the of the second recording layer, and thus can be recorded as information that in practice cannot be copied.

Further, the marking step records the pre-recording mark to the second recording layer by performing rotation control of the optical disc through CAV (Constant Angular Velocity) control, and the pre-recording mark is recorded at a width that, in the radial direction of the optical disc, is equal to or greater than a track width of the first recording mark of the first recording layer.

Thus, the marking of the second recording layer can be formed as a recording mark that is long in the radial direction of the disc, and thus if the laser irradiation spot is moved from the first recording layer to the second recording layer, then it is possible to detect the marking position of the second recording layer with ease, even if there is some disparity in the spot position in the radial direction.

The optical disc manufacturing method further includes a focus movement step of moving focus control from the first recording layer to the second recording layer, and a focus storage step of storing the result of focus control on the second recording layer, after the focus control has been moved from the first recording layer to the second recording layer. The position information extraction step involves extraction of the physical position information of the pre-recording mark of the second recording layer, with respect to the fixed position of the first recording mark of the first recording layer, by moving the focus control from the first recording layer to the second recording layer based on the focus control result that is stored in the focus storage step.

Thus, moving the focal position ordinarily requires about several dozen milliseconds in the case of a Blu-ray disc, for example, but it is possible to use the focal position of the second recording layer that was recorded in advance if the focal position is to be moved from the first recording layer to the second recording layer, and thus the movement time can be significantly shortened.

The optical disc manufacturing method further includes an address extraction step of extracting address information from the first recording mark of the first recording layer. The position information extraction step involves extraction of information pertaining to a distance or an angle of the pre-recording mark of the second recording layer with respect to the fixed position of the first recording layer, based on the address information that is extracted in the address extraction step.

Thus, the physical position information is stored as information on the distance or angle that is disc specific.

The optical disc manufacturing method further includes an address extraction step of extracting address information from the first recording mark of the first recording layer. The physical position information is information that is correlated to the address information of the first recording layer that is extracted by the address extraction step.

Thus, the physical position information can be obtained from address information that is disc specific.

Further, the tracking step includes a tracking storage step of performing tracking control in accordance with the first recording mark of the first recording layer, and storing tracking control information that is extracted through the tracking control. The identification information recording step records identification information to the second recording layer by controlling a laser irradiation position based on the tracking control information that is stored in the tracking storage step.

Thus, the second recording mark is formed in the second recording layer based on the tracking position of the first recording layer, and thus it is possible to form a recording mark in the second recording layer at substantially the same radial position as the track of the first recording layer.

The optical disc manufacturing method further includes a focus movement step of moving the focal position from the first recording layer to the second recording layer, and a focus storage step of storing the focus control information of the second recording layer, after the focal position is moved from the first recording layer to the second recording layer in the focus movement step. The identification information recording step records the identification information to the second recording layer by moving the focal position from the first recording layer to the second recording layer based on the focus control information that is stored in the focus storage step.

Thus, the second focal position is stored in advance, and the focal position is moved from the first recording layer to the second recording layer at the stored focal position, and thus the movement time can be significantly shortened.

The optical disc manufacturing method further includes a focus step of focusing the laser irradiation onto the first recording layer. The identification information recording step records the identification information by laser irradiation which is focused on the first recording layer and is off-focus with respect to the second recording layer in the focus step. The first recording layer is a recording layer that is made from a read-only recording film.

Thus, it is possible to form the second recording mark in the second recording layer at substantially the same radial position as the track of the first recording layer.

Further, the first recording mark of the first recording layer is recorded after synchronization code is added thereto at a predetermined interval, and the identification information is recorded at least one bit at a time in synchronization with the predetermined interval.

Thus, the synchronization code of the first recording layer can be used to add a recording mark to the second recording layer, and thus the recording mark that is recorded to the second recording layer does not require a special synchronization code.

Further, in the identification information recording step, the identification information is repeatedly recorded in a plurality of regions of the second recording layer.

Thus, the identification information can be stably reproduced even if the disc has defects such as scratches.

The optical disc manufacturing method further includes an encoding step of performing an encoding of the identification information, and in the identification information recording step, the identification information that has been encoded in the encoding step is recorded.

The optical disc manufacturing method further includes a signature creation step of creating a digital signature of the identification information, and in the identification information recording step, the identification information to which the digital signature has been added in the signature creation step is recorded.

Thus, it is possible to prevent the identification information from being tampered with or the creation of illegal identification information.

The optical disc manufacturing method further includes a spectrum diffusion step of executing spectrum diffusion on the identification information, and, in the identification information recording step, the identification information that has been subjected to spectrum diffusion in the spectrum diffusion step is recorded.

Thus, with spectrum diffusion, it is possible to prevent the recording mark of the second recording layer from being decoded in terms of frequency.

The optical disc manufacturing method further includes a PE modulation step of executing PE modulation on the identification information, and, in the identification information recording step, the identification information that has been subjected to PE modulation in the PE modulation step is recorded.

Thus, with the second recording mark of the second recording layer, the precision of reproduction of the first recording layer can be prevented from becoming worse.

Further, in the second recording layer creation step, if M is a distance between the first recording layer and the second recording layer, $\lambda$ is a wavelength of a laser light that is emitted when recording the first recording mark, and NA is a numerical aperture of a light system that emits the laser light, then the second recording layer is formed such that M is equal to or less than $\lambda/(NA^2)$.

Thus, the second recording mark of the second recording layer can be more simply and accurately recorded.

Further, in the identification information recording step, the second recording mark of the second recording layer is recorded by the same head as a head for tracking the first recording mark of the first recording layer.

Thus, the second recording mark of the second recording layer can be more simply and accurately recorded.

An integrated circuit of the invention is an integrated circuit that performs reproduction of an optical disc that has a first recording layer on which a spiral track is formed by a first recording mark, and a second recording layer that is behind or in front of a read-side surface of the first recording layer and on which a second recording mark that includes identification information of the optical disc is formed, and the integrated circuit is provided with a focus portion, a tracking portion, a reproduction signal extraction portion, a first reproduction portion, and a second reproduction portion. The focus portion controls a focal position of the laser that irradiates the first recording layer. The tracking portion controls the laser irradiation position based on the track of the first recording layer. The reproduction signal extraction portion effects laser irradiation onto the optical disc based on the focus portion and the tracking portion, and extracts a reproduction signal from the light that is reflected from the laser irradiation. The first reproduction portion reproduces the first recording mark of the first recording layer, based on a first amplitude component of the reproduction signal. The second reproduction portion reproduces the second recording mark of the second recording layer from a second amplitude component, which is smaller than the first amplitude component, of the reproduction signal, and extracts the identification information.

Thus, it is possible to faithfully extract the identification information of the optical disc while concealing the copyright protected information and the copyright protection function on the optical disc.

Another integrated circuit of the invention is an integrated circuit that performs recording of an optical disc that has a first recording layer on which a spiral track is formed by a first recording mark, and a second recording layer that is behind or in front of a read-side surface of the first recording layer and on which a recording mark can be formed by laser irradiation, and the integrated circuit is provided with a focus portion, a tracking portion, and an identification information recording portion. The focus portion controls a focal position of laser irradiation onto the first recording layer. The tracking portion controls a radial position of the laser irradiation according to the track of the first recording layer. The identification information recording portion records identification information for the optical disc by forming the second recording mark on the second recording layer, based on the control by the tracking portion.

Thus, it is possible to form a recording mark in the second recording layer, in which neither a wobble track nor a track for reproducing or recording information is formed, at substantially the same radial position as the radial position of the track of the first recording layer. Consequently, it is possible to conceal the copyright protected information and the copyright protection function on the optical disc, as well as increase resistance against illegally copying of the optical disc.

ADVANTAGEOUS EFFECTS

With the optical disc, the manufacturing method, recording device, and reproducing device for the same, and the integrated circuit for the same, it is possible to provide an optical disc recorded with identification information in which a recording mark is formed in the second recording layer of the optical disc, which has a first recording layer and a second recording layer, at substantially the same position as the track position of the first recording layer.

Thus, it is not possible to perform tracking control onto the second recording mark and copy it if the second recording mark is recorded at a frequency that is outside of the normal tracking control band.

Further, even if a frequency that is outside of tracking by the servo is not used, it is still necessary to switch the focal position from the first recording layer within the range of one track of the second recording layer, and thus in practical terms it is difficult to track onto the second recording mark and therefore the recording mark of the second recording layer cannot be copied.

Since the recording mark of the second recording layer is reproduced after a minute change in the modulation when reproducing the first recording layer, if this minute change in the first modulation is kept within the range of error ordinarily possible for the modulation, then not only can the recording mark not be copied, but also can it be treated as invisible information that cannot even be discovered by signal analysis.

If the optical disc, and the manufacturing method, recording device, and reproducing device for the same, according to the invention are adopted, then a recording mark that is long in the radial direction is formed in the marking region of the second recording layer, and the physical position information of the mark is extracted in reference to the recording mark or a guide groove of the first recording layer and can be recorded to the wobble region of the second recording layer or recorded to the second recording layer at substantially the same radial position as that of the first track.

The physical position information of the mark is detected in reference to the recording mark or a guide groove of the first recording layer, and thus even if an attempt is made to illegally copy the disc, it is necessary to align the recording mark or guide groove of the first recording layer with the marking position of the second recording layer, and in practical terms it is extremely difficult to replicate these positional relationships.

The physical position information of the marking that is detected during recording is recorded after being encoded, having a digital signature added to them, or after being subjected to spectrum diffusion, and thus it is not possible to tamper with this physical position information detected during recording.

Thus, by adopting the present invention, it is possible to provide an optical disc that cannot be copied illegally, and also, information that is unique for each optical disc can be recorded after the optical disc is formed even if it is an optical disc with a read-only first recording layer, and the optical disc can be adopted for a network or copyright management system that requires management for each disc.

BRIEF DESCRIPTION OF DRAWINGS

FIG. 29 is a conceptual diagram of the pre-mark position recording device according to the fourth embodiment, and shows an implementation of recording to the writing layer based on a tracking position that has been stored.

EXPLANATION OF REFERENCE

Figure 1:
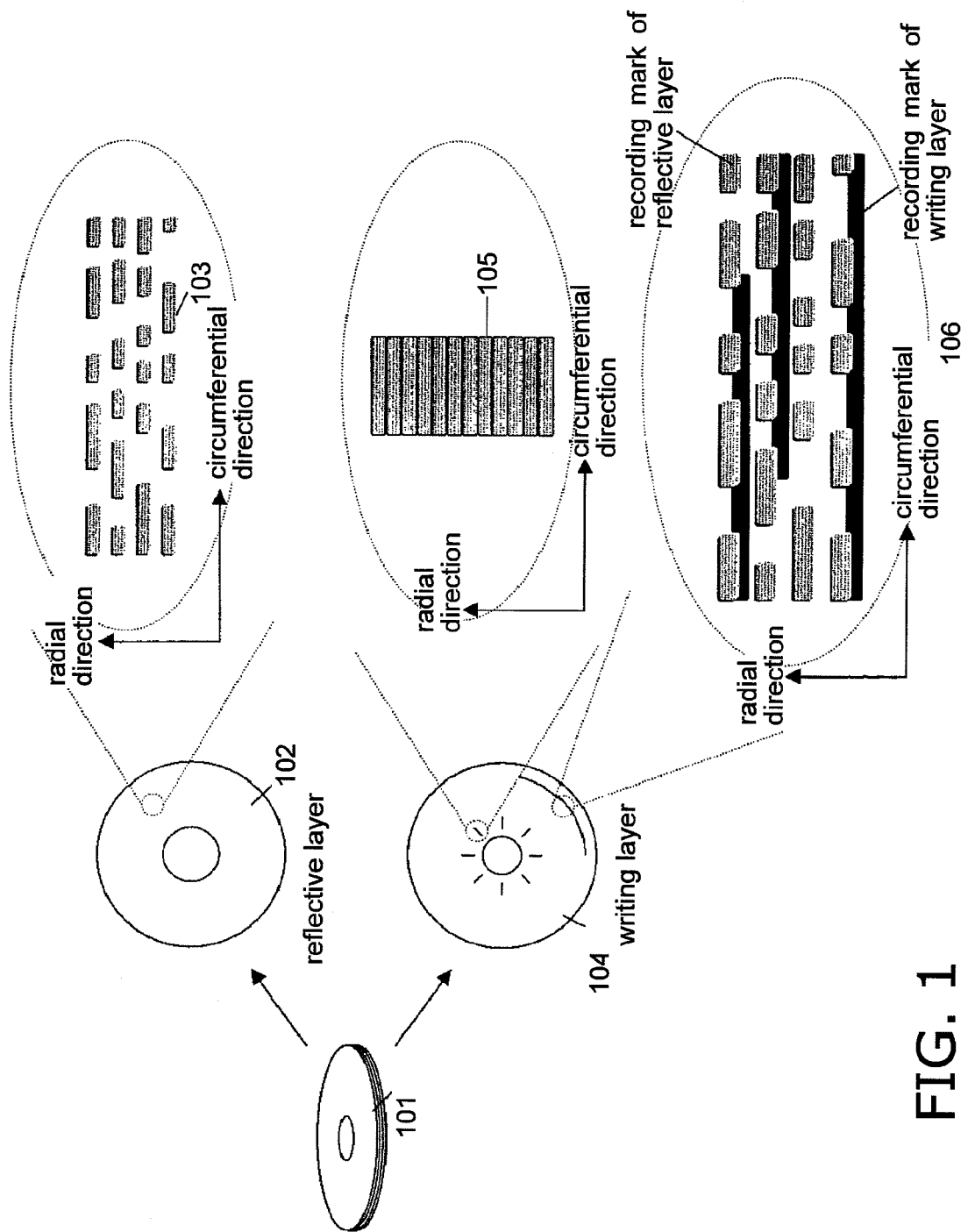
FIG. 1 is a conceptual diagram that shows an optical disc with a reflective layer on which uneven recording marks are formed, and to which pre-marks and their physical position information have been recorded, according to a first embodiment.

101, 1601 optical disc
102, 1602 reflective layer
103, 1604 recording marks of reflective layer
104, 1603 writing layer
105 pre-recording marks
106 recording marks of writing layer
201 authoring step
203 optical disc of disc manufacturing step 1
301, 409, 503, 903, 1103, 1407, 1702, 1917 spindle motor
306, 910, 1001B, 1701 recording head
401, 901, 1001A, 1101, 1401, 1901 reproducing head
501 recording and reproducing head
1301 target sector
1605 pre-mark region
1606 position information recording marks
1607 wobble region
1801 pre-mark recording width in radial direction
2506 sector C-1 reflective layer reproduction signal
C-2 writing layer reproduction signal (section in which pre-marks are not recorded)
C-3 writing layer reproduction signal (section in which pre-marks are recorded)
G-1 PLL tracking clock
G-2 clock with fixed frequency

BEST MODE FOR CARRYING OUT THE INVENTION

Embodiments of the invention are described below with appropriate reference to the drawings, etc.

First Embodiment

1. Optical Disc

FIG. 1 is a conceptual diagram of the optical disc according to this embodiment. An optical disc 101 has a reflective layer on which primary information is recorded by forming a reflective film made of aluminum or silver, for example, over unevenly shaped recording marks, and a writing layer that can be written to by irradiating a laser onto a layer that is behind from or at the side which is irradiated with the laser for reading the unevenly shaped marks.

A reflective layer 102 of the optical disc is a recording layer that is equivalent to the information recording layer on an ordinary read-only disc. Information is recorded to the reflective layer 102 by forming unevenly shaped recording marks 103 in a continuous fashion in the circumferential direction.

The information that is recorded by the recording marks is various digital information such as voice/video information, game information, or data.

When information is to be reproduced from the reflective layer 102, the reflective layer 102 is irradiated with a laser at a reproduction level and the difference in brightness of the reflective light between the uneven marks and the mirror portions where no marks are formed is utilized in order to reproduce the information.

A writing layer 104 also is formed on the optical disc 101 in front of or behind the reflective layer 102.

Pre-marks 105 are recorded to the writing layer 104 at disc-specific positions after the disc is manufactured, and recording marks 106 that indicate information on the locations of those pre-marks also are recorded to the writing layer 104.

The pre-marks 105 are recording marks that are disposed substantially in a straight line in the radial direction of the optical disc 101. The pre-marks 105 are as long as a plurality of track widths of the recording marks 103 in the circumferential direction of the reflective layer 102.

The pre-marks 105 are recorded after the disc is manufactured, in synchronization with the recording timing at which a single revolution signal is output at each revolution of the disc. Rotation of the disc is controlled by CAV (constant angular velocity) rotation control.

Next, position information that indicates the positional relationship between the pre-marks 105 and reflective layer recording marks 106 is recorded by record marking on the writing layer 104 of the optical disc 101. The position information is obtained from the address information from the data that are recorded to the reflective layer 102, the timing at which the synchronization code is detected, and the timing at which pre-marks 105 are detected.

The position information is extracted by first reproducing the recording marks 103 of the reflective layer 102 at the same radial position as the radial position at which pre-marks 105 are formed. Next, the focal position of the reproduction laser is changed from the reflective layer 102 to the writing layer 104 and tracking control is stopped, holding the frequency of the reproducing clock signal, at the moment that the reference position at which the target address is detected or the synchronization code is detected. The clock number from the reference position until the pre-mark 105 is detected is extracted as the position information. The extracted position information is encoded along with the reference position information and recorded as recording marks on the writing layer 104.

It should be noted that the method of recording the recording marks to the writing layer 104 is either by the method of irradiating at high laser power to the reflective layer 102 to record marks to the writing layer 104, or the method of providing a writing layer recording head that can irradiate substantially the same track as the reproducing head for the reflective layer 102 with a recording laser.

With the method of irradiating a laser at high power to record marks to the writing layer 104, a recording laser that is focused onto the reflective layer 102 forms recording marks on the writing layer 104, which is behind or in front of the reflective layer 102, and thus the laser is substantially unfocused when recording the writing layer 104. In this case, it is possible to record marks to the writing layer 104 by keeping the spacing between the two layers 102 and 104 at or below a fixed spacing, as will be discussed later.

On the other hand, with the method of providing a reproducing head for the reflective layer 102 and a recording head for the writing layer 104, the reproducing head for the reflective layer 102 focuses onto the reflective layer 102 and the reproducing head for the writing layer 104 focuses onto the writing layer 104, and thus the recording marks can be formed at the approximately the same laser power level as an ordinary recording head for the writing layer 104.

The optical disc 101 of the invention has the reflective layer 102, to which information is recorded in ordinary uneven marks, and the writing layer 104. The writing layer 104 has a pre-mark recording region in which a plurality of pre-marks 105 are formed at substantially the same length in the circumferential direction and in series in the radial direction, and a position information recording region to which information that indicates the positional relationship between the pre-marks 105 and reference positions on the reflective layer 102 is extracted and encoded, and then recorded.

It should be noted that ordinarily, a single revolution signal when CAV control is performed is output regardless of the reference position signal for the address information or synchronization code of the reflective layer 102, for example. Thus, the positional relationship between the pre-marks 105 of the writing layer 104 that are recorded with reference to a single revolution signal and the reference information of the reflective layer 102 can be used as information that is unique for each disc.

Further, since position information is recorded to the position information recording region of the writing layer 104 after encoded (or given with a tamper protection code), there is no risk that the position information itself will be tampered with.

Thus, in order to copy the disc according to the invention, it is necessary to keep the disc set position when recording pre-marks and the disc set position when copying from being off even minutely.

In the case of Blu-ray discs, the channel bit length is approximately 70 nm, and thus a shift of 70 nm in the disc set position will result in nonalignment of a single channel bit and in effect preclude copying.

The fact that the pre-marks themselves are discretely disposed with sufficient distance between them precludes tracking control on the pre-marks even if an attempt is made to reproduce only the pre-marks 105 of the writing layer 104, and thus reproduction of the pre-marks only is not possible either, such that with this method it also is not possible to copy the pre-marks.

2. Optical Disc Manufacturing Method

Figure 2:
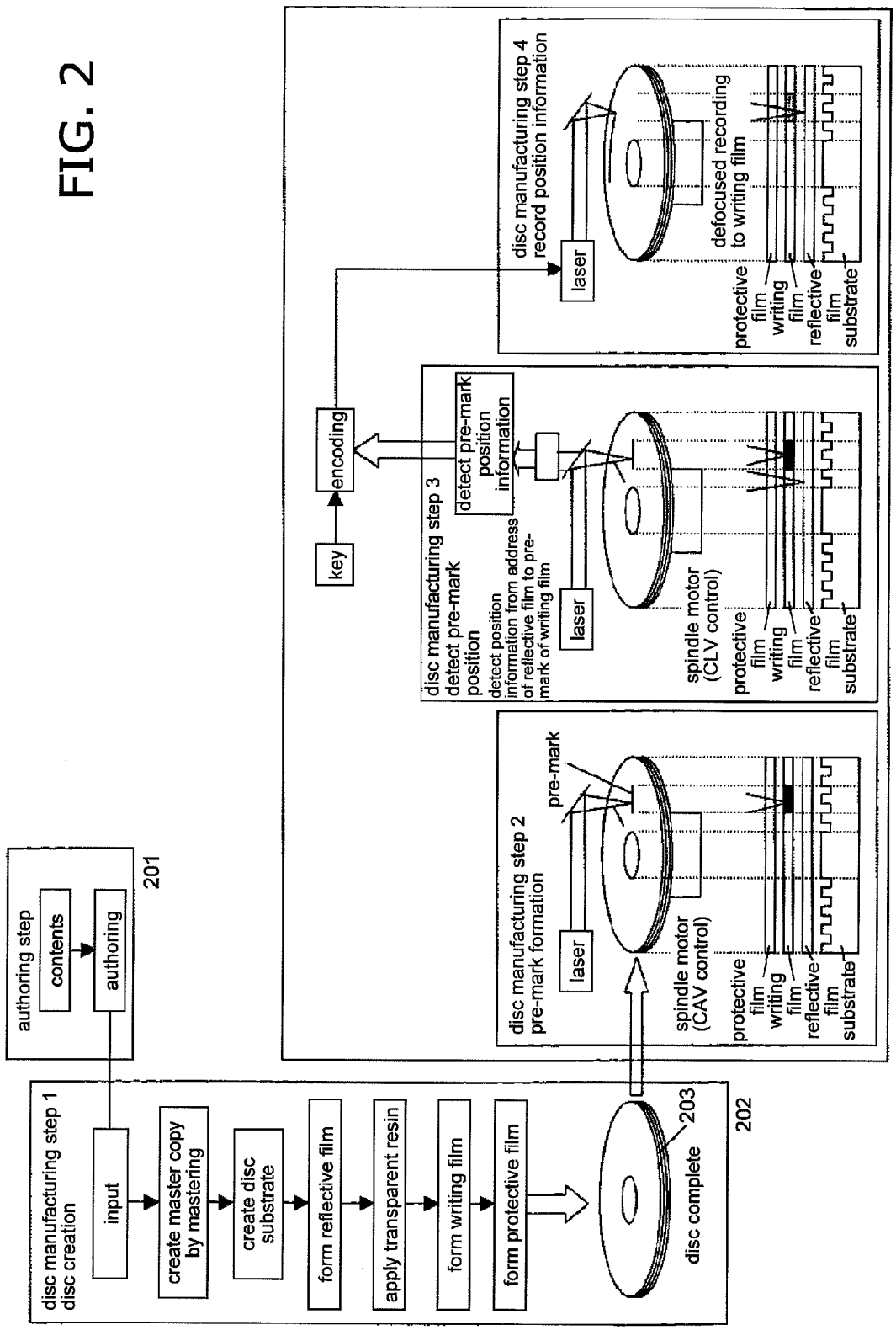
FIG. 2 is a flowchart showing the procedure for manufacturing an optical disc with a reflective layer on which uneven recording marks are formed, and to which pre-marks and their physical position information have been recorded, according to the first embodiment.

FIG. 2 is a conceptual diagram of the procedure for manufacturing the optical disc according to this embodiment.

The procedure for manufacturing the optical disc consists of a disc manufacturing step 1 of creating a disc 203, a disc manufacturing step 2 of forming pre-marks, a disc manufacturing step 3 of detecting the pre-mark positions, and a disc manufacturing step 4 of encoding and recording the position information that is detected.

First, in an authoring step that is performed prior to manufacturing the optical disc in a software development company or the like, the content information to be recorded is authored and these authored data are input to the disc manufacturing step 1.

In disc manufacturing step 1, a master disc is created based on the authored data that are input.

The reflective layer is formed by transferring a negative of the uneven marks of the master disc to an optical disc substrate that is made from polycarbonate, for example, by stamping the master disc that has been created, and then coating the uneven marks with a metal reflective film made of aluminum or silver for example. By doing this, a reflective layer on which the content information has been recorded is formed.

Next, a transparent resin is coated over the reflective film. A writing film made from a pigment-based or an organic-based material is then formed on that transparent resin. After forming the writing film, a protective film is formed on the writing film. In this manner, the disc 203 is formed.

It should be noted that the disc manufacturing step 1 is substantially identical to the procedure for producing ordinary multi-layered media, but differs from the ordinary procedure in that a writing layer without a wobble or uneven marks is formed.

In this way, a multi-layered disc 203 with a reflective layer to which content information has been recorded and a writing layer to which absolutely no information has been recorded is created, and this is used in the next disc manufacturing step 2.

The disc manufacturing step 2 is a step of forming pre-marks in the writing layer of the optical disc 203 that is manufactured in disc manufacturing step 1.

First, the optical disc is spun under CAV control. The focus is controlled on the writing layer of the optical disc, and the laser is irradiated at the recording level at an intermittent timing in accordance with the single revolution signal that is output once per revolution of the disc. At the same time, each time the optical disc makes a revolution the position of the spot irradiated by the laser is shifted in the radial direction by substantially the width of the pre-mark in the radial direction.

By doing this, linear pre-marks are formed in the writing layer of the optical disc in the radial direction at a substantially fixed length in the circumferential direction.

Figure 3:
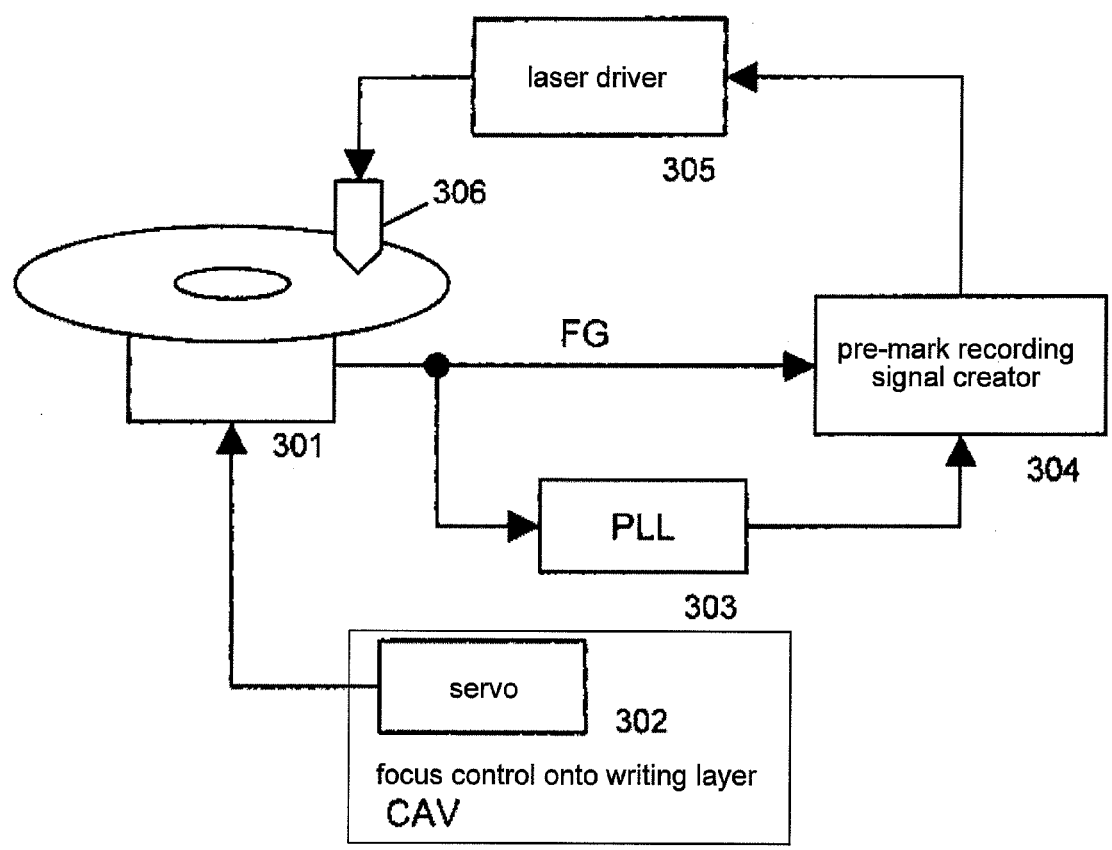
FIG. 3 is a block diagram showing the configuration of the pre-mark recording device according to the first embodiment.

FIG. 3 is a block diagram showing the main blocks of the pre-mark recording device of the disc manufacturing step 2.

The pre-mark recording device is made from a spindle motor 301, a servo 302, a PLL 303, a pre-mark recording signal creator 304, a laser driver 305, and a head 306.

When a disk is inserted into the pre-mark recording device, the spindle motor 301 rotates the disc under CAV control that gives a fixed rotational speed for both the outer circumference and the inner circumference of the disc. It also creates a single revolution signal at each revolution and outputs this to the PLL 303. It should be noted that the single revolution signal is the same for the revolution synchronized signal that is synchronized with a single revolution of the disc.

The servo 302 performs focus control to align the focal point of the laser light that is emitted onto the writing layer of the disc that has been inserted.

In accordance with a clock signal that has a preset frequency and the single revolution signal from the spindle motor, the PLL 303 creates a clock signal that is synchronized with the single revolution signal and outputs this to the pre-mark recording signal creator 304.

The pre-mark recording signal creator 304 has a counter that counts the clock based on the clock signal from the PLL 303, and resets the count value with the single revolution signal from the spindle motor 301.

The pre-mark recording signal creator 304 creates a pre-mark recording signal, in accordance with the counter value, that indicates the timing at which the writing layer is irradiated with the laser at the recording power, and outputs this to the laser driver 305.

The laser driver 305 creates a multi-pulse for intermittently changing the laser intensity, in the period that shows the timing at which the pre-marks of the pre-mark recording signal from the pre-mark recording signal creator 304 are to be recorded. Then, in accordance with the multi-pulse, the laser driver 305 controls the value of the current that flows to the laser that is mounted in the head 306 to change the laser intensity while recording pre-marks.

The operation of the pre-mark recording device of disc manufacturing step 2 is described next.

Figure 4:
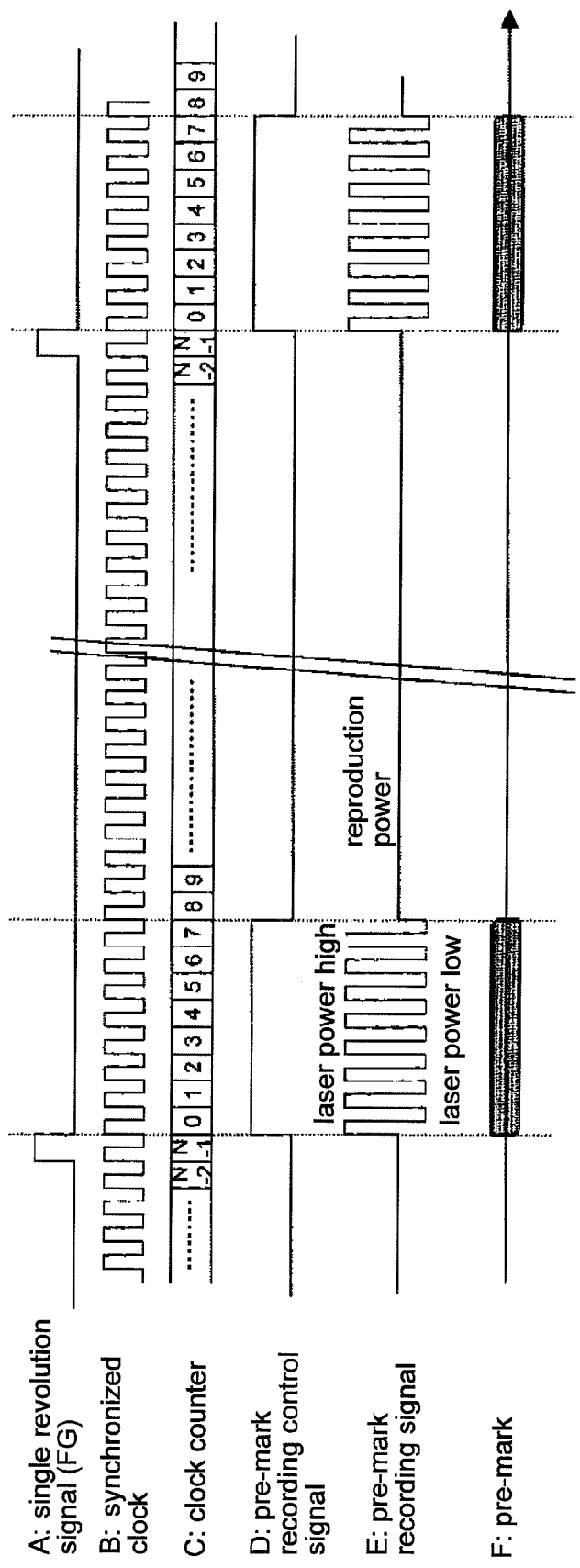
FIG. 4 is a timing chart that shows the operation of the pre-mark recording device according to the first embodiment.

FIG. 4 is a timing chart that expresses the characteristic operation of the pre-mark recording device of the disc manufacturing step 2.

When the disc is inserted into the pre-mark recording device, the spindle motor 301 that is shown in FIG. 3 rotates the disc under CAV control that keeps a constant rotational speed. At this time, the spindle motor 301 creates a single revolution signal (FIG. 4A) that is output with each rotation of the disc or in synchronization with rotation of the disc, and outputs this to the PLL 303 and the pre-mark recording signal creator 304. The single revolution signal (FIG. 4A) indicates that a single revolution has occurred in the interval during which it is output at "H," or is output a plural number of times in synchronization with a single rotation of the disc.

Next, the PLL 303 creates a CAV synchronized clock (FIG. 4B) that is synchronized with the single revolution signal (FIG. 4A) from the spindle motor 301. The PLL 303 is a phase-synchronized circuit (PLL; phase-locked loop), and creates a clock whose frequency is equal to the clock signal that is preset to substantially the same frequency as the single revolution signal and the single revolution signal that is input due to feedback control of the phase error, and then multiplies this clock in order to create the CAV synchronized clock signal (FIG. 4B) and outputs this signal to the pre-mark recording signal creator 304. It should be noted that this embodiment shows an example in which the CAV synchronized clock signal that is created is N-times the number of the single revolution signals.

The pre-mark recording signal creator 304 counts the clock with the counter based on the CAV synchronized clock signal (FIG. 4B) that is input from the PLL 303, and creates a pre-mark recording control signal (FIG. 4D) that indicates the range over which the pre-mark is recorded based on that count value (FIG. 4C). The pre-mark recording control signal is output to the laser driver 305. The counter resets the count value to 0 when the single revolution signal (FIG. 4A) from the spindle motor 301 is H. It should be noted that this embodiment shows an example in which a pre-mark is recorded in eight clock segments of the CAV synchronized clock (FIG. 4B) from the single revolution signal (FIG. 4A). FIG. 4 shows an example in which a pre-mark is recorded in only one section of a single rotation, but it is also possible for a plural number of pre-mark recording signals to be output until the counter value becomes N−1 (a plurality of pre-marks are recorded in a single revolution).

The pre-mark recording control signal can be output such that the plurality of pre-marks have the same width or have different widths.

The laser driver 305, to which the pre-mark recording control signal (FIG. 4D) has been input from the pre-mark recording signal creator 304 shown in FIG. 3, creates a pre-mark recording signal (FIG. 4E) for irradiating the laser at the recording level during the period that the pre-mark recording control signal is H. The pre-mark recording signal (FIG. 4E) may be the same signal as the pre-mark recording control signal (FIG. 4D), but ideally the laser power is controlled such that the pre-mark is formed at a constant width in the circumferential direction of the disc. In this case, a multi-pulse shape is adopted so that the power of the laser can be intermittently strengthened and weakened within the range over which the pre-mark is recorded, such as the pre-mark recording signal that is shown in FIG. 4E. Thus, the pre-mark (FIG. 4E) that is recorded to the disc is not only formed at a constant width in the circumferential direction of the disc, but the life of the laser can be extended as well.

By moving the position of the recording head toward the outer circumference by substantially the width of the pre-mark in the radial direction (about 0.1 to 0.3 µm for Blue-ray discs) during a single revolution of the disc, it is possible to record a pre-mark substantially without leaving a gap in the radial direction, and the pre-mark is formed in a straight line in the radial direction (more precisely, the linear velocity in the outer circumferential direction due to CAV control becomes slower, and thus the pre-mark is formed in a fan shape that widens toward the outer circumference).

Through the disc manufacturing step 2, a disc in which pre-marks are formed in the writing layer is created, and then, as shown in FIG. 2, this disc is furnished for disc manufacturing step 3.

The disc to which pre-marks are recorded to the writing layer in disc manufacturing step 2 is moved to disc manufacturing step 3. Here, the radial position at which the pre-marks are recorded are output from disc manufacturing step 2 to disc manufacturing step 3.

In disc manufacturing step 3, the recorded position information of the pre-marks that were recorded in the disc manufacturing step 2 is extracted. Specifically, the address information of the reflective layer to which the uneven marks are recorded, which corresponds to the radial positions where the pre-marks are recorded and that are input from disc manufacturing step 2, is calculated from the radial positions, and these are used for seeking the address positions.

The optical disc reproducing device that is used in disc manufacturing step 3 applies tracking control according to the recording marks that are formed in a continuous manner in the circumferential direction in the reflective layer, and also reproduces the data that are recorded to the reflected layer in accordance with the clock that is extracted with the PLL (phase locked loop) circuit.

The optical disc reproducing device stops tracking control and holds that track position when the calculated address information is detected, and also stops phase error tracking by the PLL circuit and holds the frequency of the clock signal. The optical disc reproducing device then jumps the focal position onto the writing layer, which is either behind or in front of the reflective layer.

After jumping to the writing layer, the pre-marks of the writing layer that were formed in disc manufacturing step 2 are detected. If a pre-mark is detected, then the number of clocks from the time that the address information (or synchronization code) detected in the reflected layer is detected until the pre-mark of the writing layer is detected after jumping to the writing layer is counted, and the address information (or synchronization code position) and clock count number are output to disc manufacturing step 4 as position information of the pre-mark.

3. Recording Device

The pre-mark recording device that is used in disc manufacturing step 3 is described next.

Figure 5:
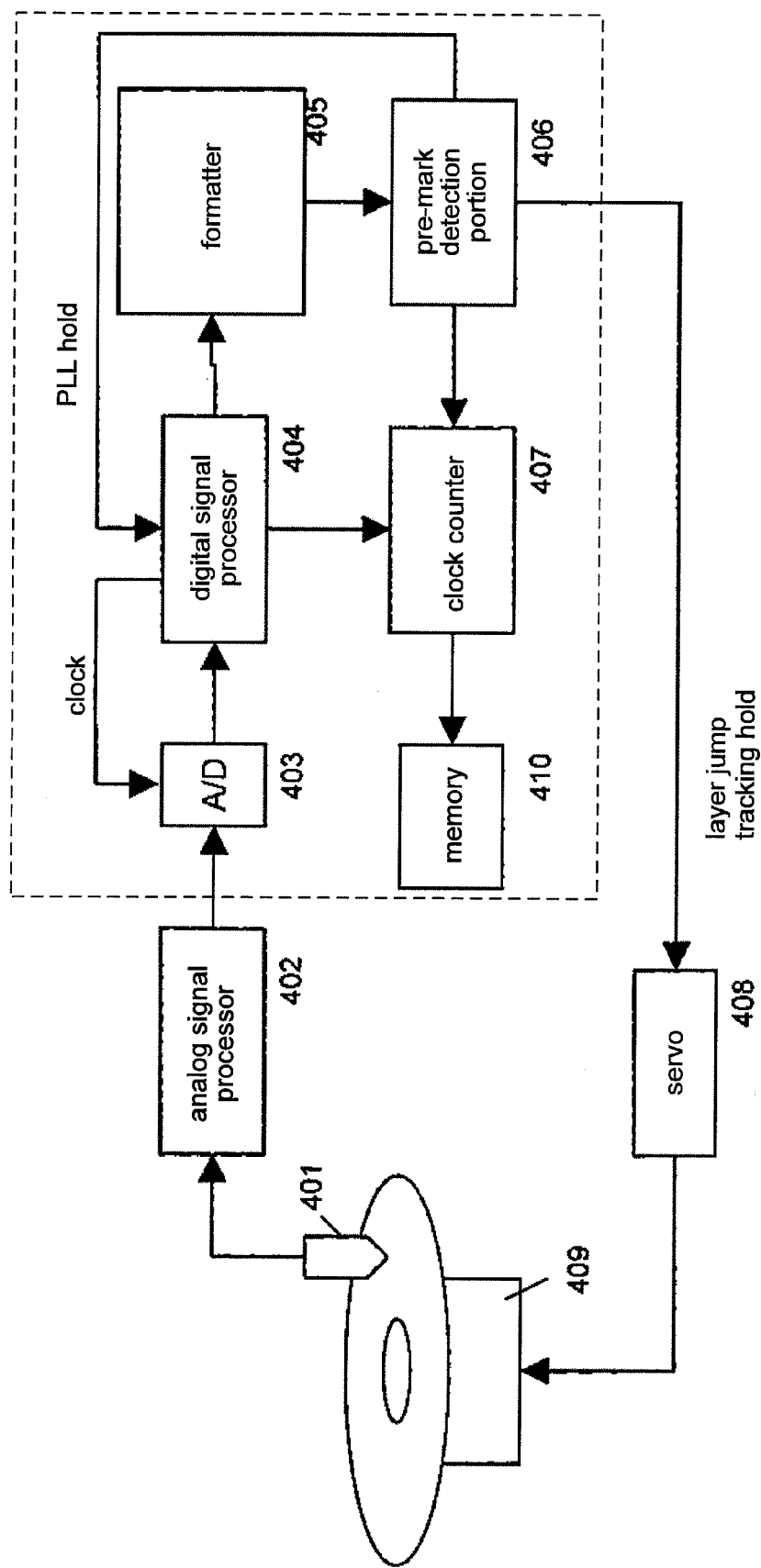
FIG. 5 is a block diagram that shows the configuration of the pre-mark position detection device according to the first embodiment.

FIG. 5 is a block diagram that shows the characteristic block configuration of a pre-mark position detection device of disc manufacturing step 3 for detecting the position of pre-marks on the writing layer that are formed in disc manufacturing step 2. It should be noted that the dotted line in FIG. 5 indicates the scope of the LSI chip.

The pre-mark position detection device is made of an optical head 401, an analog signal processor 402, an AD 403, a digital signal processor 404, a formatter 405, a pre-mark detection portion 406, a clock counter 407, a servo 408, a spindle motor 409, and a memory 410.

The optical head 401 irradiates a laser onto the reflective layer of a disc that has been inserted, creates an analog reproduction signal from the light that is reflected, and outputs this to the analog signal processor 402.

The analog signal processor 402 shapes the analog reproduction signal that is input from the optical head 401 through amplification and waveform equalization, creating a shaped analog reproduction signal that it outputs to the AD 403.

The AD 403 is a general analog-digital conversion circuit, and samples the shaped analog reproduction signal that is input based on a clock signal that is input from the digital signal processor 404, and quantizes this signal into a multi-bit digital reproduction signal that it outputs to the digital signal processor 404.

The digital signal processor 404 has an internal PLL (phase locked loop) circuit, and extracts a clock signal with the same band as the digital reproduction signal that is input and outputs this to the AD 403 and the clock counter 407. It should be noted that the clock signal is employed for clock for sampling by the AD 403. In synchronization with the clock signal, the digital signal processor 404 creates a binary reproduction signal that is obtained by binarizing the multi-bit digital reproduction signal that is input from the AD 403, and outputs this to the formatter 405.

The formatter 405 detects the synchronization code that has been added at a set timing from the binary reproduction signal that is input, and partitions the reproduction signal into sector units in synchronization with the timing of the synchronization code. The reproduction data that have been partitioned into sector units are demodulated in accordance with a predetermined modulator, and error correction is performed based on parity bits for error correction that have been added to the reproduction signal. The formatter 405 then extracts the address information that is added to the sector units and outputs this to the pre-mark detection portion 406.

The pre-mark detection portion 406 determines whether or not the address information that has been input is a target address for detecting pre-marks, based on the address information that is input. If the address is the target address, then a PLL hold signal for freezing the frequency of the clock signal that is created by the digital signal processor 404 is output to the digital signal processor 404. Simultaneously, it outputs a layer jump signal for jumping the focal position from the reflective layer to the writing layer, and a tracking hold signal for holding the tracking position of the disc, to the servo 408. At the same time, its internal clock counter 407 counts the clock signal from the digital signal processor 404.

The servo 408 receives the layer jump signal from the pre-mark detection portion 406 and performs control to move the focal position of the optical head 401 from the reflective layer to the writing layer. The servo 408 also fixes the tracking control that was applied to the uneven marks of the reflective layer, and fixes the current radial position of the head.

At the radial position of the target address for pre-mark detection, a plurality of pre-marks only are formed in the writing layer in the circumferential direction. As mentioned above, the pre-marks are formed in a straight line in the radial direction. Thus, if a layer jump is performed at the target address position of the reflective layer to move to the writing layer, a low reflectance is detected only where there are pre-marks. Thus, the optical head 401 outputs to the analog signal processor 402 an analog reproduction signal with which the pre-mark portion can be specified.

In the analog signal processor 402 the analog reproduction signal that has been input is amplified and waveform equalized like the reflective layer, creating a shaped analog reproduction signal that is output to the AD 403. It should be noted that it is effective to use a LPF (low-pass filter) that has been designed with a cut-off frequency that is different when reproducing pre-marks and when reproducing the reflective layer.

In the AD 403, the shaped analog reproduction signal that has been input is sampled based on the clock signal whose frequency is held by the digital signal processor 404, creating a multi-bit digital reproduction signal that is then output to the digital signal processor 404.

The digital signal processor 404 binarizes this multi-value digital reproduction signal, creating a binary reproduction signal that it outputs to the pre-mark detection portion 406. It should be noted that this binary reproduction signal is a signal that is H only at positions where pre-marks have been recorded (sections where there is low reflectance).

The pre-mark detection portion 406 receives the binary digital reproduction signal and determines the pre-mark recording start position (rising edge position of the binary digital signal when reproducing the writing layer) from the binary digital reproduction signal, and at the pre-mark recording start position, the pre-mark detection portion 406 outputs the target address and the count value of its internal clock counter to the memory 410.

The pre-mark detection portion 406 counts the clock number during the period that the binary digital reproduction signal is H (that is, the pre-mark width), and outputs the result to the memory 410.

The memory 410 stores the address information, pre-mark start position clock counter value, and pre-mark width clock counter value from the pre-mark detection portion 406 as one set.

When the series of processes of disk manufacturing step 3 are complete, the disc and the content stored on the memory 410 are advanced to disc manufacturing step 4.

As discussed earlier, a plurality of pre-marks are formed in the circumferential direction at the same position in the radial direction in the writing layer of the disc. In detection of the pre-mark position in this step, the pre-mark position of at least one of the plurality of pre-marks is detected. Since the radial positions at which the pre-marks are formed are input from the disc manufacturing step 2, any address among the plurality of address information data corresponding to the radial positions is selected and the position of the pre-mark that appeared first after jumping from that address position to the writing layer is detected. If it is determined that a pre-mark has been reached when jumping to the writing layer, then ignoring that pre-mark and detecting the next pre-mark is an excellent approach because it allows the pre-mark width to be detected accurately.

If a plurality of pre-mark positions are detected, it is desirable to detect the pre-marks at different radial positions. This is because it is also possible to ascertain the linearity in the radial direction of the recorded pre-mark position, and thus illegal disc determination can be performed under stricter conditions.

The operation of the pre-mark position detection device is described next.

Figure 6:
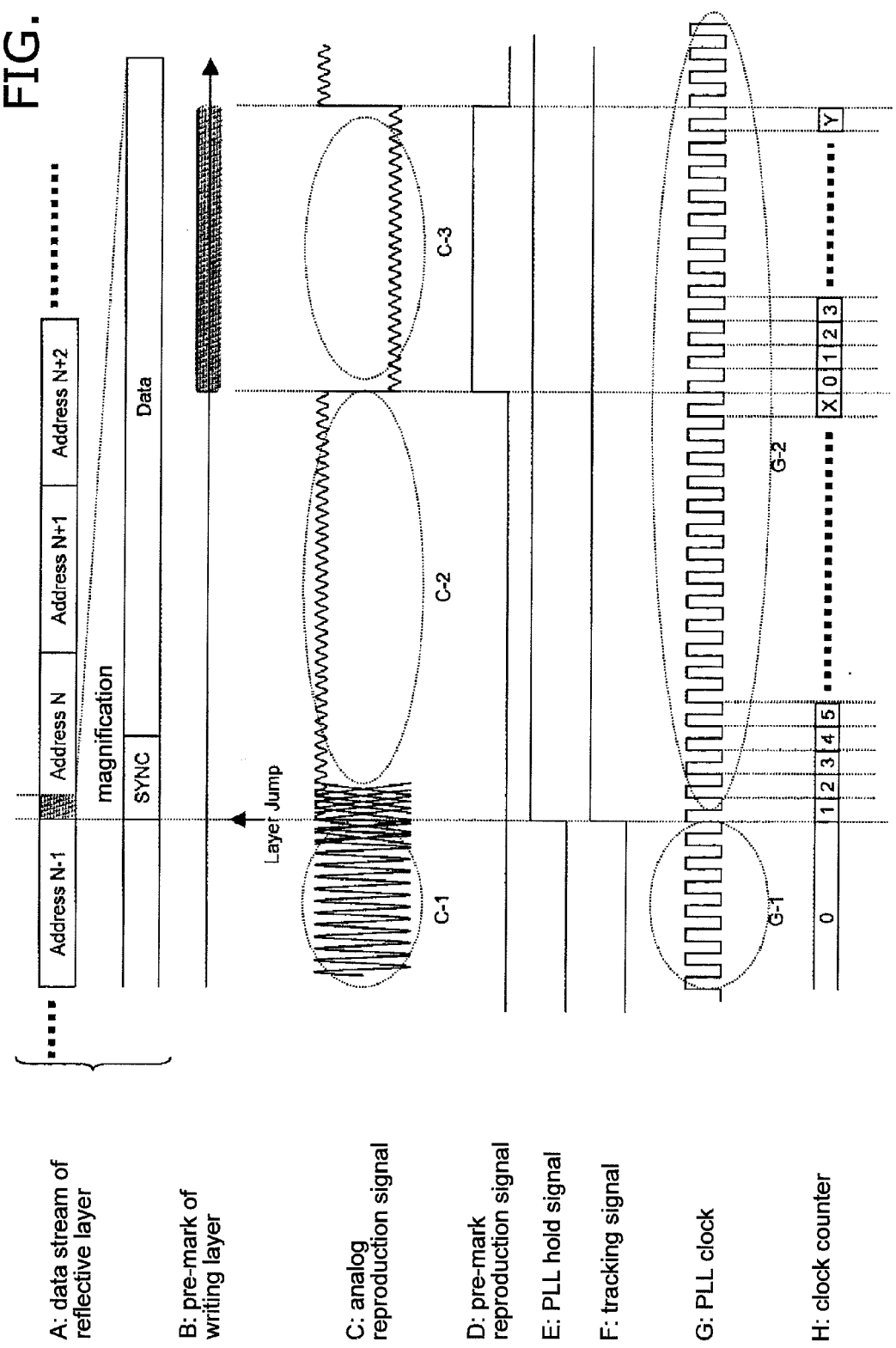
FIG. 6 is a timing chart that shows the operation of the pre-mark position detection device according to the first embodiment.

FIG. 6 is a timing chart that shows the characteristic operation of the pre-mark detection operation of the pre-mark detection device (FIG. 5).

First, the uneven marks of the reflective layer is irradiated with a laser and the light that is reflected is used to create an analog reproduction signal, and this is shaped by the analog signal processor 402. Since uneven marks are recorded in the reflective layer, the analog reproduction signal (FIG. 6C-1) is extracted from the difference in the intensity of the reflected light between mark and non-mark areas.

The analog reproduction signal (FIG. 6C-1) of the reflective layer is converted to a binary digital signal by the digital signal processor 404, and output to the formatter 405. The PLL clock signal (FIG. 6G-1) is extracted from the analog reproduction signal (FIG. 6C-1) of the reflective layer by the PLL circuit of the digital signal processor 404.

The formatter 405 detects the synchronization code (SYNC) that is attached at a fixed interval (frame) from the binary digital reproduction signal that is input (FIG. 6A). Then, with reference to the timing at which the synchronization code can be detected, it partitions the binary data into sector units that have an address, and extract the address information and output it to the pre-mark position detection portion 406.

The pre-mark position detection portion 406 detects the sector start positions of the target addresses for detecting pre-marks, from the address information that is input from the formatter 405. In this embodiment, the address position one before of the target address is detected, and the terminal position of the sector that includes the address before is detected as the sector start position of the target address.

When the pre-mark position detection portion 406 detects the start position of the sector with the target address, it outputs to the servo 408 a layer jump signal for moving the position where the laser is focused from the reflective layer on which the uneven marks are recorded to the writing layer in front of or behind the reflective layer. It also outputs a tracking hold signal (FIG. 6F) for stopping tracking control to the servo 408. At the same time, it outputs a PLL hold signal (FIG. 6F) for fixing the PLL clock frequency to the digital signal processor 404. Thus, the PLL clock (FIG. 6G-1) that is extracted from the reproduced analog signal from the recording marks of the reflective layer is fixed at the clock frequency prior to the jump (FIG. 6G-2) during the period that the PLL hold signal (FIG. 6E) after making the layer jump is H.

If a layer jump from the reflective layer to the writing layer is performed, then the focus is moved from the reflective layer with its continuous uneven marks to the writing layer, which has no marks other than the pre-marks, and thus if the jump is made to a spot without a pre-mark, then a constant reproduced analog signal is obtained is constant at the high level of the reflective light (FIG. 6C-2).

Since the reflectance is low in pre-mark areas, a constant analog reproduction signal is obtained at the low level of the reflectance (FIG. 6C-3).

Thus, tracking control by the servo is stopped after jumping to the writing layer, and the analog reproduction signal (FIG. 6C) that is obtained after fixing the frequency of the clock of the digital signal processor 404 has a high frequency reproduction waveform (FIG. 6C-1) due the uneven marks that are continuous in the reflective layer before the layer jump, whereas after the jumping the analog reproduction signal is at the H level where there are no pre-marks (FIG. 6C-2) and at the L level where there are pre-marks (FIG. 6C-3). Based on the analog reproduction signal, the pre-mark position detection portion 406 detects portions of continuous segments having a constant L level as binary pre-mark reproduction signals (FIG. 6D).

It should be noted that in this embodiment, when the PLL hold signal (FIG. 6E) is H the frequency of the clock signal that is output from the digital signal processor 404 is fixed at the current clock frequency.

Further, in this embodiment, when the tracking hold signal (FIG. 6F) is H, the tracking servo of the servo 408 is stopped and the position of the laser irradiation spot is fixed at the current radial position.

The pre-mark position detection portion 406 has an internal counter that counts in synchronization with the clock signal from the digital signal processor 404. This counter resets the count number to 0 when the jump signal, which indicates the timing of jumping from the reflective layer to the writing layer, is output to the servo 408. Following this jump, the clock signal, whose frequency is fixed, is counted, and the count value X (FIG. 6 H) at the point that the pre-mark start position is determined according to the pre-mark reproduction signal (FIG. 6D), and the target address when the jump is to be performed are output to the memory 410. The pre-mark position detection device (FIG. 5) also has a counter that counts the clock number during the period that the pre-mark reproduction signal (FIG. 6D) is H, that is, over the width of the pre-mark, and outputs the clock number Y (FIG. 6H) of the pre-mark width to the memory 410 at the same time.

It should be noted that for the target address for detecting the pre-mark, any one of the plurality of addresses that are found from the radial position at which the pre-marks are formed in disc manufacturing step 2 may be used. If pre-mark position detection is performed a plurality of times at different target addresses, then a plural number of target addresses and a plural amount of pre-mark position information from the plurality of target addresses are stored in the memory 410. It is desirable for the pre-mark radial position for detection to be shifted for each address if a plurality of pre-marks are to be detected from a plurality of target addresses. This is because the linearity of the pre-marks formed in a line in the radial direction can be confirmed at the same time. Thus, the identification of illegal discs can be made more stringent.

The disc manufacturing step 4 (FIG. 2) is described next.

In disc manufacturing step 4, the pre-mark positions from disc manufacturing step 3 are encoded and recorded. Encoding may be carried out by the method of recording a secret key to a device for recording information to a disc to be used in disc manufacturing step 4 and then encoding the information on its location with a secret key encoding method, or the method of encoding using a public key coding method. However, the use of a secret key code requires that the secret key for encoding/decoding be strictly guarded, but there are few encoding/decoding calculations and thus is fast. On the other hand, one feature of public key codes is that while the public key code itself does not need to be strictly managed, and a large number of calculations is involved.

The encoded position information is recorded to the writing layer of the disc in disc manufacturing step 4. The position information may be recorded by performing focus control of the recording laser onto the reflective layer on which the uneven marks are recorded, or by focusing the recording laser on the writing layer.

FIG. 2 is a conceptual diagram of the case of recording focusing on the reflective layer.

First, the position information recording device of disc manufacturing step 4 seeks toward the outer circumference from the radial position at which a pre-mark is recorded on the writing layer. Seeking at this time is carried out according to address information that has been recorded to the reflective layer as uneven marks. Once the target address position is reached, the reflective layer is irradiated at a recording power with a laser being focused thereon. The recording power ordinarily is output at a power that is at least as great as the laser power for recording to write-once media. Thus, if the writing layer is in front of the reflective layer, the writing layer is irradiated with a defocused laser whose focal point is shifted. If the writing layer is behind the reflective layer, the writing layer is also irradiated with laser light that passes through the reflective layer. In either case, ordinarily the writing layer is irradiated at a higher power than the laser power for recording to write-once media, thus forming recording marks in the writing layer through changes in reflectance of the writing layer. Recording by irradiating the writing layer with a defocused laser can be appropriately carried out by setting the distance between the reflective layer and the writing layer as discussed later.

With these recording marks, the position information of the pre-marks of the writing layer that is input from disc manufacturing step 3 is recorded.

A first position information recording device of the disc manufacturing step 4 (FIG. 2) is described next.

Figure 7:
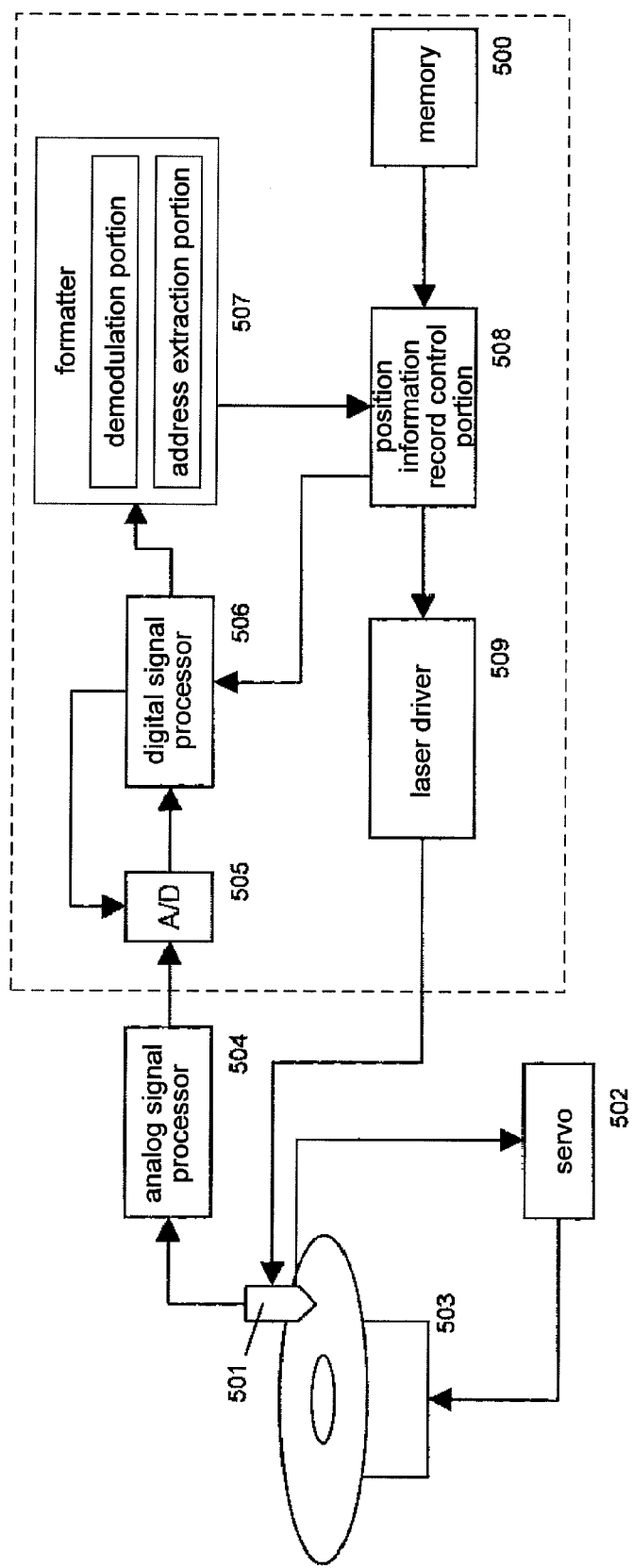
FIG. 7 is a block diagram that shows the configuration of the pre-mark position recording device according to the first embodiment.

FIG. 7 is a block diagram showing the characteristic blocks of this position information recording device. It should be noted that the dotted line in FIG. 7 indicates the scope of the LSI chip.

The position information recording device is made of a memory 500, an optical head 501, a servo 502, a spindle motor 503, an analog signal processor 504, an AD 505, a digital signal processor 506, a formatter 507, a position information record control portion 508, and a laser driver 509.

First, the pre-mark position information of the writing layer that is input from the disc manufacturing step 3 (FIG. 2) is stored on the memory 500.

The optical head 501 outputs a laser at the reproduction level onto the uneven marks of the reflective layer, and outputs an analog reproduction signal that indicates the intensity of the light that is reflected to the analog signal processor 504, as well as outputs an analog signal for focus control and an analog signal for tracking control to the servo 502.

The servo 502 focuses the focal point of the laser irradiating the reflective layer based on the analog signal for focus control from the optical head 501, and performs tracking control for aligning the center position of the laser with the center position of the uneven marks that are continuous in the circumferential direction in the reflective layer based on the analog signal for tracking control.

The spindle motor 503 performs CLV rotation control for advancing at a fixed velocity in the circumferential direction, in accordance with the radial position of the optical head 501.

The analog signal processor 504 creates a shaped analog reproduction signal by amplification and waveform equalization of the analog reproduction signal from the optical head 501, and outputs this to the AD 505.

The AD 505 is an AD converter that performs general analog/digital conversion, and samples the analog signal that is input with a clock signal and quantizes this signal into a multi-bit digital signal, creating a digital reproduction signal, and outputs the digital reproduction signal to the digital signal processor 506.

The digital signal processor 506 performs waveform equalization on the multi-bit digital reproduction signal from the AD 505, and with an internal PLL (phase locked loop) circuit extracts a clock signal, and in synchronization with that clock signal, converts the multi-bit digital reproduction signal into a binary reproduction signal and outputs this to the formatter 507. It should be noted that the clock signal that is output by the PLL circuit of the digital signal processor 506 is used as the clock signal for sampling by the AD 505.

The formatter 507 detects synchronization code that is added at a fixed interval from the digital reproduction signal from the digital signal processor 506, and based on the detection timing of the synchronization code, partitions the reproduction signal into sectors with an address, and extracts the address information and outputs it to the position information record control portion 508.

If the address information that is input from the formatter 507 has reached the target address for recording the pre-mark position information, the position information record control portion 508 creates a recording signal for recording the pre-mark position information from the pre-mark position information that is held in the memory 500 and outputs this recording signal to the laser driver 509. The position information record control portion 508 also creates a position information detection gate signal that indicates the period for recording the pre-mark position information, and outputs this to the digital signal processor 506 and the servo 502. The digital signal processor 506 receives the gate signal and stops the phase error tracking operation of the PLL circuit, locking the current clock frequency (or controls the gain of the reflected light so that the clock signal can be stably extracted by the PLL circuit regardless of whether a recording laser or a reproduction laser is emitted). The servo 502 receives the gate signal and changes the analog signal gain for tracking so that the tracking servo can be stably controlled regardless of whether the laser is at the reproduction power or the recording power.

The laser driver 509 receives the position information recording signal from the position information record control portion 508, and creates a multi-pulsed column (or rectangular pulse) by intermittently switching the laser power during the period that the laser is emitted at the recording power. By doing this it creates a laser power control signal, and controls the flow of current to the laser in accordance with this laser power control signal.

The optical head 501 receives current control from the laser driver, and controls the current that is applied to the laser to irradiate the reflective layer of the disc with the laser. Thus, the recording layer, which is focused, is irradiated with a laser at the recording power.

However, since the recording film of the reflective layer is constituted by a metal film such as high-melting point aluminum or silver (unlikely for thermal reaction to occur), irradiation with a laser at the recording power does not affect the reflective layer. This laser emission, however, does affect the writing layer, which is formed behind or in front of the reflective layer. In other words, if the writing layer is in front of the reflective layer, then the writing layer is irradiated with a defocused laser, and if the writing layer is behind the reflective layer, then the writing layer is irradiated with transmissible light that passes through the reflective layer.

Irradiation with the laser at the recording level is ordinarily kept at a power that is equal to or greater than the laser power for recording information to write-once media. Thus, whether the laser is defocused or transmissible with respect to the writing layer, the reflectance of the recording layer of the writing layer changes and a mark is written only in sections of the writing layer that are irradiated by the laser.

The operation of this pre-mark position recording device is described next.

Figure 8:
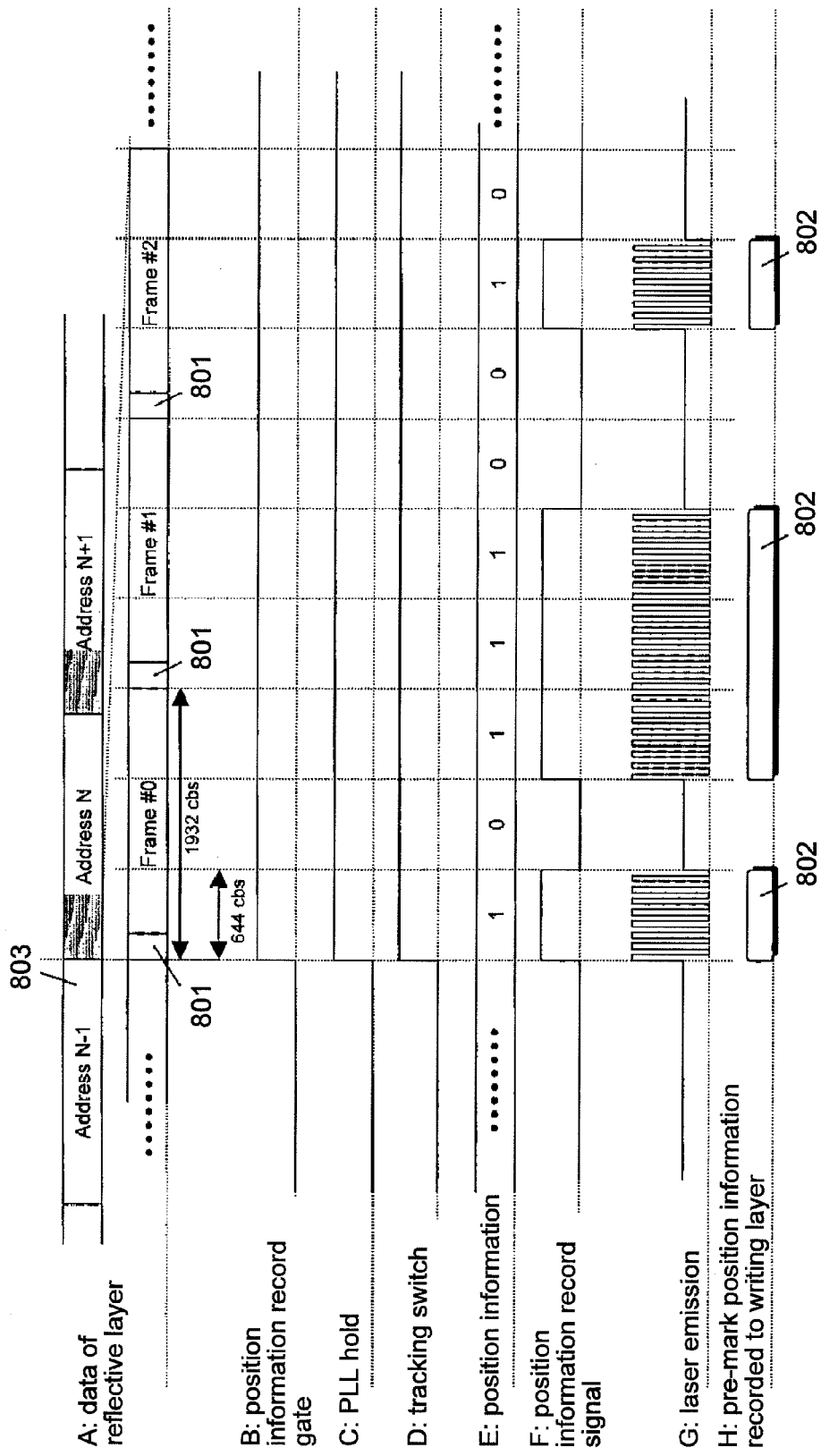
FIG. 8 is a timing chart that shows the operation of the pre-mark position recording device according to the first embodiment.

FIG. 8 is a timing chart that shows the characteristic operation of the pre-mark recording device (FIG. 7).

First, the optical head 501 irradiates the laser at the reproduction power onto the reflective layer of the disc, and creates an analog reproduction signal from the reflected light. The AD 505 converts the analog reproduction signal into a multi-value digital signal, and this is binarized into a binary reproduction signal by the digital signal processor 506, which also creates a clock signal that is in synchronization with the reproduction signal.

The formatter 507 detects the synchronization code that is added at a fixed spacing from the binary reproduction signal from the digital signal processor 506, partitions the signal into sector 803 units each recording address information (FIG. 8A), and selects the start position for a target address for recording the pre-mark position information. The target address can be any address chosen in advance, except for radial positions at which a pre-mark is already recorded.

When the start position of the sector with the target address is detected from the reproduction signal that is obtained from the reflective layer, the position information record control portion 508 outputs an internal position information recording signal (FIG. 8B) at the H level that indicates the period during which the position information is recorded, and to the digital signal processor 506 a PLL hold signal (FIG. 8C) for holding the frequency of the output clock from the PLL circuit is output. At the same time, it creates a tracking switch signal (FIG. 8D) and outputs this to the servo 502. The tracking switch signal (FIG. 8D), which is for the servo 502 performing tracking control, is used for switching the degree of amplification of the analog signal depending on whether the laser is to be emitted at the recording power or the reproduction power, based on the signal that is obtained by amplifying the analog reproduction signal from the head 501. It should be noted that ordinarily, unless the degree of signal amplification is changed, tracking control cannot be stably carried out, due to such factors as the gain being too low at the reproduction power or the gain being too large at the recording power and exceeding the range.

The position information record control portion 508 retrieves and records the position information (FIG. 8E) from the memory 500 one bit at a time during the period that the position information record gate (FIG. 8B), which is output during the period for recording position information, is H.

In this embodiment, when the target disc is a Blu-ray Disc, the frames (=1932 channel bits) having the synchronization code 501 within the sector of the position information record target address are partitioned into three equal segments (644 channel bits) and one bit of position information is recorded in the period of the 644 channel bits. In other words, in this embodiment, by recording position information in synchronization with the frame period, it is possible to record position information in synchronization with the sector structure of the recording marks of the reflective layer. Thus, position information can be recorded without inserting synchronization code for recording the position information, for example, (with hardly any additional circuitry).

The position information record control portion 508 receives the position information that is recorded one bit at a time in 644-channel bit units from the memory 500, and creates a position information recording signal (FIG. 8F) that is H level only in those sections where the recorded position information is 1, and outputs this to the laser driver 509.

The laser driver 509 creates a laser emission control pulse such that during the period that the position information record gate (FIG. 8B) is H, the laser is emitted at the reproduction power if the position information recording signal (FIG. 8F) is L, whereas the laser becomes a multi-pulsed output in which the laser power is intermittently switched when the position information recording signal (FIG. 8F) is H. In accordance with this laser emission control pulse, the laser driver 509 creates a laser emission pulse (FIG. 8G) in which the laser power is switched by changing the amount of current that flows to the laser, and irradiates the reflective layer of the disc.

Thus, position information is recorded by changing the reflectance of the writing layer, which is formed behind or in front of the reflective layer, only during the period in which the multi-pulse is irradiated.

Figure 9:
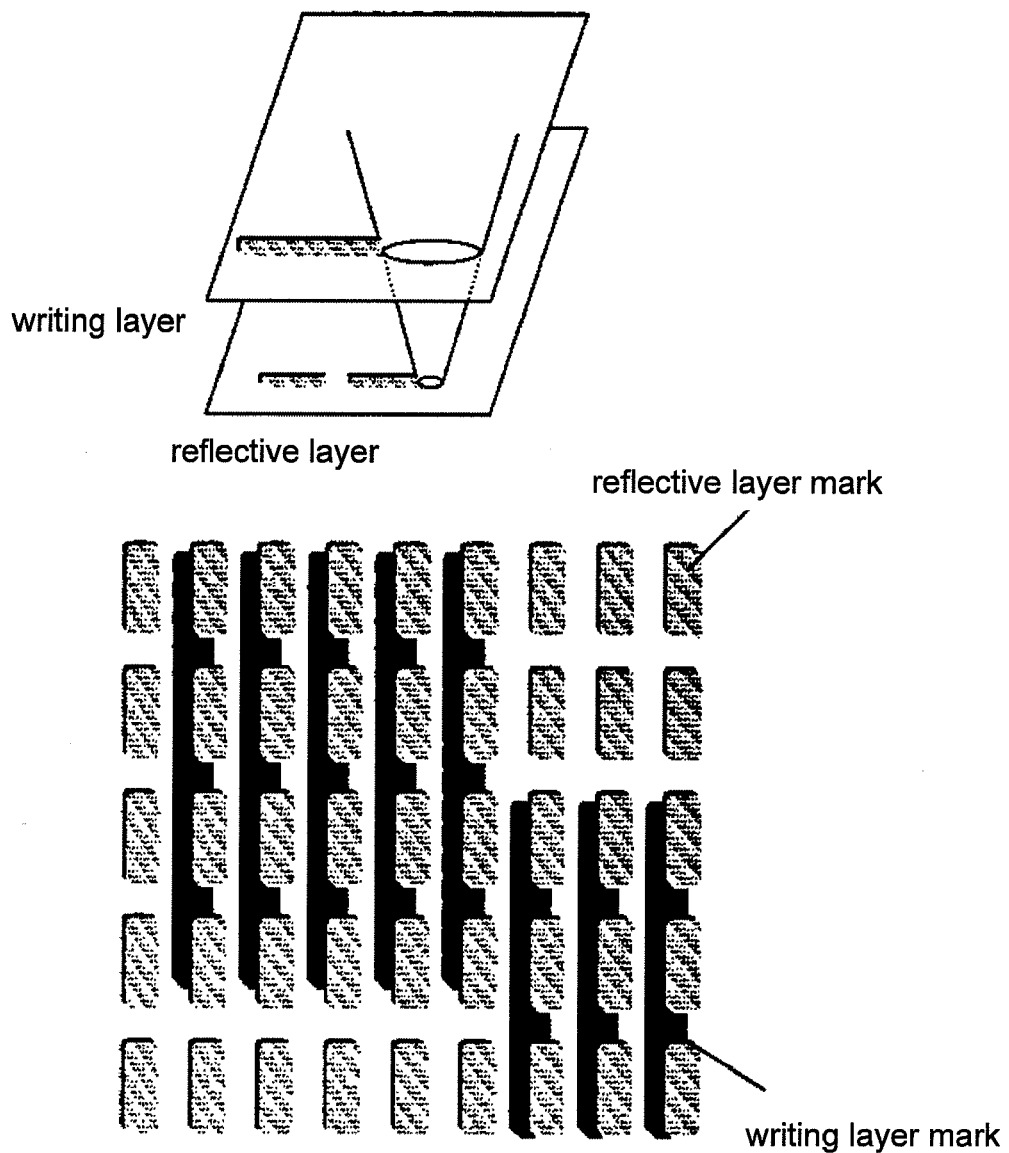
FIG. 9 is a conceptual diagram of the pre-mark position recording device according to the first embodiment, and illustrates an implementation of recording to the writing layer by irradiating the recording laser shifted off the focal position.

FIG. 9 is a conceptual diagram of a first position recording device for irradiating, with a single head, the reflective layer with a recording laser while focusing, with respect to a disc that has a writing layer that is in front of the reflective layer. With this device, the laser beam is focused onto the reflective layer, which is behind the writing layer, and tracking control is performed based on the recording marks of the reflective layer. When the laser spot arrives at a sector with the target address for recording position information, the recording laser for recording position information is emitted. The writing layer receives the defocused recording laser and the reflectance of the section of the writing layer that receives the irradiated light changes, recording the position information.

In this case, since the recording marks of the reflective layer is irradiated with the laser at the recording power, an ordinary reproduction signal is not obtained and it may not be possible for the PLL circuit of the digital signal processor 506 to create the clock. Thus, control is performed for recording onto the writing layer by holding the frequency of the clock signal when the reproduction laser is irradiated.

In order to record to the writing layer in a defocused state with this first position information recording device, the space between the writing layer and the reflective layer must be made as short as possible in order to reduce defocusing on the writing layer. This point is described in detail with reference to FIG. 10 and FIG. 11.

Figure 10:
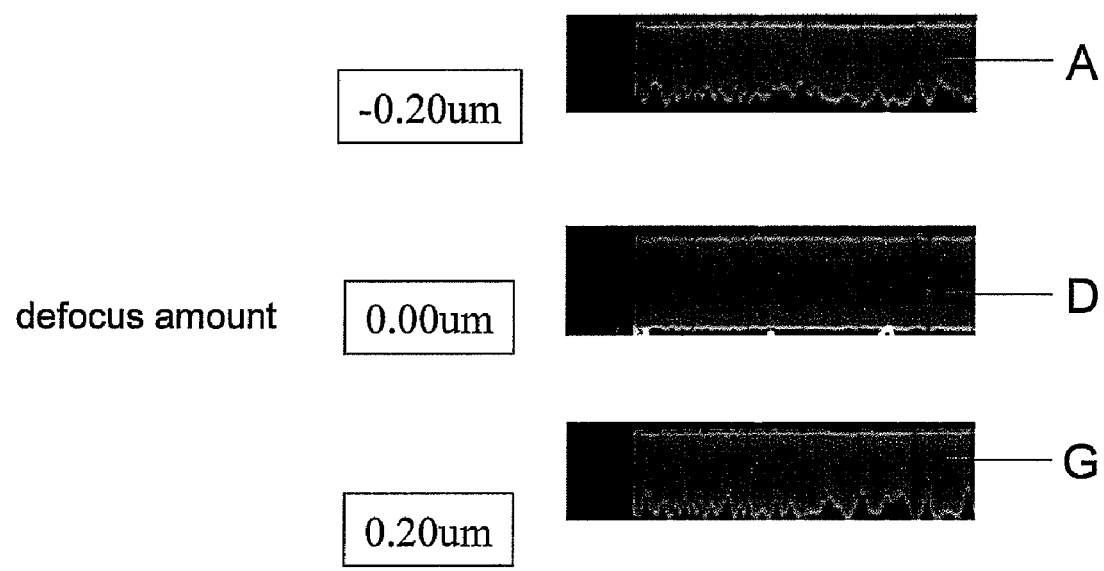
FIG. 10 is a diagram that shows the reproduction waveform in a state where the focal position has been shifted on the optical disc.

FIG. 10 is the reproduction waveform when a Blu-ray recordable medium is used and the recording laser beam is intentionally shifted off of the focal position when recording. D is the reproduction waveform when recording at the normal focus position, A is the reproduction waveform when recording with the focal point shifted −0.2 μm with respect to the normal focus position, and G is the reproduction waveform when recording with the focal point shifted +0.2 μm with respect to the normal focus position. From this test it can be understood that although the reproduction quality drops when the spot of the focus is changed, each one of A, D, and G has its own amplitude, and a recording mark that causes a change in the reflectance is formed in the recording film. Thus, as illustrated in FIG. 9, if the reflective layer is irradiated with the recording laser with the focal point lined up with the reflective layer, a recording mark is formed by a defocused recording laser on the writing layer, which has been formed at a certain fixed spacing from the reflective layer.

Figure 11:
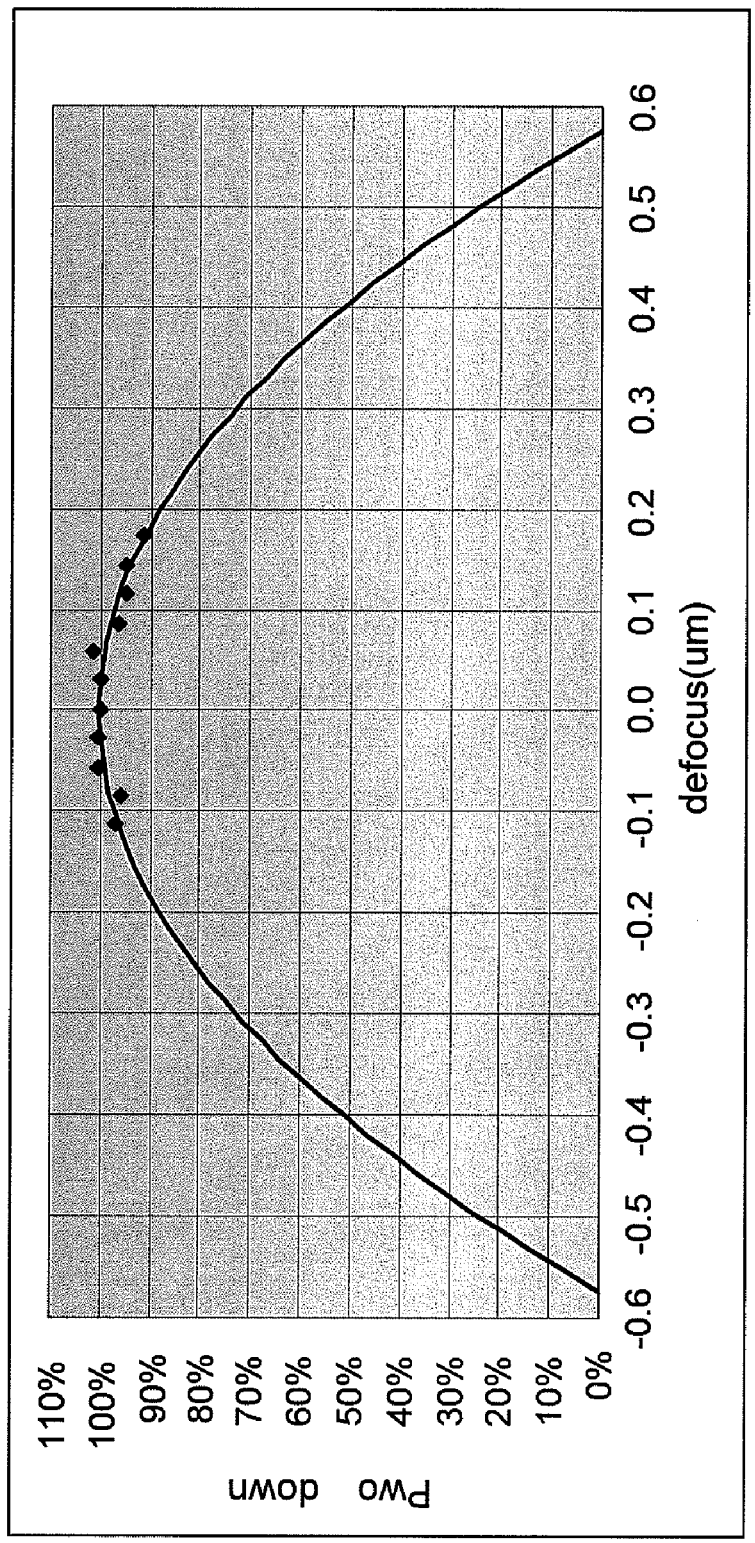
FIG. 11 is a graph that shows the relationship between the focal position shift and the percent drop in recording power with the optical disc.

FIG. 11 is a graph that shows the result of a simulation with a Blu-ray recordable medium, in which the horizontal axis is the amount of shift in the focal position and the vertical axis is the percent drop in recording power due to shift in the focus position. According to this graph, a ±0.4 μm focal position shift is substantially equivalent to the reproduction accuracy when the recording power is dropped by 50%. Of course, when the recording power is 0% it is not possible to form recording marks, and from the result of this simulation, this corresponds to focal position shift on the order of ±0.56 μm. Thus, with Blu-ray recordable media, when the focal position is shifted by ±0.56 μm, the intensity of the recording laser that is emitted corresponds to 0% and thus a recording mark cannot be formed. This means that unless the distance between the reflective layer and the writing layer shown in FIG. 9 is under 0.56 μm, then recording marks cannot be formed in the recording layer when the recording laser is focused on the reflective layer. Further, when λ is the wavelength of the recording laser and NA is the numerical aperture of the optical system that emits the light, a distance of 0.56 μm or less between the recording layer and the reflective layer is substantially equivalent to keeping this relationship at or below $\lambda/(NA^2)$.

As described above, the marks 802 that records position information and that are formed in the writing layer, ordinarily differ from the marks that are recorded to write-once media in the following ways.

Firstly, the marks 802 of the writing layer are not formed by a laser beam that is focused on the writing layer but rather by a laser beam that is focused on the reflective layer, which is either in front of or behind the reflective layer. In other words, recording to the writing layer occurs by a defocused laser whose focal point has been shifted, or by transmissible light that has passed through the reflective layer. Thus, ordinarily, the precision of the signal that is reproduced is worse than marks that are recorded to write-once media.

Secondly, the clock for recording the recording marks to the writing layer occurs in synchronization with the PLL clock that is extracted from the uneven marks of the reflective layer, which is formed in front of or behind the writing layer. It should be noted that with ordinary write-once media, the clock is extracted and recorded from a wobble track.

Thirdly, tracking control for recording the recording marks of the writing layer takes place according to the uneven recording marks of the reflective layer, which is formed in front or behind the writing layer. With ordinary write-once media, tracking control occurs based on a track that is formed on the disc surface in advance.

Due to these advantages, the writing layer of this disc does not have tracks, and only intermittently has mark information in which position information is recorded. Thus, at the very least, it is not possible to perform tracking control in sections with no marks in which position information is recorded. Further, it is difficult to perform tracking control even in sections with marks in which position information is recorded, if the period for recording one bit of position information is set longer than the period over which tracking control is applied. If tracking control cannot be applied to the writing layer, it is not possible to directly reproduce the writing layer and to create an illegal disc copy based on that reproduction signal.

A second position information recording device for disc manufacturing step 4 that has a different structure than the foregoing structure is described next.

Figure 12:
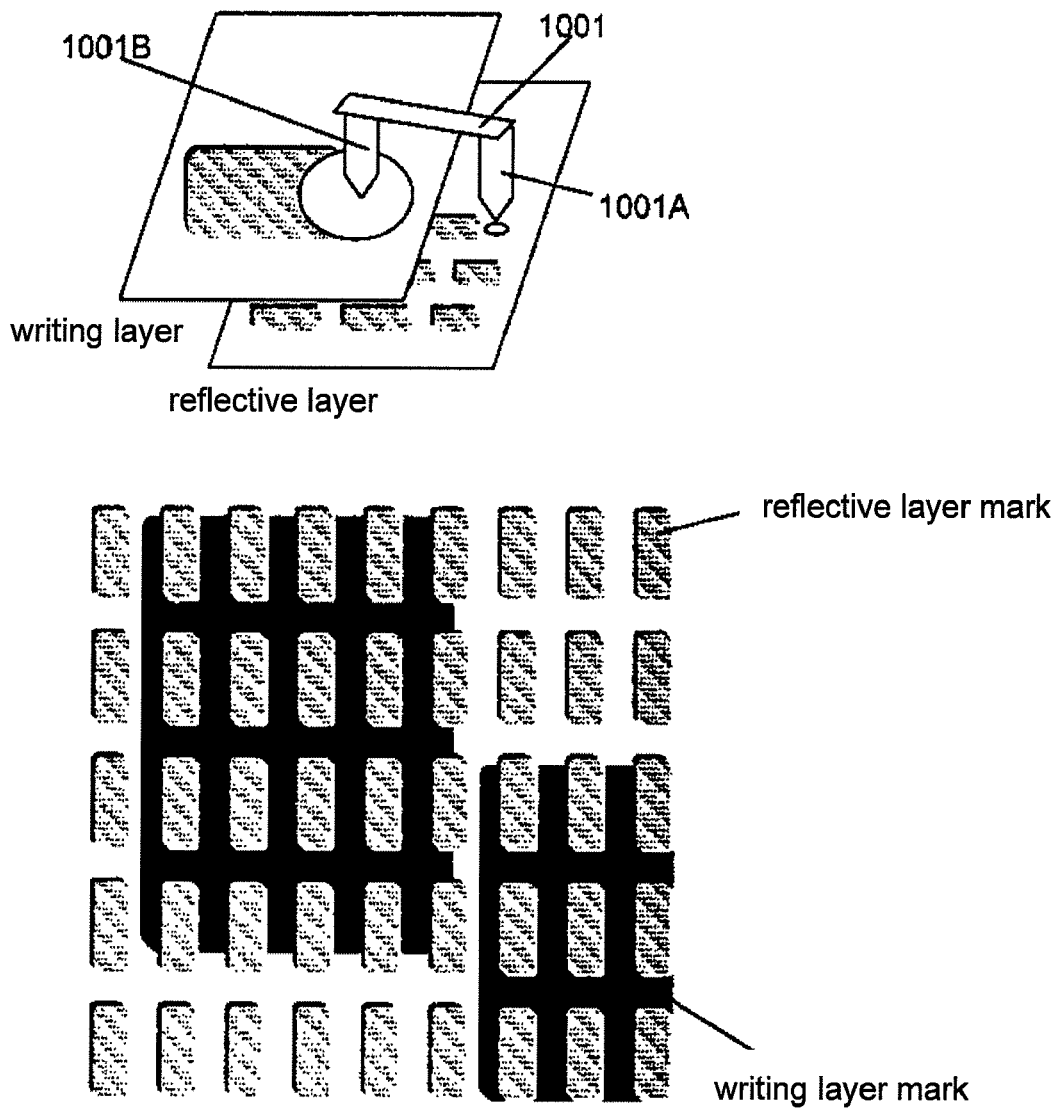
FIG. 12 is a conceptual diagram of the pre-mark position recording device according to the first embodiment, and shows an implementation in which there are two optical heads.

As shown in FIG. 12, the second position information recording device is characterized in that it has two heads, one for reproducing the reflective layer and one for recording to the writing layer. In this regard, the second position information recording device differs from the first position information recording device, which records position information to the writing layer using the same optical head as that for creating recording marks from the reflective layer and forming recording marks in the writing layer.

Figure 13:
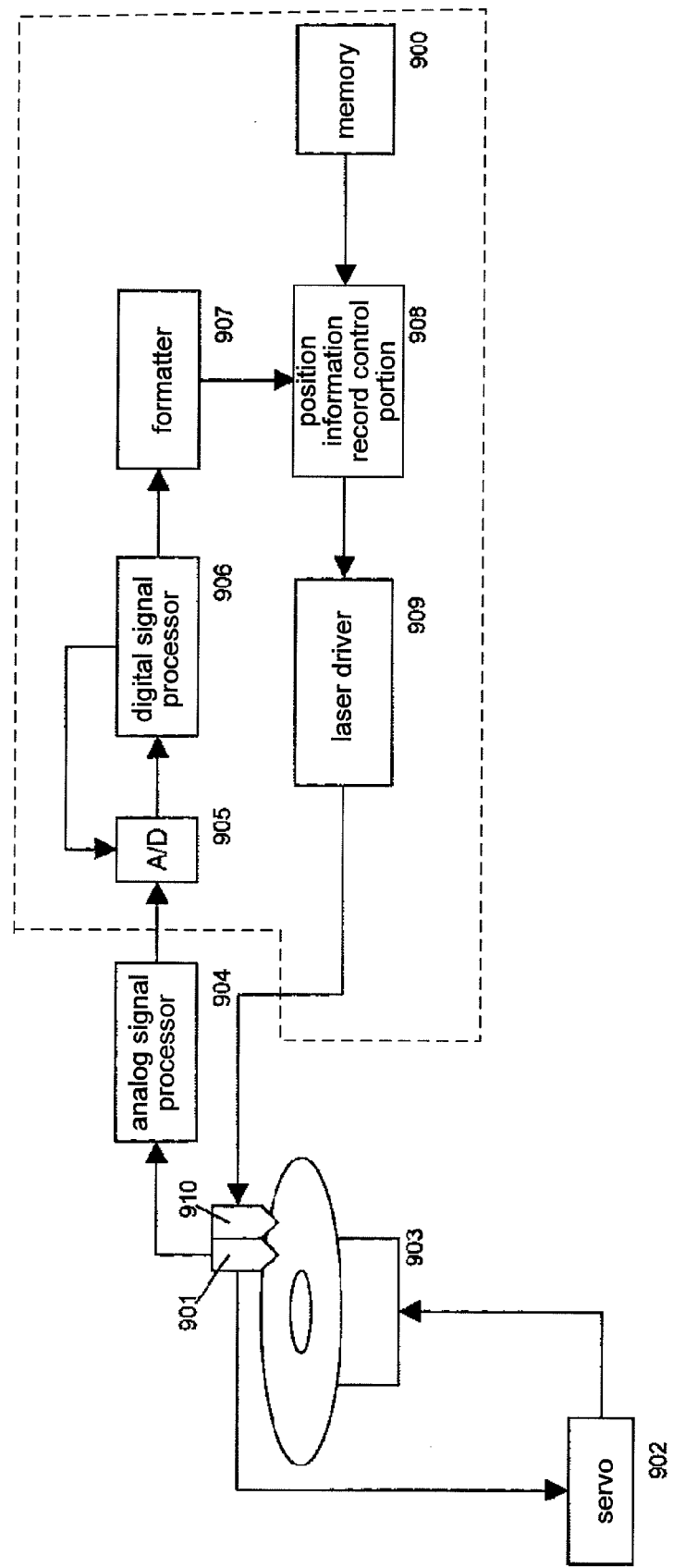
FIG. 13 is a block diagram that shows the configuration of a pre-mark position information recording device that has two optical heads, according to the first embodiment.

FIG. 13 is a block diagram that shows the characteristic configuration of the second position information recording device of disc manufacturing step 4 (FIG. 2). It should be noted that the dotted line in the drawing indicates the scope of the LSI chip.

The position information recording device is made from a memory 900, a reproducing head 901, a servo 902, a spindle motor 903, an analog signal processor 904, an AD 905, a digital signal processor 906, a formatter 907, a position information record control portion 908, a laser driver 909, and a recording head 910.

First, the reproducing head 901 irradiates the reflective layer of the disc with a laser at the reproduction power, creating an analog reproduction signal based on the intensity of the light that is reflected, and outputs an analog signal for tracking control to the servo 902 and outputs an analog reproduction signal for reproducing the recorded data from the uneven marks of the reflective layer to the analog signal processor 904.

The servo 902 performs tracking control focusing on the recording marks of the reflective layer, based on the analog reproduction signal from the reproducing head 901. It also creates a disc rotation control signal and outputs this to the spindle motor 903.

The spindle motor 903 controls the rotational velocity based on the revolution control signal from the servo 902. In this implementation, the spindle motor 903 performs CLV (constant linear velocity) control so as to maintain a fixed rpm in the circumferential direction.

The analog signal processor 904 shapes analog reproduction signal from the reproducing head 901 by amplification and waveform equalization, and outputs the result of this shaping to the AD 905.

The AD 905 is a general analog-digital converter for converting analog signals into digital signals, and samples the analog signal that is input with a clock signal and creates a multi-value digital signal that indicates the level of the analog signal, and outputs the result to the digital signal processor 906.

The digital signal processor 906 extracts the clock signal from the multi-value digital signal with an internal PLL circuit, based on the multi-value digital signal that is input, and outputs the result to the AD 905. It should be noted that the clock signal that is extracted is used for sampling the analog signal with the AD 905. The digital signal processor 906 binarizes the multi-value digital signal that has been input in synchronization with the clock that is extracted, and outputs a binary digital signal to the formatter 907.

The formatter 907 detects the synchronization code, which is added at a fixed interval, from the binary digital signal that is input, and in synchronization with the timing at which the synchronization code is detected, partitions the binary digital signal into sectors units that have address information. The formatter 907 then extracts the address information and outputs that address information to the position information record control portion 908.

The position information record control portion 908 creates a timing for recording the position information of the pre-mark based on the address information that is input. If the address information is the target address to record the position information, then the position information record control portion creates a position information recording gate signal from the head position of the sector to which the address information has been added. Based on the position information record gate that is created, the position information record control portion 908 retrieves the position information to be recorded from the memory 900 one bit at a time and creates a position information recording signal, which it then outputs to the laser driver 909.

The laser driver 909 determines the power of the laser for the writing layer to be irradiated with, based on the position information recording signal that is input, and controls the value of the current that flows to the laser of the recording head 910.

The recording head 910 increases/decreases the power of the laser in accordance with the current value under the control of the laser driver 909 and irradiates the writing layer with the laser, forming recording marks in the writing layer and recording the pre-mark position information held in the memory 900 to the writing layer with those recording marks.

Thus, with the second position information recording device, the reproducing head 901 is always focused on the reflective layer and the reproducing head 910 is always focused on the writing layer, and both the reproducing head 901 and the recording head 910 are ideally fixed in their location such that their laser spot stays at the same radial position, and the reproducing head 901 obtains the reproduction signals for tracking control and for clock extraction. Thus, unlike the first position information recording device, it is not necessary to perform the operation for jumping between layers, maintaining tracking control, and maintaining the PLL clock frequency when recording to the writing layer, and this simplifies the procedure for recording position information. However, the major feature of the second position information recording device is that the reproducing head 901 and the recording head 902 are situated on substantially the same track.

Accordingly, an implementation that allows the second position information recording device to be further simplified in its structure will be described.

FIG. 12 is a conceptual diagram of the second position information recording device according to this embodiment.

A head 1001 of this second position information recording device is made from a reproducing head 1001A for reproducing the uneven marks that are formed in the reflective layer, and a recording head 1001B for recording position information by the writing layer with a recording laser. These two heads are disposed with a fixed positional relationship between them so as to irradiate substantially the same radial position with their lasers.

The reproducing head 1001A irradiates the uneven marks of the reflective layer with the reproduction laser, and based on the analog reproduction signal that is obtained from the reflected light, performs tracking control and reproduces the information with an extracted clock signal with the same frequency as the analog reproduction signal. The recording head 1001B does not perform tracking control, and performs focus control only. If address information that has been extracted from the reproduction signal that is reproduced by the reproducing head 1001A is the target address for recording the position information, then the recording head 1001B emits the recording laser to create a recording mark in the writing layer and thereby record the position information.

However, as mentioned above, in this embodiment if the positional relationship between the reproducing head 1001A and the recording head 1001B is different in each drive in which those heads are mounted, then the positional relationship between the recording mark of the writing layer and the mark position of the reflective layer causes a unique position shift to occur in the head position, and it becomes difficult to ensure the reproduction of the position information from the writing layer with either head. Thus, in this embodiment, the marks that are formed in the writing layer posses a width on the order of a plurality of tracks of uneven recording marks in the reflective layer. Thus, even if there is minor shifting between the positions of the two heads in each drive, it will still be possible to reproduce the recording marks from the writing layer in the same way regardless of the drive.

In order to achieve this, it is possible to adopt the recording film of a Blu-ray disc for the reflective layer and the recording film of a CD-R for the writing layer, and a Blu-ray disc reproducing head can be used for the reproducing head and a CD-R reproducing head can be employed for the recording head. In the CD-R standard the CD-R track pitch is 1.6 μm, and the Blu-ray disc track pitch is 0.32 μm, and thus using these it is possible to form writing layer marks that have a width equal to approximately five tracks of reflective layer marks, and thus the positional shift between the two heads can be allowed within a pitch of two tracks of the reflective layer (in the case of Blu-ray discs, approximately 0.64 μm), and the device can be manufactured with ease even with such heads.

4. Reproducing Device

The reproducing device for the optical disc that is manufactured by the optical disc manufacturing procedure is described next.

Figure 14:
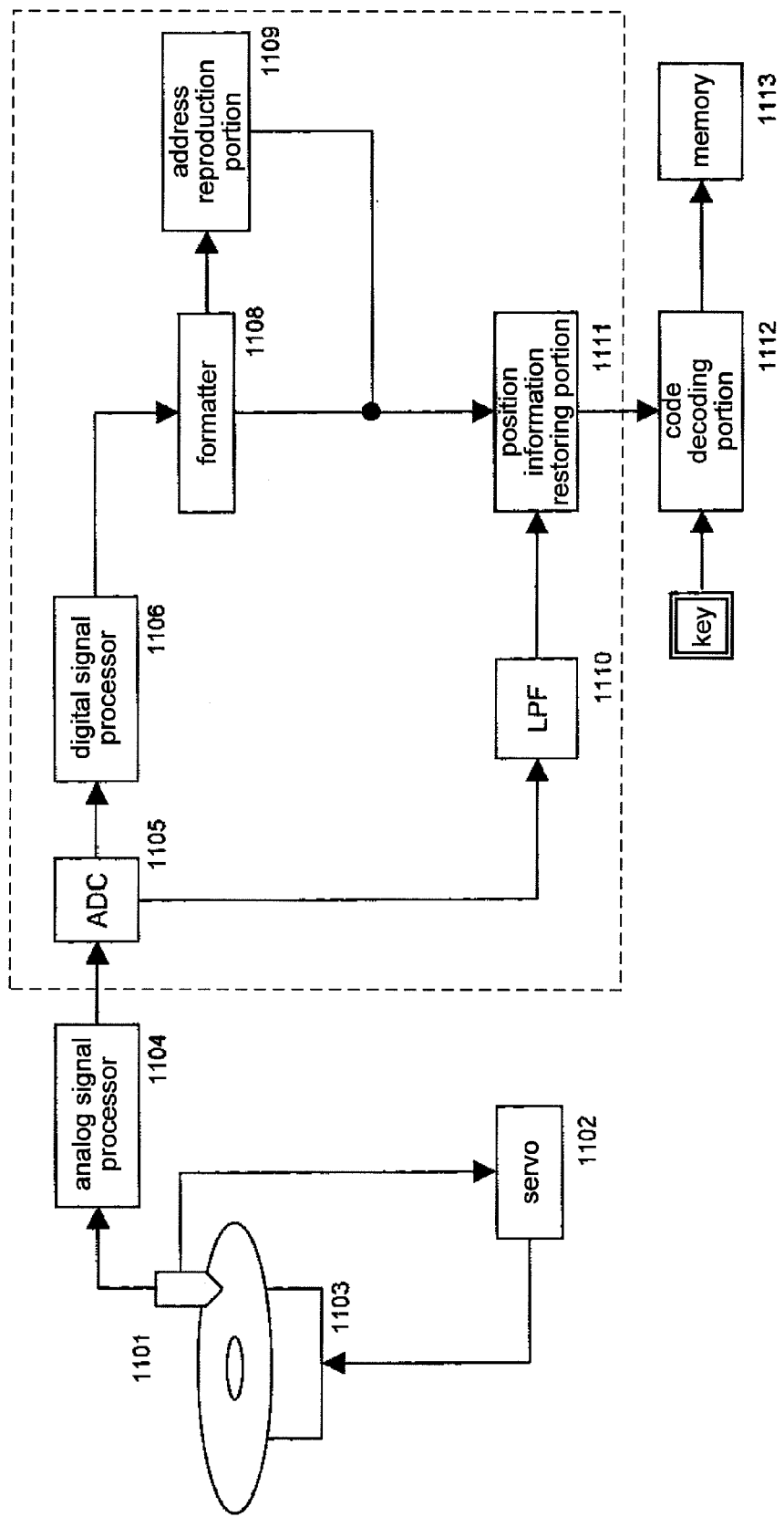
FIG. 14 is a block diagram that shows the configuration of the physical position information detection portion, during recording, of the optical disc reproducing device according to the first embodiment.

FIG. 14 is a block diagram that shows the characteristic structure of a reproducing device for an optical disc that has a reflective layer in which uneven marks are formed on a reflective film, and a writing layer in which a writing film to which information can be recorded based on a change in the reflectance of an irradiated laser is formed behind or in front of the reflective layer. It should be noted that the dotted line in the drawing indicates the scope of the LSI chip.

This optical disc reproducing device is made from a reproducing head 1101, a servo 1102, a spindle motor 1103, an analog signal processor 1104, an AD 1105, a digital signal processor 1106, a formatter 1108, an address reproduction portion 1109, an LPF 1110, a position information restoring portion 1111, a code decoding portion 1112, and a memory 1113.

The reproducing head 1101 irradiates the reflective layer of the disc, in which uneven marks are formed, with a reproduction laser and from the light that is reflected creates an analog reproduction signal for tracking control and an analog signal for data reproduction, and outputs the analog signal for tracking control to the servo 1102 and outputs the analog signal for data reproduction to the analog signal processor 1104.

The servo 1102 performs tracking control to keep the reproducing head in the center of recording marks of the reflective layer.

The spindle motor 1103 rotates the disc, performing CLV control for keeping the scanning velocity in the circumferential direction of the disc constant over all radial positions.

The analog signal processor 1104 shapes the analog reproduction signal from the reproducing head 1101 by amplification and waveform equalization, and outputs the shaped analog signal to the AD 1105.

The AD 1105 samples the analog signal that is input with the clock signal to create a multi-value digital signal, and outputs this to the digital signal processor and the LPF 1110.

The digital signal processor 1106 has an internal PLL circuit, and extracts the clock signal from the multi-value reproduction signal that is input from the AD 1105 and outputs this to the AD 1105. The digital signal processor 1106 also binarizes the multi-value digital signal based on the extracted clock and outputs the binary digital reproduction signal to the formatter 1108.

It should be noted that the clock that is extracted by the digital signal processor is the clock that is used for sampling by the AD 1105.

The formatter 1108 detects the synchronization code that is added at a fixed interval from the binary reproduction signal that is input, and in synchronization with the timing at which the synchronization code is detected, partitions the reproduction signal into sectors, which is smallest unit that includes address information, and outputs this to address reproduction portion 1109.

The address reproduction portion 1109 extracts the error correction encoded address from the reproduction signal that has been partitioned into sectors and input, and after performing error correction of the address information, outputs the address information to the position information restoring portion 1111.

The LPF 1110 is a general low-pass filter that removes the high-frequency band signals of multi-value digital reproduction signal from the AD 1105, and outputs the resulting signals to the position information restoring portion 1111.

It should be noted that the band limit of the filter is set so that the filter can extract frequency band components that in real terms are lower than the frequency band that is determined by the maximum bit length, of the modulation that is adopted for the recording layer recording marks.

The position information restoring portion 1111 is a section for detecting recording marks that have been recorded to the writing layer, from the address information that is input and the reproduction signal subjected to band restriction. The position information restoring portion 1111 determines whether or not recording marks are present on the writing layer within a fixed range (in this embodiment, 644 channel bits for a Blu-ray disc) from changes in the modulation properties of the reproduction signal due to the recording marks of the writing layer, which is formed behind or in front of the reflective layer, when the uneven recording marks of the reflective layer are reproduced, and reproduces the encoded position information.

Figure 15:
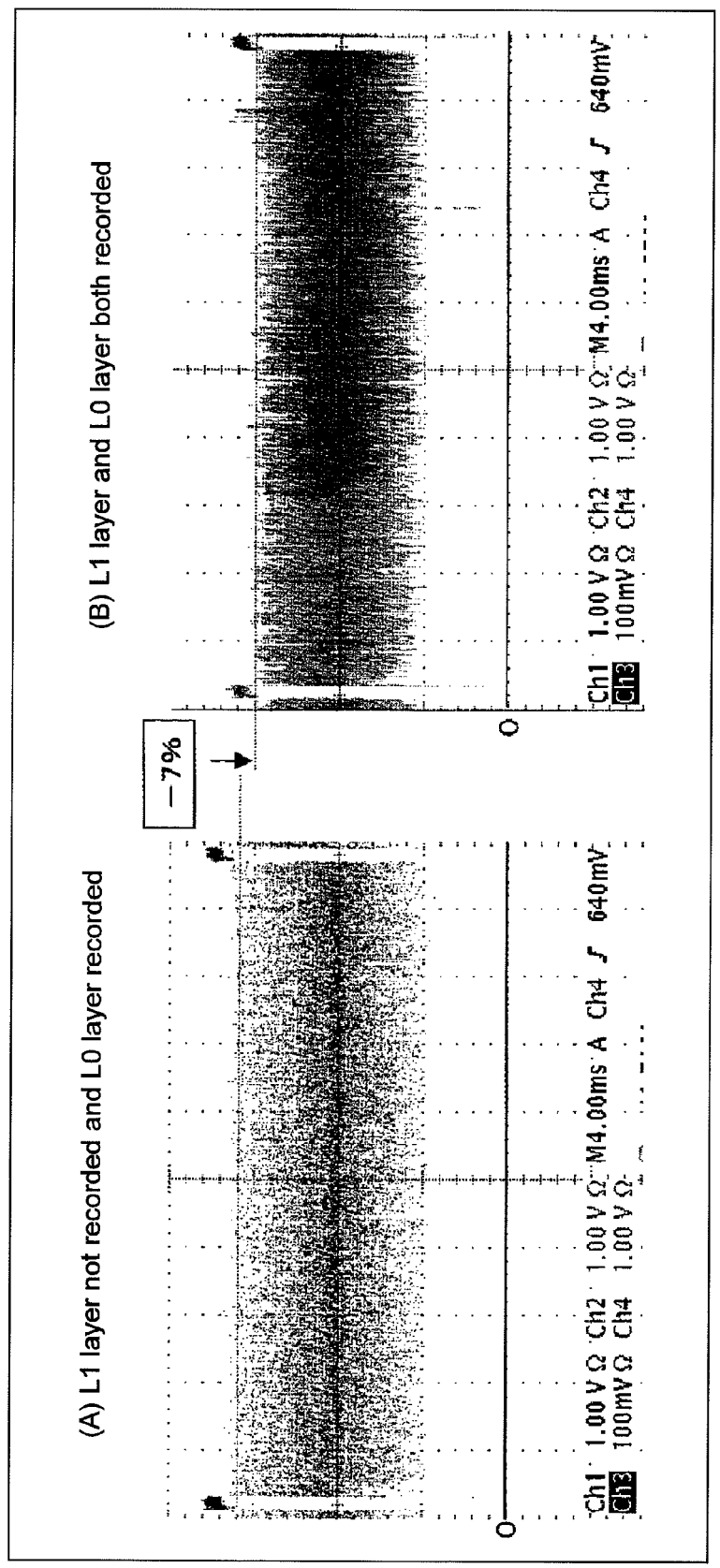
FIG. 15 is a diagram that shows experimental data that illustrate the change in the modulation properties during reproduction in the first embodiment.

FIG. 15 shows the reproduction waveforms of a two-layer medium made of a writing layer and a reflective layer, and FIG. 15A is the reproduction waveform of the L0 layer when the L1 layer has not been recorded and the L0 layer has been recorded, and FIG. 15B is the reproduction waveform of the L0 layer when both the L1 layer and the L0 layer have been recorded. These results indicate that the upper amplitude of the reproduction waveform changes by about 7% between when the writing layer has recording marks (the reflectance of the writing layer drops) and when the recording layer does not have recording marks (the reflectance of the writing layer does not change). The position information restoring portion 1111 restores the position information that has been recorded to the writing layer, based on the change in the upper amplitude of the reproduction waveform. The encoded position information that has been restored is then output to the code decoding portion 1112.

The code decoding portion 1112 is a section for extracting the position information by decoding the encoded position information that is input with an internal decoding key. The code decoding portion 1112 is the portion for decoding the code algorithm that corresponds to the encoding portion of the disc manufacturing procedure (FIG. 2), and the code decoding portion 1112 uses the secret key that it secretly contains, both in the case of a public key code algorithm and a secret key code algorithm, in order to decode the encoded position information that is input, and outputs the result to the memory 1113.

The memory 1113 stores the position information that is input.

The operation of the position information reproducing device is described next.

Figure 16:
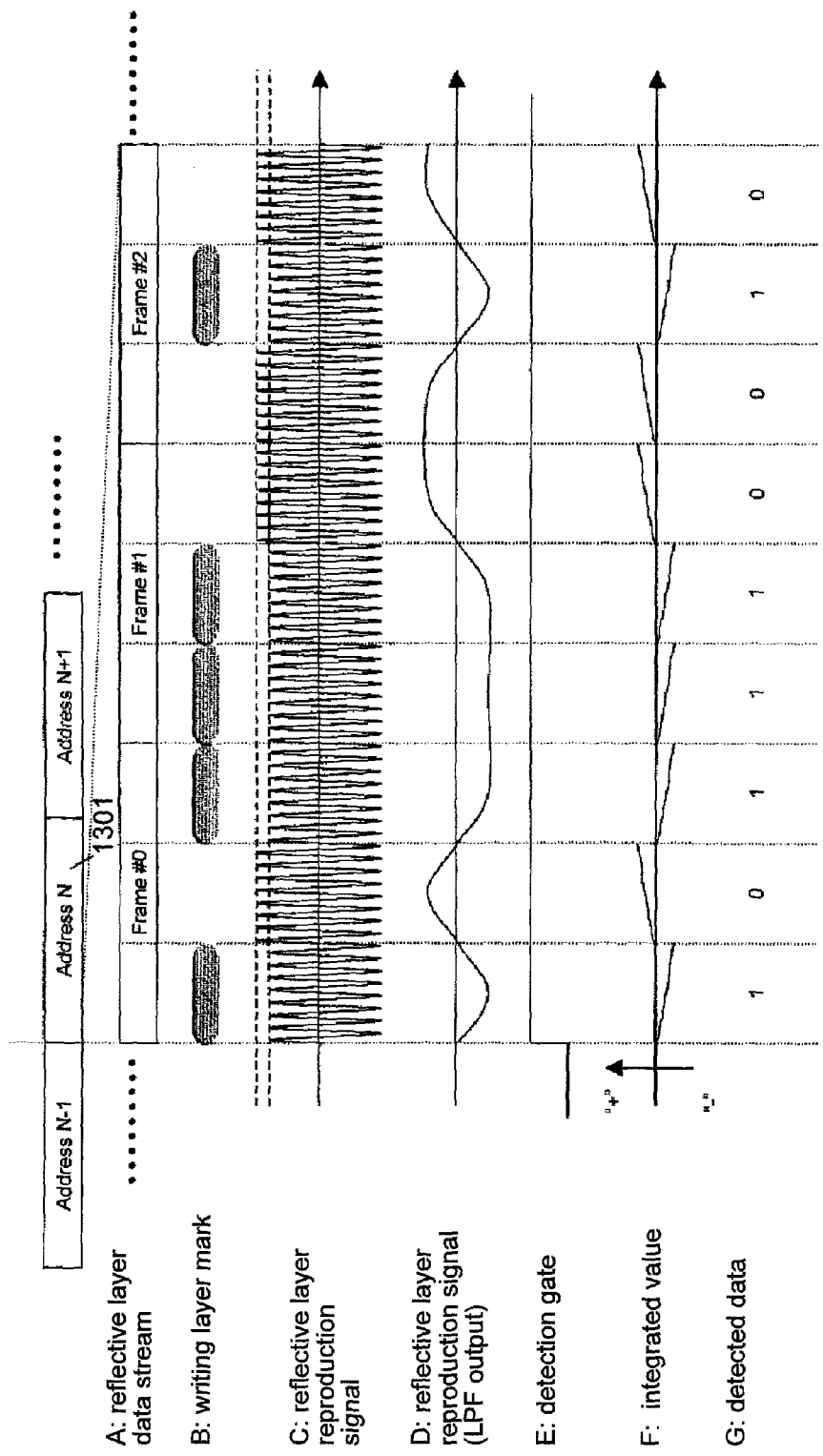
FIG. 16 is a timing chart showing the operation of the physical position information detection portion, during recording, of the optical disc reproducing device according to the first embodiment.

FIG. 16 is a timing chart that shows the characteristic operation of the position information reproducing device.

First, the position information reproducing device reproduces the uneven marks that are formed in the reflective layer. The analog reproduction signal that is reproduced from the reflective layer is sampled based on the clock that is extracted by the digital signal processor 1106, quantized, and binarized into a multi-value digital signal, and then output to the formatter 1108. The formatter 1108 detects the synchronization code that has been added at a fixed interval from the binary reproduction signal that is input, and in synchronization with the timing at which the synchronization code is detected, partitions the reproduction signal into sectors with address information, and outputs it to the address reproduction portion 1109. The address reproduction portion 1109 reproduces the address information in sector units that are obtained by partitioning by the formatter. Thus, like in FIG. 15A, the data that are reproduced from the reflective layer are partitioned into sectors with an address, and the sectors are partitioned into frame units that have synchronization code. In this embodiment, the target address for reproducing the position information will be described as N. Thus, the recording marks of the writing layer are detected in frame units within a sector 1301 that has an address N.

This embodiment illustrates an implementation in which three bits of position information are recorded by the recording marks (FIG. 16B) of the writing layer in a single frame.

The upper amplitude of the analog reproduction signal of the reflective layer (FIG. 16C) when reproducing the uneven recording marks of the reflective layer, which is formed in front of or behind the writing layer, fluctuates in a region where recording marks are recorded to the writing layer. This reflective layer reproduction signal (FIG. 16C) is output to the LPF 1110.

The LPF 1110 is a low pass filter for extracting only the low pass components of the analog signal that is input, and outputs a reflective layer reproduction signal from which only the low pass components have been extracted (FIG. 16D). It should be noted that the band limit of the filter is set so that the filter can extract frequency band components that in practice are lower than the frequency band that is determined by the maximum bit length, of the modulation that is adopted for the recording layer recording marks. It should be noted that in this embodiment, since the recording marks of the writing layer are formed in a one-bit cycle per 644 channel units of the Blu-ray disc, if reproducing at 1× line speed, then it is effective to use a cut-off frequency of about 100 KHz (the 1× channel rate of a Blu-ray disc is 66 MHz).

The position information restoring portion 1111 creates a position information detection gate (FIG. 16E) from the head of the target address for reproducing the position information of the writing layer, based on the address information of each sector that is extracted with the address reproduction portion 1109. The position detection gate (FIG. 16E) is kept at H until the reproduction of position information is complete.

The position information restoring portion 1111 integrates the reproduction signal from which only the low pass components have been extracted from the LPF 1110 during the period that the detection gate (FIG. 16E) is H and in which one bit of position information is recorded (in this embodiment, a 644 channel bit interval). Possible integration methods include the method of adding, in channel bit units, the LPF output values themselves in the period that one bit of position information is recorded, and the method of setting a +1 if the LPF output is positive and taking a −1 if the LPF output is negative. In either case, the amplitude of the reproduction signal of the reflective layer, which is in front of or behind the writing layer, drops with recording marks in the writing layer, and thus the integrated value of the LPF 1110 output is a negative value. On the other hand, the amplitude of the reflective layer reproduction signal does not change in sections where there are no marks in the writing layer, and thus the integrated value of the LPF 1110 output is a positive value (FIG. 16F). By setting the bit to 0 if the integrated value is positive and setting the bit to 1 if the integrated value is negative, the detection data that express the encoded position information (FIG. 16G) are restored.

The detection data that have been detected (FIG. 16G) are decoded by the code decoding portion 1112 and the decoded position information is stored in the memory 1113.

As described above, the position information reproducing device reproduces the uneven marks that are formed in the reflective layer, and also utilizes the change in amplitude of the reproduction signal of the uneven marks of the reflective layer to simultaneously read the recording mark information of the writing layer, which is formed behind or in front of the reflective layer, and reproduces position information from the recording marks of the writing layer. Thus, it is possible to provide a reproducing device that can simultaneously read the recording marks on the writing layer, which cannot by reproduced by ordinary reproducing devices, and the recording marks of the reflective layer.

Next, a reproducing device for reproducing pre-marks that are formed linearly in the disc radial direction in the writing layer of the disc that is manufactured through the disc manufacturing procedure is described.

Figure 17:
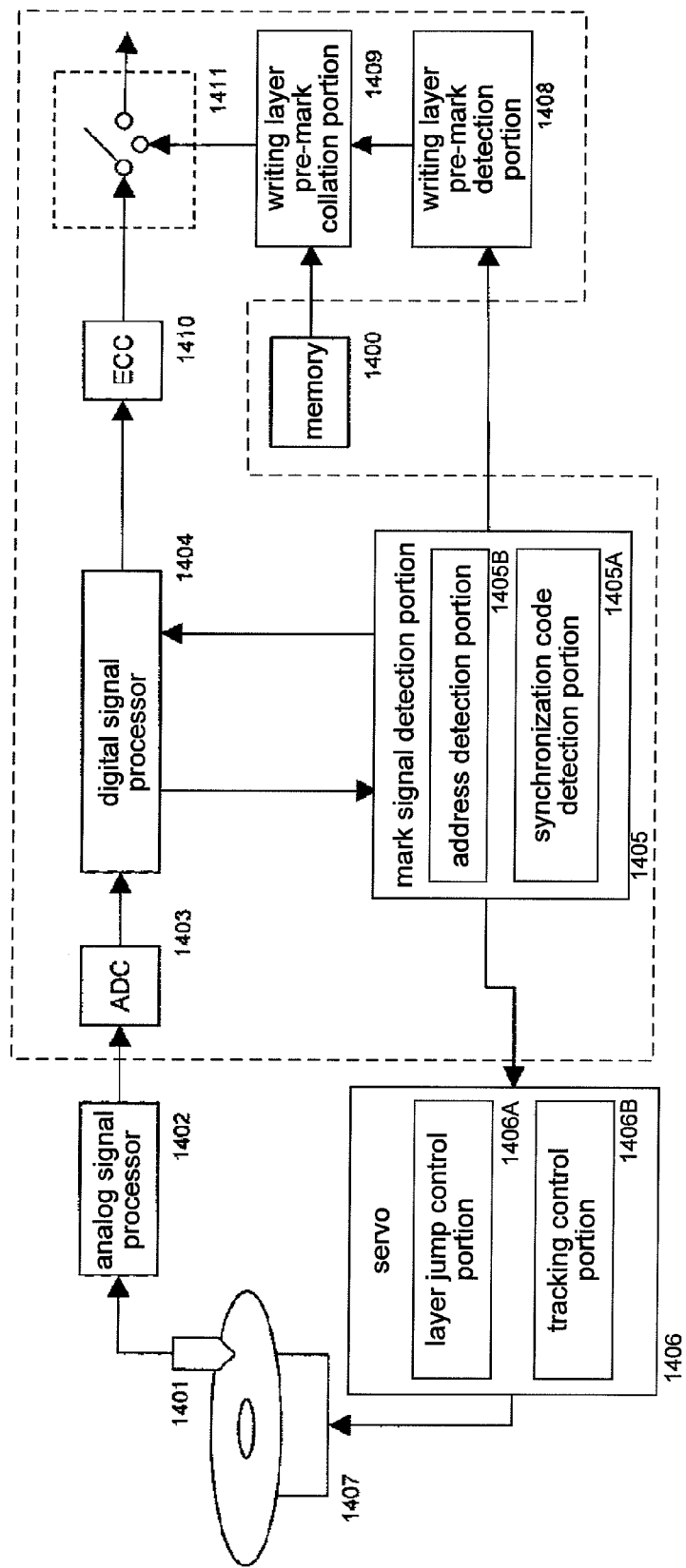
FIG. 17 is a block diagram that shows the configuration of the physical position information detection portion, during reproduction, of the optical disc reproducing device according to the first embodiment.

FIG. 17 is a block diagram that shows the characteristic configuration of an optical disc reproducing device that restricts the reproduction of the data content when the optical disc has been copied illegally. It should be noted that the dotted line in the drawing indicates the scope of the LSI chip.

As shown in FIG. 17, the optical disc reproducing device reproduces data content from the uneven marks of the reflective layer that are formed through the disc manufacturing procedure, and detects pre-marks linear in the radial direction that are formed in the writing layer, which is formed either behind or in front of the reflective layer, and from the result of this detection determines whether or not the disc has been illegally copied.

The optical disc reproducing device is made from a memory 1400, a reproducing head 1401, an analog signal processor 1402, an AD 1403, a digital signal processor 1404, a mark signal detection portion 1405, a servo 1406, a spindle motor 1407, a writing layer pre-mark detection portion 1408, a writing layer pre-mark collation portion 1409, an ECC 1410, and a switch 1411.

The memory 1400 can be the memory 1113 in the position information reproducing device that was described previously, or it can be a memory that has that same information. On the memory 1400 is recorded position information that has been reproduced by the position information reproducing device. The position information includes address information for the recorded pre-marks and the channel bit number from the head of the sector with that address information.

First, a system controller that is not shown in the drawing performs control to read address information on the recorded pre-marks from the memory 1400 and reproduce in front of that address.

The optical head 1401 starts to irradiate the reflective layer of the disc with the laser at the reproducing power controlling the head position in front of that address, and creates an analog reproduction signal from the reflective layer and outputs this to the analog signal processor 1402.

The analog signal processor 1402 shapes the analog reproduction signal that is input by amplification and waveform equalization, and outputs the shaped analog reproduction signal to the AD 1403.

The AD 1403 is a general analog-digital converter that samples the shaped analog reproduction signal that is input based on a clock signal that is input to create a multi-value digital reproduction signal, which it outputs to the digital signal processor 1404.

The digital signal processor 1404 has an internal PLL circuit with which it extracts a clock signal with the same band as the reproduction signal from the multi-value digital signal that is input, outputs this to the AD 1403. It should be noted that in the AD 1403, the clock that is extracted is used as the clock for sampling the shaped analog signal that is input. The digital reproduction signal processor 1404 binarizes the multi-value digital reproduction signal that is input in synchronization with the clock signal that is extracted, and outputs the binary reproduction signal to the mark signal detection portion 1405.

The mark signal detection portion 1405 has an internal synchronization code detection portion 1405A and an address detection portion 1405B.

The synchronization code detection portion 1405A detects the synchronization code that is added at a fixed interval from the binary digital signal that is input. Further, in synchronization with the timing at which the synchronization code is detected, it partitions the binary digital signal into sectors that have address information, and outputs these to the address detection portion 1405B.

The address detection portion 1405B extracts the address information that has been added from each sector that has been obtained by partitioning. If it is determined that the address information is from a sector that is one forward of the sector to which the target address for detecting pre-marks stored in the memory 1400 has been added, then the start position of the next sector, that is, the head position of the sector with the target address for detecting a pre-mark that is stored in the memory 1400, is determined, and the address detection portion 1405B outputs a layer jump signal and a tracking hold signal to the servo 1406 and outputs a PLL hold signal to the digital signal processor 1404.

The servo 1406 has within it a layer jump control portion 1406A and a tracking control portion 1406B.

The layer jump control portion 1406A moves the focal position of the reproducing head 1401 from the reflective layer to the writing layer, which is in front of or behind the reflective layer, in accordance with the layer jump control signal that is input.

The tracking control portion 1406B holds the radial position of the reproducing head 1401, in accordance with the tracking hold signal that is input, from tracking control on the uneven marks of the reflective layer.

The spindle motor 1407 rotates the disc under CLV control such that the linear velocity in the circumferential direction is constant, based on the radial position found from the address position being accessed.

The writing layer pre-mark detection portion 1408 detects the binary digital information that is input from the digital signal processor 1404 and the position information of the pre-marks that are formed in the writing layer from the signal on the head position of the target address from the mark signal detection portion. With regard to the pre-mark position information, the clock number from the target sector head position is extracted as the pre-mark position information by counting the PLL clock that has been held from the sector head with the target address. Pre-mark detection is effected through extraction based on the change in the binary reproduction signal from the digital signal processor 1404 after the servo 1406 shifts focus control to the writing layer.

The writing layer pre-mark collation portion 1409 collates the pre-mark position information that has been recorded to the memory 1400 and the position information that is detected by the writing layer pre-mark detection portion 1408 (address and clock number from sector head), and performs a determination on whether or not these are the same, within a range of error of a threshold that has been allowed in advance. If it determines that they are not the same, then the writing layer pre-mark collation portion 1409 outputs a reproduction data output prohibit signal to the switch 1411.

The ECC 1410 partitions the binary reproduction signal from the digital signal processor 1404 into data and a parity for error correction, and performs error correction on the data portion and outputs the result to the switch 1411.

The switch 1411 stops output from the ECC 1410 if a reproduction data output prohibit signal has been output from the writing layer pre-mark collation portion 1409, thereby interrupting the reproduction operation.

Next, the reproduction operation of the reproducing device for pre-marks, which are formed in the writing layer of the disc that is manufactured through the disc manufacturing process and are linear in the disc radial direction, is described.

Figure 18:
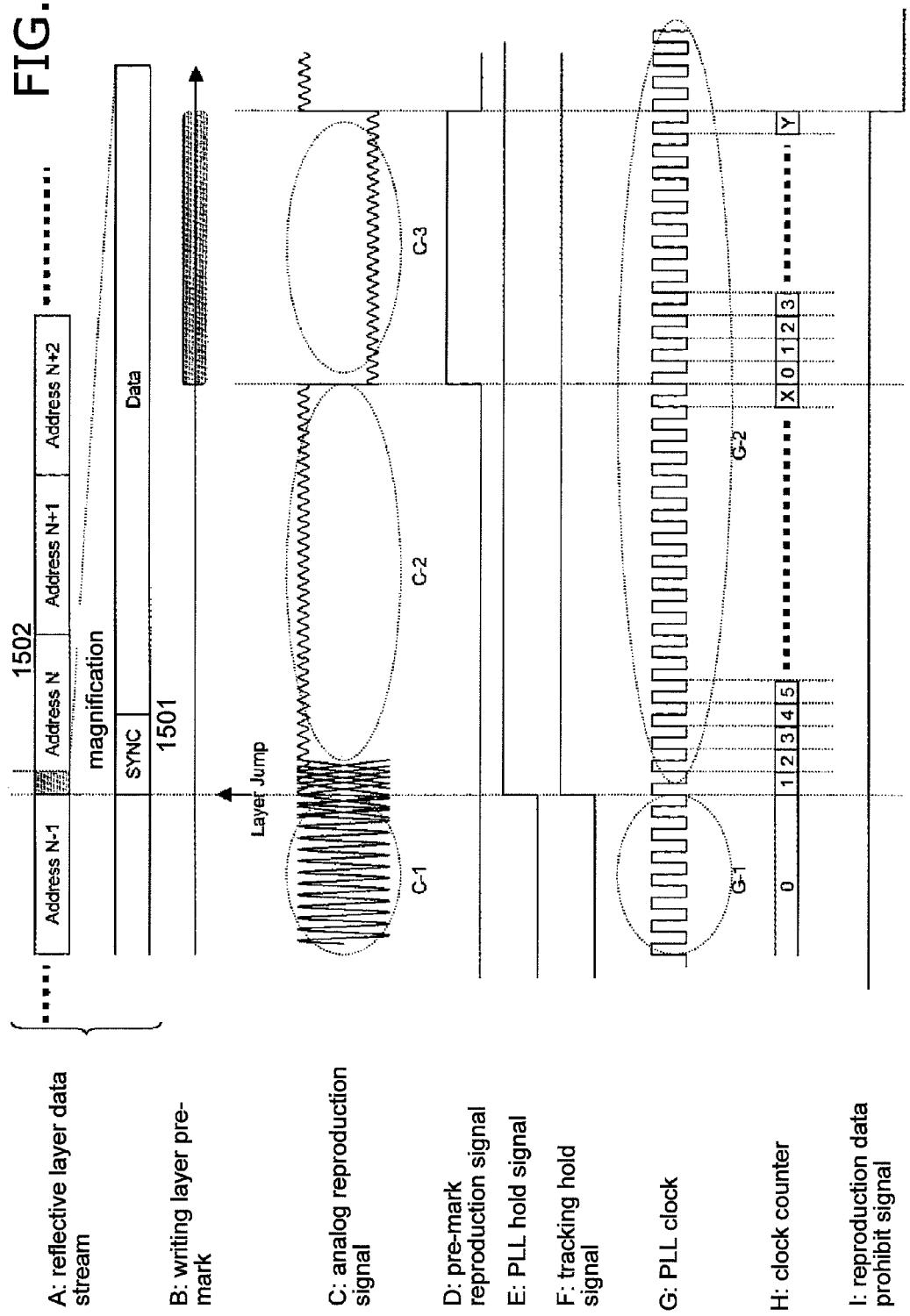
FIG. 18 is a timing chart of the physical position information detection reproduction, during reproduction, of the optical disc reproducing device according to the first embodiment.

FIG. 18 is a timing chart that shows the characteristic operation of this reproducing device.

First, the reproducing device, through a system controller that is not shown in the drawing, reads the target address for pre-mark detection that is stored in the memory 1400, and performs control to reproduce the target address.

The optical head 1401 moves to the radial position that is found from the address that is shown by the system controller, and irradiates the laser at the reproduction power onto the reflective layer, extracting an analog reproduction signal (FIG. 18C-1).

The analog reproduction signal that is extracted (FIG. 18C-1) is shaped by the analog signal processor 1402, and the PLL clock (FIG. 18G-1) is extracted by the PLL circuit of the digital signal processor 1404.

The synchronization code 1501 of the reproduction signal that has been reproduced is detected by the mark signal detection portion 1405, and the reproduction signal is partitioned into sectors 1502 with address information based on the timing at which the synchronization code 1501 is detected.

The mark signal detection portion 1405 compares the address being reproduced against the target address for detecting the pre-mark that is recorded in the memory 1400, based on the address signal that is extracted within the mark signal detection portion 1405, and detects the head position of the sector with that target address and creates a layer jump signal and a tracking hold signal (FIG. 18F) and outputs these to the servo 1406, as well as creates a PLL hold signal (FIG. 18E) and outputs it to the digital signal processor 1404.

The servo 1406 changes the focus control position from the reflective layer to the writing layer, which is formed in front of or behind the reflective layer, in synchronization with the layer jump signal from the mark signal detection portion 1405. During the period that the tracking hold signal (FIG. 18F) is H, the radial position of the optical head 1401 is maintained without performing tracking control on the recording marks that are formed in the disc.

During the period that the PLL hold signal from the mark signal detection portion 1405 (FIG. 18E) is H, the digital signal processor 1404 holds the frequency of the PLL clock signal to be output and outputs it (FIG. 18G-2).

Because no marks other than pre-marks have been recorded to the writing layer, when the servo 1406 effects a jump from the reflective layer to the writing layer, the analog reproduction signal becomes a fixed level at the high reflectance level (FIG. 18C-2), and when the reproducing head 1401 passes over the pre-marks, the analog reproduction signal becomes a fixed level at the low reflectance level (FIG. 18C-3). It should be noted that the data stream of the reflective layer that is shown in FIG. 18A does not appear after jumping to the writing layer because focused reproduction is performed on the writing layer, but it is listed here for the sake of simplifying the description.

The reproduction signal after jumping to the writing layer is an analog reproduction signal that has a fixed level at the low reflectance level only when pre-marks have been recorded as mentioned earlier, and the pre-mark reproduction signal (FIG. 18D) is obtained by binarizing the reproduction signal of the digital reproduction processor 1404. Here, because the reproduction signal swings to an unstable value for an instant due to jumping layers, the pre-mark reproduction signal is kept at L for a set period after jumping between layers.

The writing layer pre-mark detection portion 1408 has an internal counter that is synchronized with the clock signal from the digital signal processor 1404. The counter is initialized at the head position of the sector with the target address for the detection of a pre-mark that is stored on the memory 1400, and counts the rising edges of the pre-mark reproduction signal (FIG. 18D), that is, the number of clocks X until the pre-mark start position (FIG. 18H), from the sector head position. In synchronization with the rising edge of the pre-mark reproduction signal (FIG. 18D), the counter moves the pre-mark start position count value X (FIG. 18H) starting from the sector head to a buffer, reinitializes, and then extracts the clock number from the rising edge to the falling edge of the pre-mark reproduction signal (FIG. 18D), that is, the clock number Y (FIG. 18H) of the pre-mark width. The writing layer pre-mark detection portion 1408 outputs the clock number X of the start position of the pre-mark from the target sector head (FIG. 18H) and the clock number Y of the pre-mark width (FIG. 18H) to the writing layer pre-mark collation portion 1409.

The writing layer pre-mark collation portion 1409 compares the writing layer pre-mark position information that is stored on the memory 1400 and the recorded position information of the pre-marks that is extracted by the writing layer pre-mark detection portion 1408, and determines whether or not they match based on a threshold that is within a certain fixed range of error. The writing layer pre-mark collation portion 1409 allows writing of the data content by setting the reproduction data output prohibit signal (FIG. 18I) to L only if the clock number Y from the target sector to the pre-mark record start position and the pre-mark width X both match the position information of the writing layer pre-marks that are stored in the memory 1400. On the other hand, if it is determined that either one of these does not match, then it does not allow reproduction of the data content (it controls the output of reproduction data with the switch 1411).

If the disc manufacturing process, the disc that is manufactured by the disc manufacturing process, and the reproducing device for that disc are used as described above, then it is possible to provide discs that can be reproduced only if they are a normal copy and does not allow the reproduction of illegally copied discs. In other words, pre-marks that are linear in the radial direction are formed in the writing layer during disc manufacturing, the relative positional relationship between the pre-marks and the uneven marks that are formed in the reflective layer, which is in front of or behind the writing layer, is extracted, and that position information is recorded encoded to the writing layer. Thus, the positional relationship between the recording marks of the reflective layer and the pre-marks of the writing layer is unique for each disc. This disc-specific position information is recorded and encoded and it thus cannot be changed by a third party with bad motives.

It is not possible to produce a copy that also includes this positional relationship, that is, this unique information. The reason for this is that the pre-marks are recorded to the writing layer irrespective of the uneven marks of the reflective layer, and the spacing between pre-marks, or the pre-mark width itself, is sufficiently wider than the tracking control band of the servo, and thus it is not possible to make a copy by applying tracking to the pre-marks.

Further, the recording marks of the writing layer for recording position information similarly are recorded at a sufficiently wider spacing than the tracking period of the servo, and thus it is not possible to make a direct copy from one writing layer to another writing layer. Since the pre-mark position information is encoded, even the address position where the pre-marks are recorded is unclear unless the device is a proper recording device that has key information that can decode the code, and thus it is not possible to reproduce the pre-marks, which can be reproduced only when the focus has jumped to the writing layer from the address position.

Second Embodiment

1. Optical Disc

In this embodiment, an optical disc having a writing layer that includes a pre-mark recording region in which pre-marks are formed and a wobble region in which a wobble that includes address information is formed, and a reflective layer that is behind or in front of the writing layer primarily on which content information that includes address information is recorded through uneven marks, and a process for manufacturing that disc and a device for reproducing that disc, are described in detail using the drawings.

Figure 19:
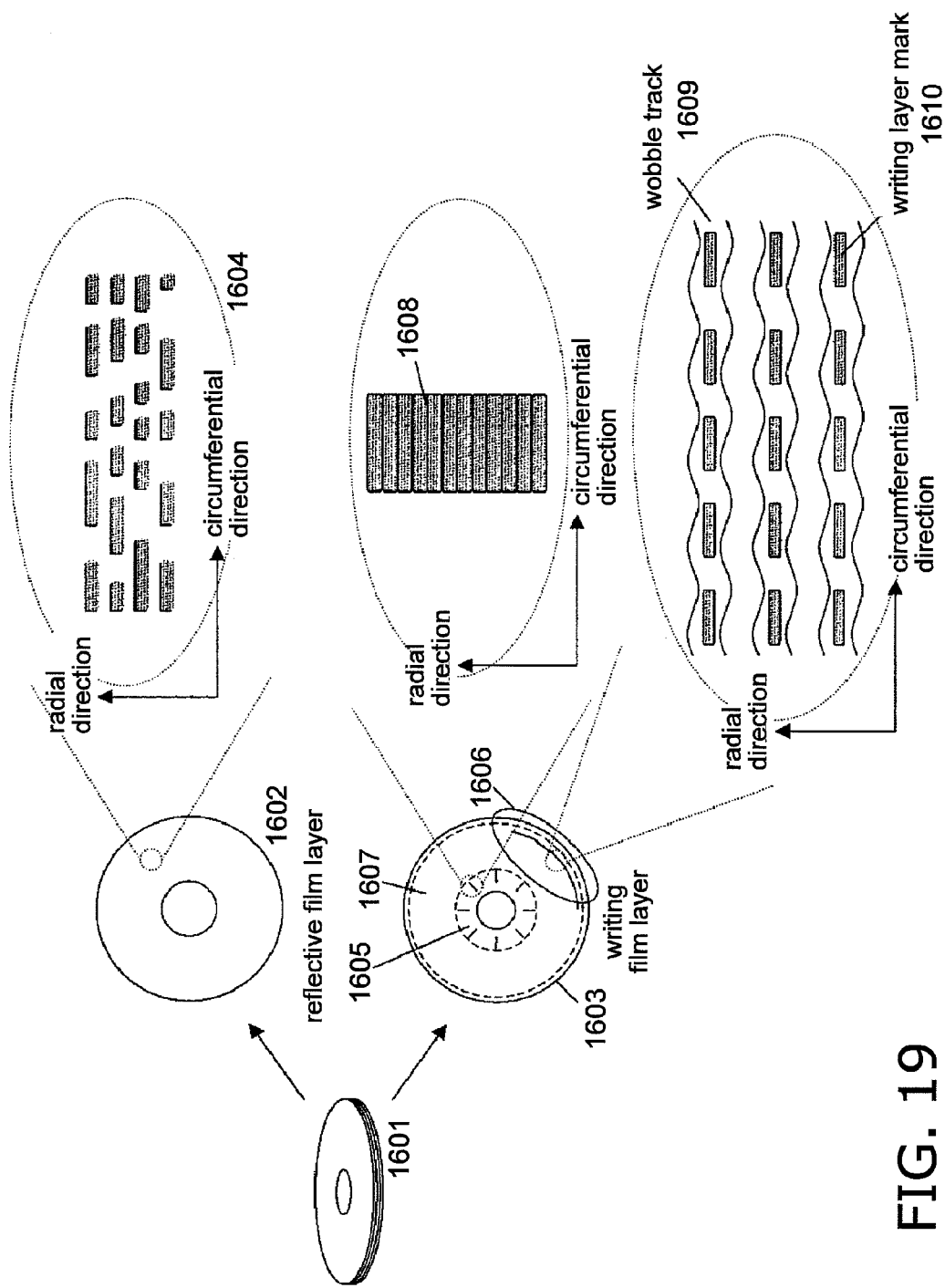
FIG. 19 is a conceptual diagram of an optical disc made from a reflective layer on which uneven recording marks are formed, and a writing layer having a pre-mark region and a wobble region, according to a second embodiment.

FIG. 19 is a conceptual diagram of the optical disc according to this embodiment. The optical disc has a reflective layer on which primarily content information is recorded as uneven marks, and a writing layer that is behind or in front of the reflective layer and that includes a pre-mark recording region in which pre-marks are recorded and a wobble region in which a wobble including address information is formed. The disc 1601 is made of at least a reflective layer 1602 and a writing layer that is behind or in front of the reflective layer 1602. With regard to these at least two layers, two optical disc substrates are applied to one another, or the two layers are formed on one of those substrates. This embodiment is described with regard to the bare minimum configuration of the invention, which includes a single reflective layer and a single writing layer, but there may also be a plurality of either one of these layers, or a plurality of both of these layers.

In the reflective layer 1602 of the disc are formed uneven marks 1604 in the circumferential direction of the disc, and a reflective film made of aluminum or silver is deposited over these uneven marks by evaporation. The uneven marks that are recorded to the disc are recorded modulating primarily the data content, and address information is added in information units (sectors).

A writing layer 1603 of the disc includes a pre-mark recording region 1605 in which pre-marks 1608 that are linear in the radial direction (they may also fan outward over a fixed angle from the disc center) are recorded in the disc internal circumference portion at a substantially fixed width in the circumferential direction. A plurality of pre-marks 1608 are formed in the circumferential direction.

A wobble region 1607 in which a wobble track is formed is also formed in the writing layer 1603 of the disc on the outer circumferential side from the pre-mark recording region 1605. Address information is recorded by being superimposed in this wobble. Further, the position information of the pre-marks that is detected in the disc manufacturing process is recorded encoded (or with a tamper prevention code added) to a specific region on the outer circumferential side of the wobble region.

2. Optical Disc Manufacturing Method

Figure 20:
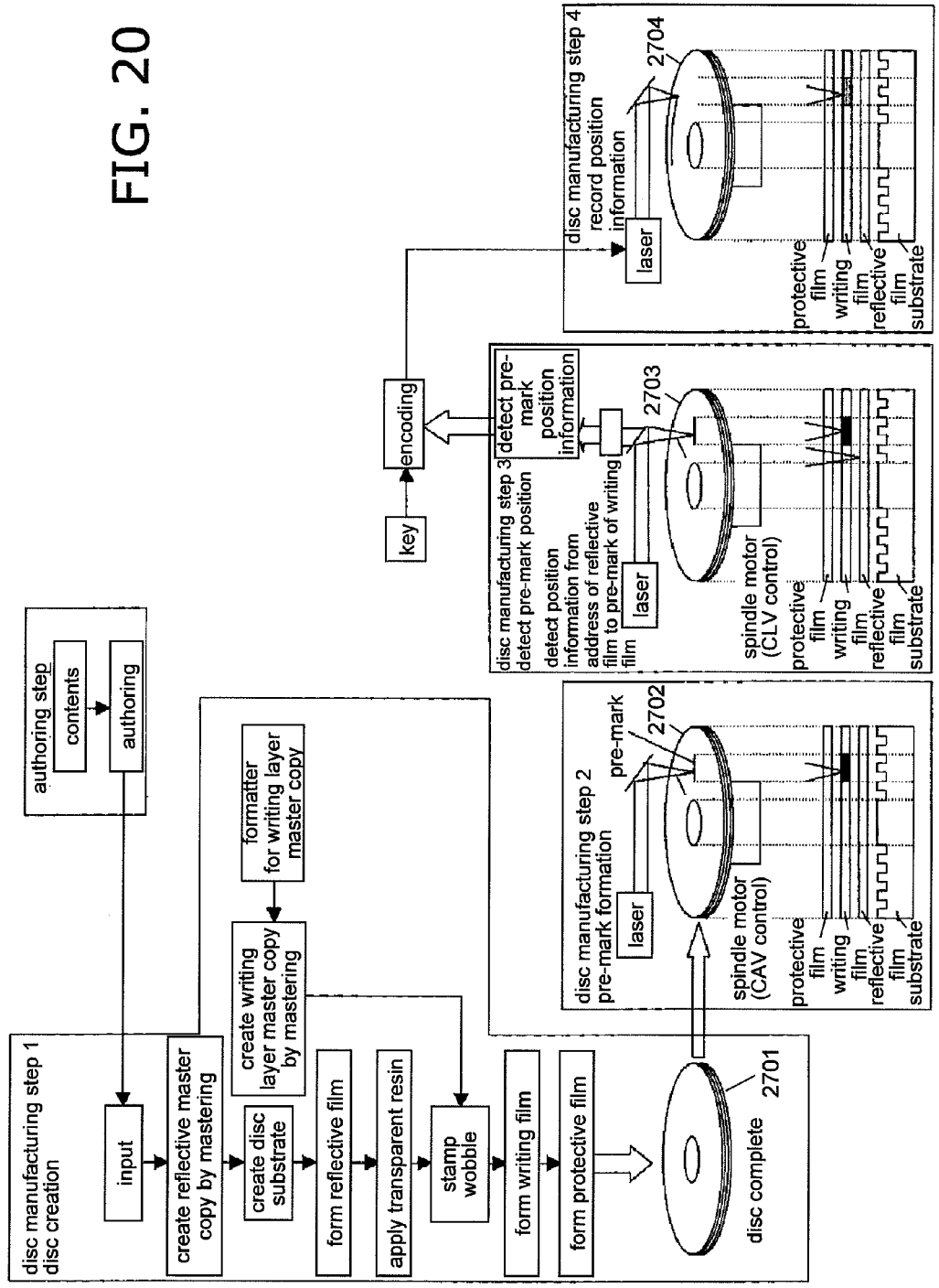
FIG. 20 is a flowchart of the procedure for manufacturing an optical disc made from a reflective layer on which uneven recording marks are formed, and a writing layer having a pre-mark region and a wobble region, according to the second embodiment.

FIG. 20 is a flowchart that shows the manufacturing process for manufacturing the optical disc according to this embodiment.

This process includes an authoring step, a disc manufacturing step 1, a disc manufacturing step 2, a disc manufacturing step 3, and a disc manufacturing step 4.

In the authoring step, content information such as game information or video information that is to be recorded to the disc is authored, and for example is converted to a Blu-ray disc recording format. The authored data are output to the disc manufacturing step 1.

In disc manufacturing step 1, the authored data are input, and based on those authored data, mastering is performed to create a master copy for the reflective layer of the disc.

After the master copy of the reflective layer has been created, stamping is performed based on that master copy, producing a disc substrate with uneven marks formed in its surface.

After producing the disc substrate, a metal film such as aluminum or silver is deposited by evaporation over the uneven marks that have been formed, and then a transparent resin is coated over this metal film.

On the other hand, in order to produce a writing layer that is formed in front of the disc reflective layer, mastering is performed based on the output from a writing layer master formatter, and a writing layer master copy is produced. The writing layer master formatter generates a wobble signal that includes address information that is to be formed on the disc, and based on that wobble signal forms an uneven wobble track that includes address information on the disc master copy. One feature of this reflective layer substrate is that it has, in a fixed region on its inner circumference side, a region in which the wobble is not formed that serves as a pre-mark recording region. Thus, the wobble, which includes address information, is formed only on the outer circumferential side from the pre-mark region.

The writing layer master copy that has been mastered in this way is used to stamp a section in which the metal film has been deposited by evaporation and the transparent resin has been applied.

After stamping, the transparent resin is hardened and a writing film made of pigment or organic material is deposited over the hardened transparent resin by evaporation. The pigment or organic material is ordinarily a film material that is used for the recording layer of write-once media.

A protective layer is formed after vapor deposition of the writing film. The protective layer can be formed by adding a transparent thin-film sheet with an adhesive or by spin coating a transparent resin.

In this way, disc manufacturing step 1 produces a two-layered optical disc 1601 with a reflective layer on which uneven marks, which record data content, are formed, and a writing layer that is formed in front of the reflective layer and on which a wobble having an address is formed.

It should be noted that this embodiment describes a two-layered structure having a reflective layer and a writing layer, which are the minimum structural elements, for the sake of simplifying the description, but the invention is not limited to this, and it is also possible for there to be a plurality of at least one of the reflective layer or the writing layer, or for there to be a plurality of each of the reflective layer and the writing layer.

This embodiment also describes a method of forming the writing layer over the reflective film after forming the reflective film, but of course, it is also possible to form the reflective layer after forming the writing layer. In this case, the writing layer master copy is used to create a disc substrate and form the writing film, and then a transparent resin is coated over the writing film and the disc is stamped with the reflective layer master copy, after which the transparent resin is hardened and then, after hardening, a metal reflective film is vapor deposited, producing the disc.

This embodiment is described using a Blu-ray disc with a 1.1-mm substrate, but like with DVDs, it is also possible to adopt a disc that is achieved by pasting together 0.6 mm substrates. This is achieved by bringing together a 0.6 mm substrate that has been stamped by a reflective master copy, and a writing layer substrate that is obtained by stamping with a writing layer master copy, with an adhesive. By doing this, it is possible to create an optical disc that has a reflective layer and a writing layer. The embodiment may also be similarly implemented with a disc that is obtained with a single substrate, such as a CD.

The disc 2701 produced in disc manufacturing step 1 in this way is delivered to disc manufacturing step 2. Disc manufacturing step 2 is a step in which pre-marks are formed in the writing layer of the disc 2701 that was manufactured in disc manufacturing step 1.

First, the disc 2701 that is produced in disc manufacturing step 1 is mounted into a pre-mark recording device. After the disc is mounted, the spindle motor of the pre-mark recording device rotates the disc through CAV control such that the rotational speed is equal over all radial positions. The recording head is moved to a target radial position for recording a pre-mark to the inner circumference of the disc. The radial position for forming the pre-mark is the same radial position as the pre-mark recording region of the writing layer of the disc 2701 in which the wobble is not formed.

Next, the pre-mark recording device focuses on the writing layer of the disc and intermittently irradiates a recording beam in synchronization with a single revolution signal of the spindle motor, recording pre-marks to the writing layer. With each rotation of the disc, the recording head is moved in the outer circumferential direction by approximately the width of a pre-mark in the radial direction.

Thus, a plurality of pre-marks that are linear in the radial direction are formed in the circumferential direction in the pre-mark recording region that has been provided on the inner circumferential side of the writing layer of the disc 2701 that is produced in disc manufacturing step 1. The spacing between the pre-marks is ideally about the spacing between the sectors that have address information, of the uneven marks that are recorded to the reflective layer. In other words, in a Blu-ray disc, this spacing is about 4 to 5 mm.

In this way, a disc 2702 in which pre-marks are formed in the writing layer is moved to the disc manufacturing step 3. The disc manufacturing step 3 is a step for measuring the positions where the pre-marks that are formed in step manufacturing step 2 are recorded from the recording mark positions of the reflective layer.

First, the disc 2703 in which pre-marks are recorded in disc manufacturing step 2 is loaded in the pre-mark position detection device. The pre-mark position detection device can be the same device as the pre-mark recording device that was described in disc manufacturing step 2.

The disc that is mounted in the pre-mark position detection device is rotated under CLV control by the spindle motor such that its linear speed is constant over all radial positions.

Next, the reflective layer of the disc 2702 in which the uneven marks are recorded is reproduced, and the reproducing head of the pre-mark position detection device accesses the target address position in the radial position that corresponds to the radial position of the pre-mark recording region of the writing layer, in which the pre-marks have been recorded. More specifically, first, the reproducing head is moved such that it is in front of the target address position, and before reaching the target address, the reproduction preparation for reproducing the reflective layer is completed.

After completing the reproduction preparation, the focal position of the reproducing head is jumped to the writing layer, which is formed in front of or behind the reflective layer, at the head position of the sector to which the target address has been added. At the moment that this jump is made, tracking control by the servo of the pre-mark position detection device, which was performed on the uneven recording marks of the reflective layer, is stopped, and frequency control of the clock signal that is generated in synchronization with the signal that is reproduced from the uneven marks of the reflective layer is stopped. Further, the clock counter that is based on the clock signal for which frequency control has been stopped is activated.

After jumping to the writing layer, the pre-mark record start position and the pre-mark record end position are found with the counter based on the reproduction signal that is reproduced from the writing layer by the reproducing head. Thus, the count value up to the pre-mark record start position is found as the clock number up to the pre-mark record position of the writing layer from the head position of the sector that includes the target address of the reflective layer. If the counter is reset at the pre-mark record start position, then the pre-mark width from the pre-mark start position to the pre-mark end position is found as the clock number. In this way, the clock number that is found is stored in the memory together with the target address information. Confirmation of the pre-mark record position is made based on a plurality of addresses that belong to the radial position that corresponds to the pre-mark recording region, and that plurality of pre-mark positions are stored in the memory.

The disc 2703 in which the position information from the address position of the reflective layer to the pre-marks of the writing layer has been found in this way is then moved to disc manufacturing step 4.

Disc manufacturing step 4 is a step for encoding and recording the pre-mark position information to the writing layer of the optical disc 2703 whose pre-mark position information was detected in disc manufacturing step 3.

First, in disc manufacturing step 4 the optical disc 2703 whose pre-mark position information was detected in disc manufacturing step 3 is mounted into a position information recording device. It should be noted that this position information recording device can be provided within the pre-mark recording device of disc manufacturing step 2 or the position information detection device of disc manufacturing step 3.

The disc that has been loaded is rotated by a spindle motor under CLV control such that the linear velocity is the same over all radial positions.

Next, a wobble that includes address information more toward the outer circumference than the pre-mark recording region of the writing layer of the disc is reproduced, and the head is moved to the target address position for recording the pre-mark position information. After reaching the target position, the pre-mark position information that is detected in disc manufacturing step 3 and stored in the memory is encoded and recorded from the target address.

This pre-mark position recording device thus has the same structure as an ordinary write-once recording device except for the sections for encoding and recording the pre-mark record position that is detected in disc manufacturing step 3.

As described above, the disc 2704 that is produced through disc manufacturing steps 1 through 4 is a disc that has a reflective layer in which uneven marks are recorded, and a writing layer that is formed in front of or behind the reflective layer and that has a pre-mark recording region on its inner circumference side and a wobble that includes an address on its outer circumferential side from the pre-mark recording region, and pre-marks that are linear in the radial direction are formed in the pre-mark recording region, which is on the inner circumferential side of the writing layer, and the pre-mark record positions of the writing layer are detected from a reference position of the uneven marks of the reflective layer, and the pre-mark record position information is encoded and recorded more toward the outer circumference of the pre-mark recording region of the writing layer.

It should be noted that the encoding in disc manufacturing step 4 can be a secret key code or a public key code. With a secret key code it is necessary to very strictly guard the key information that is encoded, whereas with a public key code it is not necessary to strictly guard the encoding key itself.

3. Recording Devices

Next, the pre-mark recording device, the position information detection device, and the position information recording device that are used in the disc manufacturing procedure are described in detail.

Figure 21:
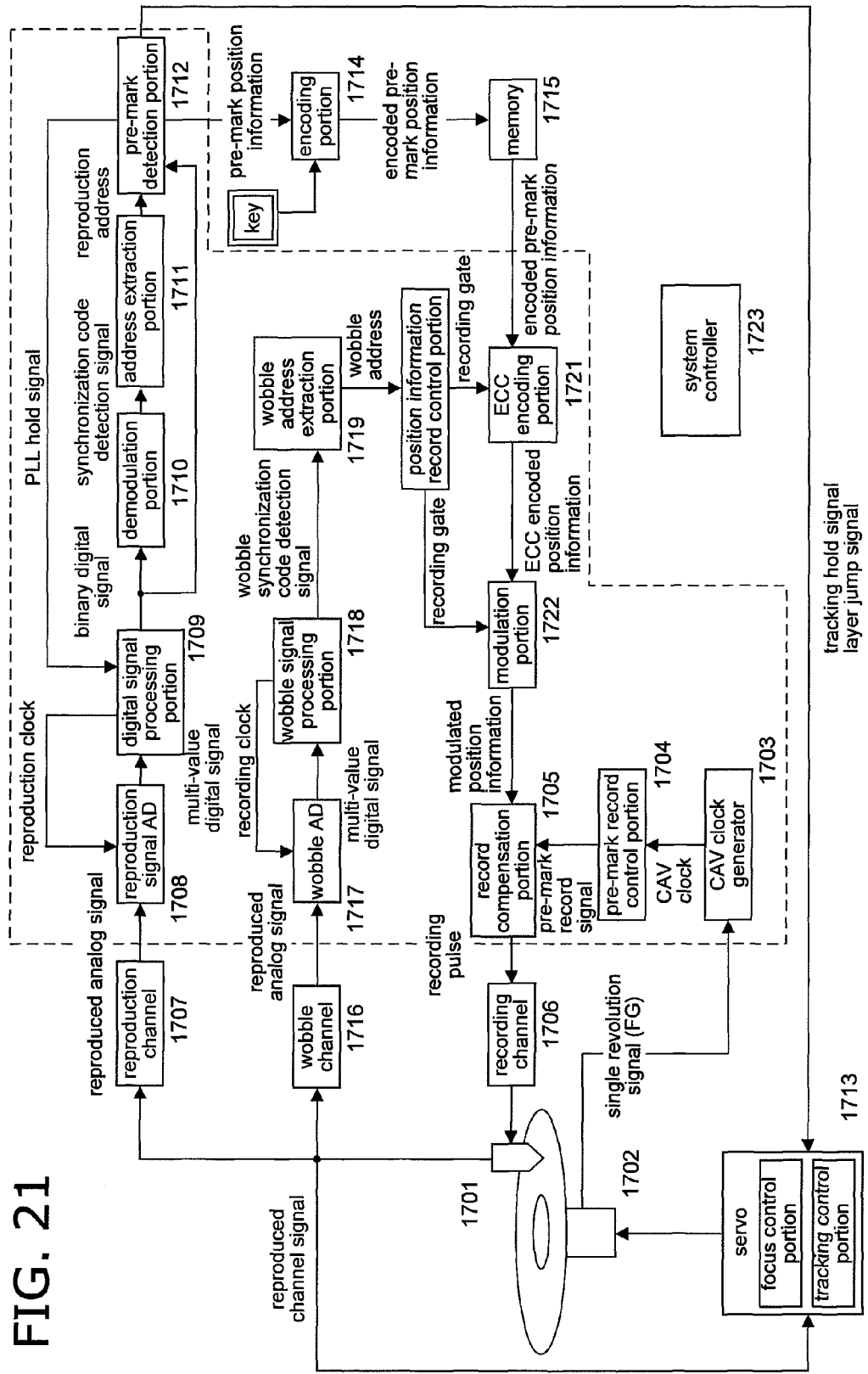
FIG. 21 is a block diagram that shows the configuration of the optical disc recording device according to the second embodiment.

FIG. 21 is a block diagram showing the characteristic configuration of a recording and reproducing device that includes a pre-mark recording device, a position information detection device, and a position information recording device within the same device. It should be noted that the dotted line in the drawing indicates the extent of the LSI chip.

The recording and reproducing device is constituted by a recording and reproducing head 1701, a spindle motor 1702, a CAV clock generator 1703, a pre-mark record control portion 1704, a record compensation portion 1705, a recording channel 1706, a reproduction channel 1707, a reproduction signal AD 1708, a digital signal processing portion 1709, a demodulation portion 1710, an address extraction portion 1711, a pre-mark detection portion 1712, an encoding portion 1714, a memory 1715, a wobble channel 1716, a wobble AD 1717, a wobble signal processing portion 1718, a wobble address extraction portion 1719, a position information record control portion 1720, an ECC encoding portion 1721, a modulation portion 1722, and a system controller 1723.

First, the operation of the pre-mark recording mode of the recording and reproducing device used in disc manufacturing step 2 is described. This mode is an operation mode for recording pre-marks to the pre-mark recording region of the writing layer of the disc that is produced in disc manufacturing step 1.

When the disc is mounted in the recording and reproducing device and the recording and reproducing head 1701 is moved to the radial position of the pre-mark recording region of the disc writing layer, the spindle motor 1702 rotates the mounted disc performing CAV control such that the disc maintains the same rotational speed regardless of the radial position of the recording and reproducing head 1701. It also creates a single revolution signal and outputs this to the CAV clock generator 1703 with each rotation. It should be noted that the single revolution signal may also be output in a plurality of pulses during a single rotation.

The CAV clock generator 1703 tracks the phase error between the single revolution signal that is input and the clock that it generates internally at a predetermined frequency, and creates a clock signal with the same frequency as the single revolution signal. The CAV clock generator 1703 then multiples the clock signals that are generated to create a CAV clock signal, and outputs the CAV clock signal to the pre-mark record control portion 1704.

The pre-mark record control portion 1704 has an internal clock counter that operates in synchronization with the CAV clock signal that is input, and activates this counter. The counter resets the count value based on the single revolution signal from the spindle motor 1702. Next, the pre-mark record control portion 1704 generates a pre-mark record signal that indicates the period for recording a pre-mark, based on the counter value, and outputs this to the record compensation portion 1705. Counter values that are within the range where the pre-mark record signal is output are output within a range of predetermined count values.

The record compensation portion 1705 creates a recording pulse that indicates the laser intensity for irradiating the disc writing layer with a laser, and outputs this to the recording channel 1706, over the range where the input pre-mark record signals are output.

The recording channel 1706 effects the emission of the laser onto the writing layer of the disc by controlling the value of the current that flows to the laser that has been mounted in the recording and reproducing head 1701, based on the recording pulse that is input.

With each rotation of the disc, the recording and reproducing device moves the recording and reproducing head 1701 in the outer circumferential direction by approximately the pre-set width of the pre-mark in the radial direction, and repeats the operation for a plural number of rotations.

Up to this point is the operation of the pre-mark recording mode of the recording and reproducing device, and through this operation, pre-marks that are linear in the radial direction are recorded to the pre-mark recording region of the writing layer of the disc that is produced in disc manufacturing step 1.

Next, the operation of the pre-mark position detection mode of the recording and reproducing device used in disc manufacturing step 3 is described. This mode is an operation mode in which the pre-mark positions of the disc in which pre-marks are recorded in disc manufacturing step 2 are detected.

A disc that has been loaded is first irradiated by a laser from the reproducing head 1701 at the reproducing intensity onto the uneven marks that are provided in the reflective layer of the disc, and a reproduction channel signal is created from the light that is reflected and output to the reproduction channel 1707.

The reproduction channel 1707 performs amplification and waveform equalization on the reproduction channel signal that is input, creating a reproduced analog signal, and outputs this to the reproduction signal AD 1708.

The reproduction signal AD 1708 is a general analog-digital converter that samples with the reproduction clock that is input and converts the reproduced analog signal that is input into a multi-value digital signal and outputs this to the digital signal processing portion 1709.

The digital signal processing portion 1709 has an internal PLL circuit and extracts a reproduction clock that is the same frequency as the reproduction signal that is reproduced, based on the multi-value digital signal that is input, and outputs this to the reproduction signal AD 1708. It should be noted that this clock is used as the sampling clock for the reproduction signal AD 1708. The digital signal processing portion also creates binary digital information in synchronization with the reproduction clock that has been extracted, based on the multi-value signal that is input, and outputs this to the demodulation portion 1710.

The demodulation portion 1710 detects the synchronization code that has been added at a fixed interval (in practice, in frame units) from the binary digital signal that is input, and demodulates the signal based on the timing at which the synchronization code is detected, and then partitions the demodulated reproduction data into sectors to which an address is added. The sector partitioned data that are obtained through this partitioning are output to the address extraction portion 1711.

The address extraction portion 1711 extracts the reproduction address that has been added in sector units from the sector data that are input, and outputs the result to the pre-mark detection portion 1712.

The pre-mark detection portion 1712 outputs a layer jump signal and a tracking hold signal to the servo 1713 when the reproduction address that is input reaches the head position of the sector to which the target address for detecting the pre-mark has been added, which is set in advance in the system controller 1723. At the same time, it outputs a PLL hold signal to the digital signal processing portion 1709. It should be noted that the digital signal processing portion 1709 to which the PLL hold signal is input stops the phase error tracking operation of the PLL circuit, and holds the reproduction clock frequency immediately before input of the PLL hold signal. The pre-mark detection portion 1712 has an internal counter that operates in synchronization with the reproduction clock that is input from the digital signal processing portion 1709, and resets the counter and starts the reproduction clock counter operation when the sector head position of the target address is reached. The pre-mark detection portion 1712 also determines the pre-mark record start position and the pre-mark record end position of the writing layer, based on the binary digital information from the digital signal processing portion 1709. The counter detects the count value from the sector head position of the target address to the pre-mark record start position, and the count value from the pre-mark record start position to the pre-mark record stop position, and outputs these along with the target address information to the encoding portion 1714 as the pre-mark position information.

The encoding portion 1714 encodes the pre-mark position information that is input with an internal key to create encoded pre-mark position information, and outputs this to the memory 1715.

The servo 1713 has an internal focus control portion and tracking control portion, and moves the focal position from the reflective layer that is being reproduced to the writing layer, which is behind or in front of that reflective layer, based on the layer jump signal from the pre-mark detection portion. Ordinarily, in Blu-ray discs this layer jump requires on the order of 100 msec. To prevent this, the layer jump between the reflective layer and the writing layer is executed near the target address position in advance and the amount of the jump at this time is saved, and then by executing a layer jump for detection of the pre-mark position information based on the jump amount at the time of this pre-jump, it is possible to shorten the layer jump time to a time on the order of several 100 μs. The servo 1713 also stops internal tracking control based on the tracking hold signal that it receives.

Up through the above is the pre-mark position detection operation mode that is used in disc manufacturing step 3 of the recording and reproducing device.

Next, the operation of the pre-mark position recording mode of the recording and reproducing device that is used in disc manufacturing step 4 is described. This is an operation mode in which the pre-mark position information that is detected in disc manufacturing step 3 is recorded to the wobble region in which a wobble is formed, which is more toward the outer circumference than the pre-mark recording region of the disc writing layer.

First, when the disc is inserted into the recording and reproducing device, the recording and reproducing head 1701 is moved to the target radial position based on a target address for recording the pre-mark position information that has been set in the system controller in advance. The radial position is more toward the outer circumference than the radial position of the pre-mark recording region of the disc that has been inserted.

After moving, the reproducing head 1701 irradiates the writing layer of the disc with a laser at the reproducing intensity and creates a reproduction channel signal from the reflected light and outputs this to the wobble channel 1716.

The wobble channel 1716 performs filtering for extracting the frequency components in the wobble band that have been recorded, and extracts a reproduced analog signal, and outputs this to the wobble AD 1717.

The wobble AD 1717 is a general analog-digital converter, and samples the reproduced analog signal that is input based on the recording clock that is input and creates a multi-value digital signal, and outputs this to the wobble signal processing portion 1718.

The wobble signal processing portion 1718 has an internal PLL circuit and extracts a wobble clock that is in synchronization with the frequency of the reproduced analog signal, based on the multi-value digital signal that it receives. If necessary, the wobble clock is multiplied to create a recording clock, and this is output to the wobble AD 1717. This multiplication is 69 multiplication in the case of Blu-ray discs, and creates a recording channel clock from the wobble clock. It should be noted that in the wobble AD 1717, the sampling clock that is used for sampling the reproduced analog signal is run based on this recording clock. The wobble signal processing portion 1718 detects the synchronization code that is added to the wobble, in synchronization with the recording clock that has been extracted, from the multi-value digital signal that has been subjected to A-D conversion, and outputs the detected wobble synchronization code detection signal to the wobble address extraction portion 1719. In Blu-ray discs, some of the sine wave wobble (monotone wobble) is MSK (minimum shift keying–cosine variant) modulated, and the wobble synchronization code and data are reproduced based on the position information of this MSK-modulated wobble.

The wobble address extraction portion 1719 extracts the address information that has been added from the reproduced wobble signal in synchronization with the wobble synchronization code detection signal that it receives. This address information is added at less precision than the address information that is added to the recording marks of the reflective layer. In Blu-ray discs, there are only three addresses recorded to the wobble over the range that 16 addresses are recorded via recording marks. However, it is possible to synchronize these in channel units based on the recording clock that is extracted by the wobble signal processing portion 1718 and the address information itself. The wobble address that is extracted is output to the position information record control portion 1720.

The position information record control portion 1720 creates a recording gate that indicates a ranger over which position information is recorded, when the wobble address that is input is the target address for recording the position information that is stored encoded in the memory, and outputs this to the ECC encoding portion 1721 and the modulation portion 1722.

When the ECC encoding portion 1721 receives the recording gate from the position information record control portion 1720, it reads the encoded position information from the memory 1715 and performs ECC encoding by adding a parity for error correction, and outputs the ECC encoded position information that is created to the modulation portion 1722.

The modulation portion 1722 modulates the ECC encoded position information that is input with predetermined modulation rules. This modulation corresponds to the demodulation by the demodulation portion 1710, and in Blu-ray discs, 17 pp modulation is performed. The modulated position information that is obtained by this modulation is output to the record compensation portion 1705.

The record compensation portion 1705 creates a recording pulse that expresses the laser emission timing and the laser intensity in recording mark portions that are recorded as recording marks from the modulated position information that is input (it is made of a so-called record compensation circuit), and outputs this to the recording channel 1706.

The recording channel 1706 controls the current that flows to the laser that is mounted to the recording head 1701, according to the recording pulse that is input, such that the recording head 1701 irradiates the writing layer of the disc with the recording laser and records the encoded position information.

The above is the operation of the position information recording mode of the recording and reproducing device.

Through the foregoing pre-mark recording mode, the position information detection mode, and the position information recording mode of the recording device, it is possible to record pre-marks to the pre-mark recording region of the writing layer of the disc, find the position information from the sector head position to which a predetermined address has been recorded, of the reflective layer that is in front of or behind the writing layer and in which uneven marks have been recorded, until the pre-marks that are recorded in the writing layer, based on the clock that is extracted from the uneven marks of the reflective layer, encode the position information that is found, and record this encoded position information to a region in which a wobble with an address has been formed and which is formed more toward the outer circumference than the pre-marks of the writing layer.

Since the pre-marks are recorded to the writing layer based on the single revolution signal, in practical terms it is not possible to copy the pre-marks in association with the uneven marks of the reflective layer. This is because the pre-marks are recorded in synchronization with the single revolution signal and the relationship between the pre-marks that have been recorded and the reflective layer recording marks is recorded within channel units, and thus, in the case of a Blu-ray disc, whose channel length is approximately 75 nm, it is not possible to copy the disc unless positioning is performed on the order of several 100 nm up to several μm.

Next, the operation of recording pre-marks in the disc manufacturing step 2 is described in detail.

Figure 22:
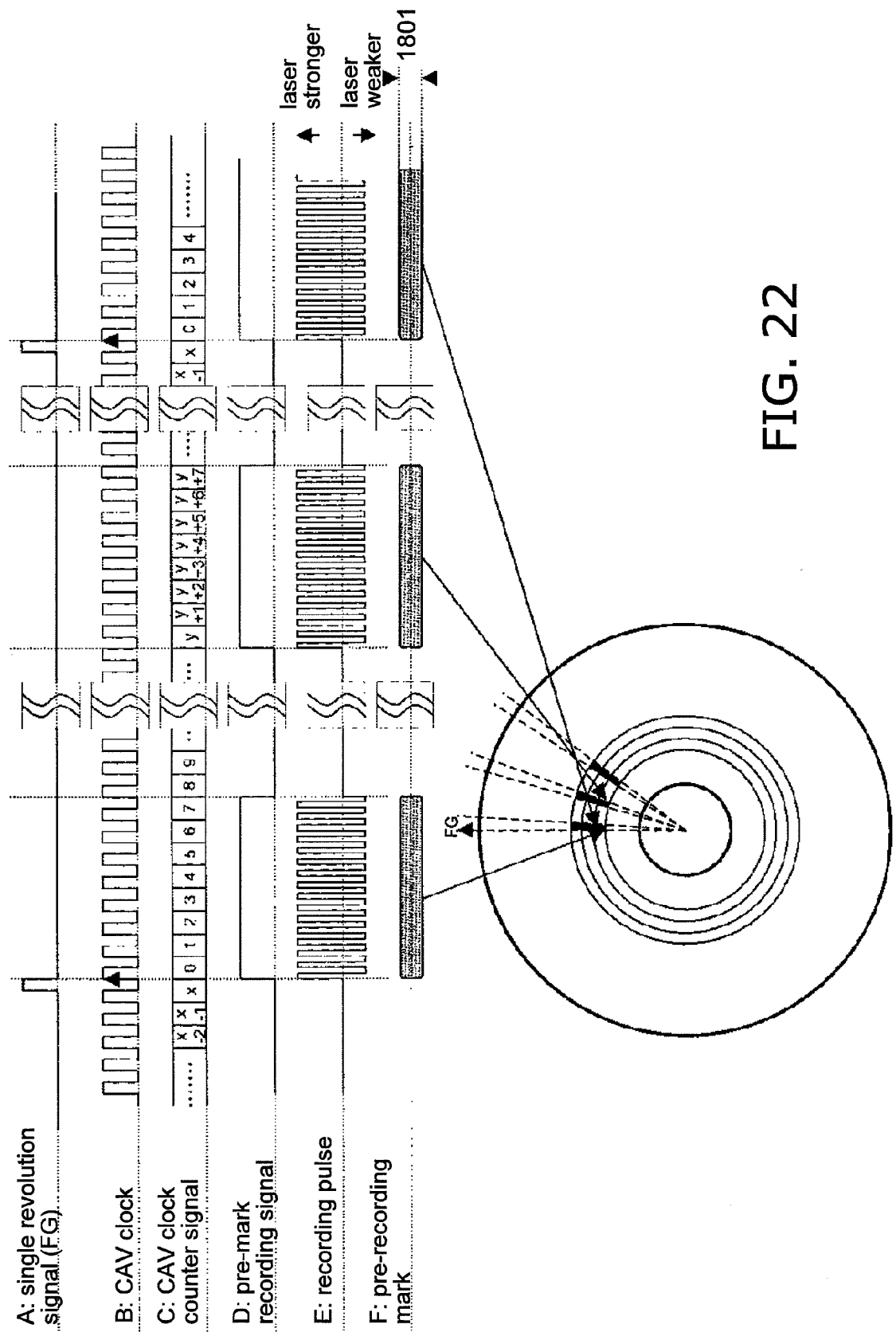
FIG. 22 is a timing chart that shows the pre-mark recording operation of the optical disc recording device according to the second embodiment.

FIG. 22 is a timing chart that shows the characteristic signal timing of the pre-mark recording operation of disc manufacturing step 2, and is the operation of the pre-mark recording mode of the recording and reproducing device that was described earlier.

First, once the disc that is manufactured in disc manufacturing step 1 is placed in the recording and reproducing device, the disc is rotated under CAV control by the spindle motor 1702. The recording and reproducing head 1701 is moved to the radial position that corresponds to the pre-mark region of the writing layer on the inner circumference of the disc, and is focused on the writing layer.

At this time, the spindle motor outputs a single revolution signal (FIG. 22A) to the CAV clock generation portion. This single revolution signal is output at least once for each revolution of the disc.

The CAV clock generation portion 1703 extracts the phase error component between the clock signal that is generated at a predetermined frequency and the single revolution signal (FIG. 22A) and creates a CAV clock (FIG. 22B) that is in synchronization with the single revolution signal. It should be noted that another example of the method for creating the CAV clock involves first extracting a clock that is synchronized with the single revolution signal with the PLL circuit, and then performing a predetermined multiplication on this in order to extract a similar CAV clock. The CAV clock created in this way is kept at a clock frequency that is generated by this multiplication or at a predetermined frequency such that its frequency is higher than the spacing between sectors of recording marks in the reflective layer, which is formed behind or in front of the writing layer, and is lower than the channel frequency of the recording marks.

The pre-mark record control portion 1704 has a counter circuit that operates in synchronization with the CAV clock that is input, and is reset by the single revolution signal and counts in synchronization with the CAV clock, creating a CAV clock counter signal (FIG. 22C). The pre-mark record control portion 1704 also creates a pre-mark recording signal (FIG. 22D) based on the count value of the CAV clock counter signal (FIG. 22C) and a set signal that has been set in the system controller 1723 in advance. The period in which the pre-mark recording signal is set to H is set as the set signal. The pre-mark recording signal (FIG. 22D) is output a plurality of times during a single rotation of the disc, and the interval at which it is output is chosen over a range from the distance between sectors of the reflective layer to the spacing between ECC blocks, which are made from a plurality of sectors.

The record compensation portion 1705 creates a recording pulse (FIG. 22E) that indicates the laser emission strength and the timing at which the recording layer is to be irradiated, in the period that the pre-mark recording signal from the pre-mark record control portion 1704 is H. As the recording pulse, an intermittent multi-pulsed signal with sections of strong and weak laser intensity is generated.

The recording channel 1706 conducts laser emission onto the disc by controlling the amount of current that flows to the laser that is mounted in the recording and reproducing head 1701 based on the recording pulse from the record compensation portion 1705. As a result, pre-recording marks (FIG. 22F) are formed in the pre-mark recording region of the disc writing layer.

The recording device moves the recording and reproducing head 1701 in the outer circumferential direction by the width 1801 in the radial direction of the pre-marks, in accordance with a single rotation of the disc. By doing this, it is possible to form a plurality of pre-marks that are linear in the radial direction in the pre-mark recording region in the disc circumferential direction.

It should be noted that the operation of the pre-mark position detection mode of the recording and reproducing device is the same as the operation (FIG. 6) of the pre-mark detection device of the first embodiment, and thus is not be described here.

The operation of the pre-mark position recording mode of the recording and reproducing device is the same as the operation of the recording device for recording to write-once media that have a wobble, and thus is not described here. One feature of the configuration is that there is an internal memory that stores pre-mark position that has been encoded, and this pre-mark position information is recorded to the target address.

4. Reproducing Device

Next, the reproducing device for the disc made through disc manufacturing steps 1 through 4 is described.

Figure 23:
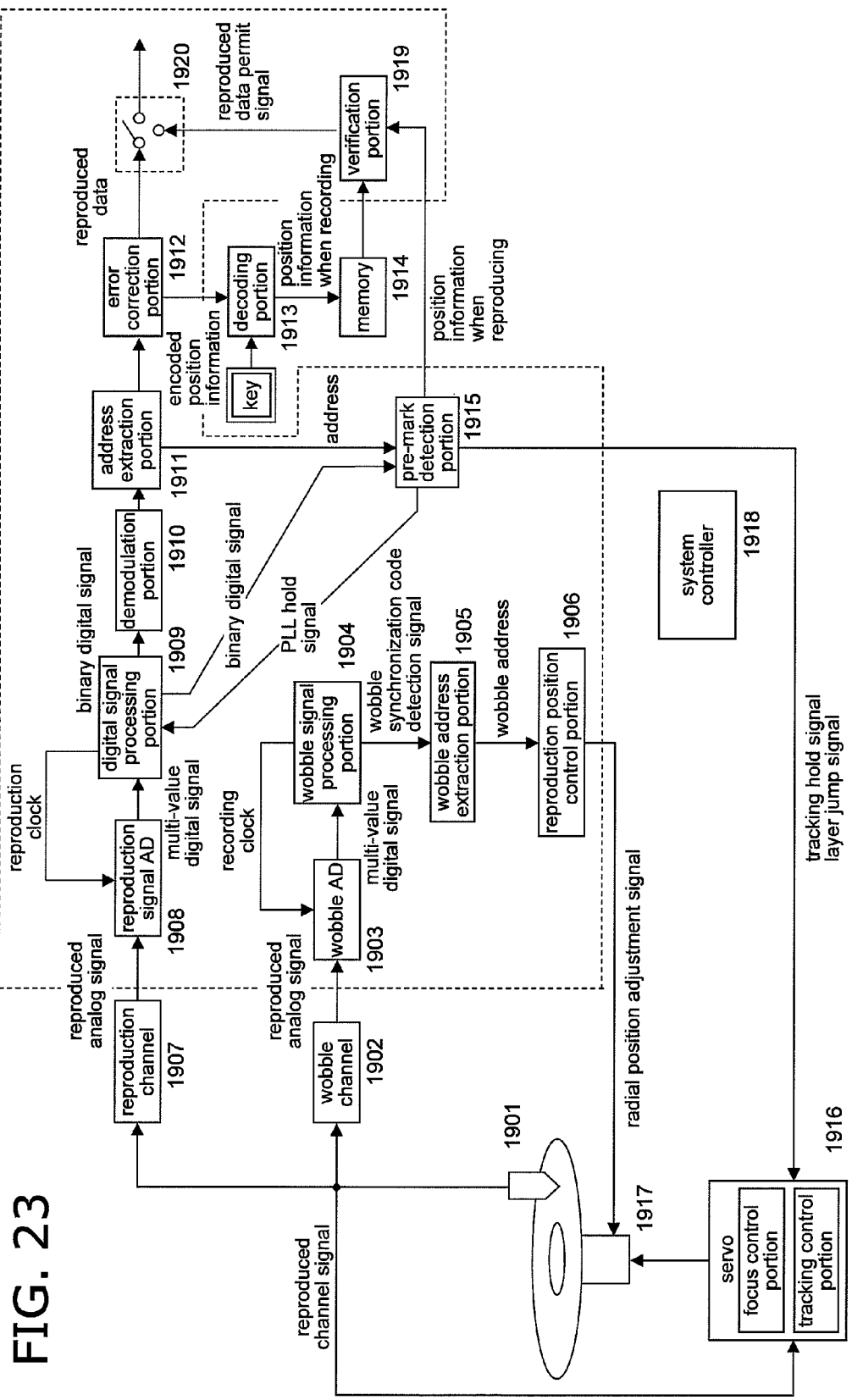
FIG. 23 is a block diagram that shows the configuration of the optical disc reproducing device according to the second embodiment.

FIG. 23 is a block diagram that shows the characteristic blocks of the reproducing device for the disc produced in disc manufacturing steps 1 through 4. The dotted line in the drawing indicates the scope of the LSI chip.

The reproducing device is made of a reproducing head 1901, a wobble channel 1902, a wobble AD 1903, a wobble signal processing portion 1904, a wobble address extraction portion 1905, a reproduction position control portion 1906, a reproduction channel 1907, a reproduced signal AD 1908, a digital signal processing portion 1909, a demodulation portion 1910, an address extraction portion 1911, an error correction portion 1912, a decoding portion 1913, a memory 1914, a pre-mark detection portion 1915, a servo 1916, a spindle motor 1917, a system controller 1918, a verification portion 1919, and a switch 1920.

First, when the disc is inserted into the reproducing device, the spindle motor 1917 rotates the disc under CAV control and moves the reproducing head 1901 to the radial position that corresponds to the address information set in advance in the system controller 1918 at which pre-mark position information has been recorded, and focuses the reproducing laser on the writing layer.

The reproducing head 1901 irradiates the writing layer with the reproducing laser and extracts the reproduction channel signal from the light that is reflected, and outputs this to the wobble channel 1902.

The wobble channel 1902 extracts the frequency component of the wobble band from the reproduction channel signal that is input, and creates a reproduced analog signal, which it outputs to the wobble AD 1903.

The wobble AD 1903 samples the reproduced analog signal that is input based on the input clock, creating a multi-value digital signal that it outputs to the wobble signal processing portion 1904.

The wobble signal processing portion 1904 has an internal PLL circuit, and extracts the reproduced analog signal and the clock signal with the same band, multiples these to create a recording clock, and outputs the result to the wobble AD 1903. It also detects the synchronization code that has been added to the wobble from the multi-value digital signal, and creates a wobble synchronization code detection signal and outputs this to the wobble address extraction portion 1905.

The wobble address extraction portion 1905 extracts wobble address information from the multi-value digital signal based on the wobble synchronization code detection signal that it receives, and outputs this to the reproduction position control portion 1906.

The wobble channel 1902 to the wobble address extraction portion 1905 that were described above have the same configuration as the wobble channel 1716 to the wobble address extraction portion 1719 of the recording and reproducing device of this embodiment.

The reproduction position control portion 1906 determines whether the current reproduction position is on the inner or outer circumferential side with respect to the target address for reproducing the position information that has been preset in the system controller 1918, and outputs a radial position adjustment signal to change the position of the reproducing head 1901. On the other hand, when it determines that the target address has been reached, the reproduction position control portion 1906 outputs a reproduction gate for reading the position information and starts the position information reading operation.

In the position information reading operation, first the reproducing head 1901 irradiates the disc with a reproducing laser, and from the reflected light extracts a reproduction channel signal that it outputs to the reproduction channel 1907.

The reproduction channel 1907 amplifies and performs waveform equalization on the reproduction channel signal that is input, creating a reproduced analog signal that it outputs to the reproduced signal AD 1908.

The reproduced signal AD 1908 samples the reproduced analog signal that is input with the clock that is input, and performs digital-analog conversion to create a multi-value digital signal and outputs this to the digital signal processing portion 1909.

The digital signal processing portion 1909 is provided internally with a PLL circuit and extracts a clock with the same frequency as the reproduced signal from the multi-value digital signal that is input and outputs it to the reproduced signal AD 1908. The digital signal processing portion 1909 also extracts a binary digital signal that is synchronized with the reproduction clock from the multi-value digital signal, and outputs this to the demodulation portion 1910.

The demodulation portion 1910 detects the synchronization code that is added each fixed period (each frame) from the binary digital signal that is input, and in synchronization with the timing at which the synchronization code is detected, the demodulation portion 1910 partitions the binary digital signal that is input into sectors to create sector partitioned data, and outputs these data to the address extraction portion 1911.

The address extraction portion 1911 extracts the address information that is added each sector from the sector partitioned data and separates off the address information, producing reproduced data, and outputs the reproduced data to the error correction portion 1912.

The error correction portion 1912 partitions the reproduced data that are input into a data portion and a parity portion, and performs error correction of the reproduced data based on the parity. The error-corrected data are output to the decoding portion 1913 as encoded position information.

The decoding portion 1913 decodes the encoded position information that is input with a secretly held internal key, obtaining recording position information and outputs this to the memory 1914, and the memory 1914 stores the position information.

The system controller 1723 obtains the address information for the recorded pre-marks from the decoded position information, and moves the focal position of the reproducing head 1901 from the writing layer to the reflective layer, which is behind or in front of the writing layer, and also moves the recording head 1901 to the radial position that corresponds to the address information that has been obtained.

After the focal position and the radial position of the reproducing head 1901 have been moved, the uneven marks that are formed in the reflective layer of the disc is irradiated with a reproducing laser, whose reflected light creates a reproduction channel signal, and the signal is output to the reproduction channel 1907.

The reproduction channel 1907 performs amplification and waveform equalization on the reproduction channel signal that is input, creating a reproduced analog signal, and outputs this to the reproduced signal AD 1908.

The reproduced signal AD 1908 samples the reproduced analog signal that is input with the clock signal that is input, performing analog-digital conversion and producing a multi-value digital signal, and outputs this to the digital signal processing portion 1909.

The digital signal processing portion 1909 extracts a clock that is synchronized with the reproduction signal with its PLL circuit from the multi-value digital signal, and then outputs this to the reproduced signal AD 1908 as the reproduction clock. The digital signal processing portion 1909 also binarizes the multi-value digital signal in synchronization with the reproduction clock, creating a binary digital signal, and outputs this to the demodulation portion 1910.

The demodulation portion 1910 detects the synchronization code that is added each frame from the binary digital signal that is input, and at the timing at which the synchronization code is detected, the demodulation portion 1910 partitions the binary digital signal into sectors to create sector partitioned data, and outputs these data to the address extraction portion 1911.

The address extraction portion 1911 extracts the address information that is added each sector from the sector partitioned data that have been input, and outputs the address information to the pre-mark detection portion 1915.

The pre-mark detection portion 1915 compares the address information that is input from the address extraction portion 1911 with the address information of the position information that is read from the disc, which is held in the system controller, and if it determines that the address information is matching, then it extracts the head position of the sector with that address and at the same moment creates a layer jump signal and a tracking hold signal and outputs these to the servo 1916, as well as extracts the PLL hold signal and outputs it to the digital signal processing portion 1909. The pre-mark detection portion 1915 also resets the value of its internal counter to 0 at that sector head position. It should be noted that this counter is a counter that counts the clock number in synchronization with the reproduction signal from the digital signal processing portion.

The digital signal processing portion 1909, which receives the PLL hold signal, stops operation of its internal PLL circuit, and outputs a reproduction clock that is fixed at the clock frequency immediately before the PLL hold signal is output.

The servo 1916 has an internal tracking control portion and a focus control portion, and with the focus control portion changes the focal position from the reflective layer to the writing layer when it receives the layer jump signal. The tracking control portion stops tracking control, fixing the radial position of the reproducing head 1901, over the period that the tracking hold signal that is input is being output.

The reproducing head 1901, whose focal position has been moved to the writing layer, irradiates the writing layer with a reproducing laser and creates a reproduction channel signal from the light that is reflected. The reproduction channel signal at this time is reproduced as a signal whose reflected light intensity is low only in the region where pre-marks are recorded, and in other regions the signal has a high reflected light intensity.

The reproduction channel 1907 amplifies and performs waveform equalization on the reproduction channel signal that is input. At this time, if a filter is provided that can extract bands lower than those for reproducing the recording marks of the writing layer and the reflective layer, then the pre-marks can be detected with precision.

Following this, the multi-value digital signal that was digitized by the reproduced signal AD 1908 is binarized by the digital signal processing portion 1909 in the same way as when reproducing the recorded marks of the writing layer or the reflective layer. It should be noted that the reproduction clock that is used for the sampling clock of the reproduced signal AD 1908 is a reproduction clock that is output after fixing the frequency of the reproduction clock with which the recording marks of the reflective layer are reproduced, according to the PLL hold signal from the pre-mark detection portion 1915. The binary digital signal is output to the pre-mark detection portion. It should be noted that the binary digital information at this time is a signal that is H only in sections of the reproduction channel signal where the reflectance is low, that is, it is a signal that is H only in the region where pre-marks are recorded.

When the pre-mark detection portion 1915 detects the rising edge of the binary digital signal that is input (that is, the start point of the pre-recording mark), it holds the value of its internal counter in a separate register as the pre-mark start position, and resets the counter to 0. Similarly, when it detects the falling edge of the binary digital signal (that is, the end point of the recording mark), it holds the value of its internal counter as the pre-mark end position. If a pre-mark is not detected, then it outputs a 0 for both the pre-mark start position and end position. By doing this, the information from the head position of a sector with a target address on the reflective layer to the recording position of the pre-mark on the writing layer is extracted by counting the reproduction clock, and this is output to the verification portion 1919 as the position information as reproduced.

The verification portion 1919 compares the position information when recording that is stored in the memory 1914 and the position information when reproducing that is input, and verifies whether or not they match within a predetermined threshold range, and only if they match does it output a reproduction permit signal to the switch 1920.

The switch 1920 performs the output of the reproduction data from the error correction portion 1912 only when the reproduction permit signal from the verification portion 1919 is output.

With the above configuration and operation, the reproducing device obtains the pre-mark record position that is extracted during the manufacturing process from the writing layer of the disc that is produced through disc manufacturing steps 1 through 4, and compares this against the pre-mark position information when reproducing, and unless the two match one another, the reproducing device does not permit any further reproduction.

The disc thus has superior properties in that it prevents the appearance of illegally copied discs by the fact that the information of the pre-mark positions when recording cannot be easily restored. This is because this position information includes reference information that is determined by the uneven marks of the reflective layer and the pre-mark recording position information of the writing layer, and this position information is managed at the channel rate. In order to properly copy the information it is necessary to position the two discs such that the positional relationship between the copy-source disc and the copy-destination disc is on the order of the channel (in Blu-ray discs, this is a range from several hundred nm to several μm), and in practical terms such positioning is difficult, and therefore illegal copying can be prevented.

Third Embodiment

Next, a third embodiment of the invention is described in detail using the drawings.

This embodiment is a method that uses the position information recording device and the position information reproducing device according to the first embodiment, and increases resistance against more clever, unauthorized analysis, by a third party with ill intent, of the content that was disclosed in the first embodiment, by scrambling or performing PE modulation, and then recording, the position information that is recorded to the disc writing layer.

Figure 24:
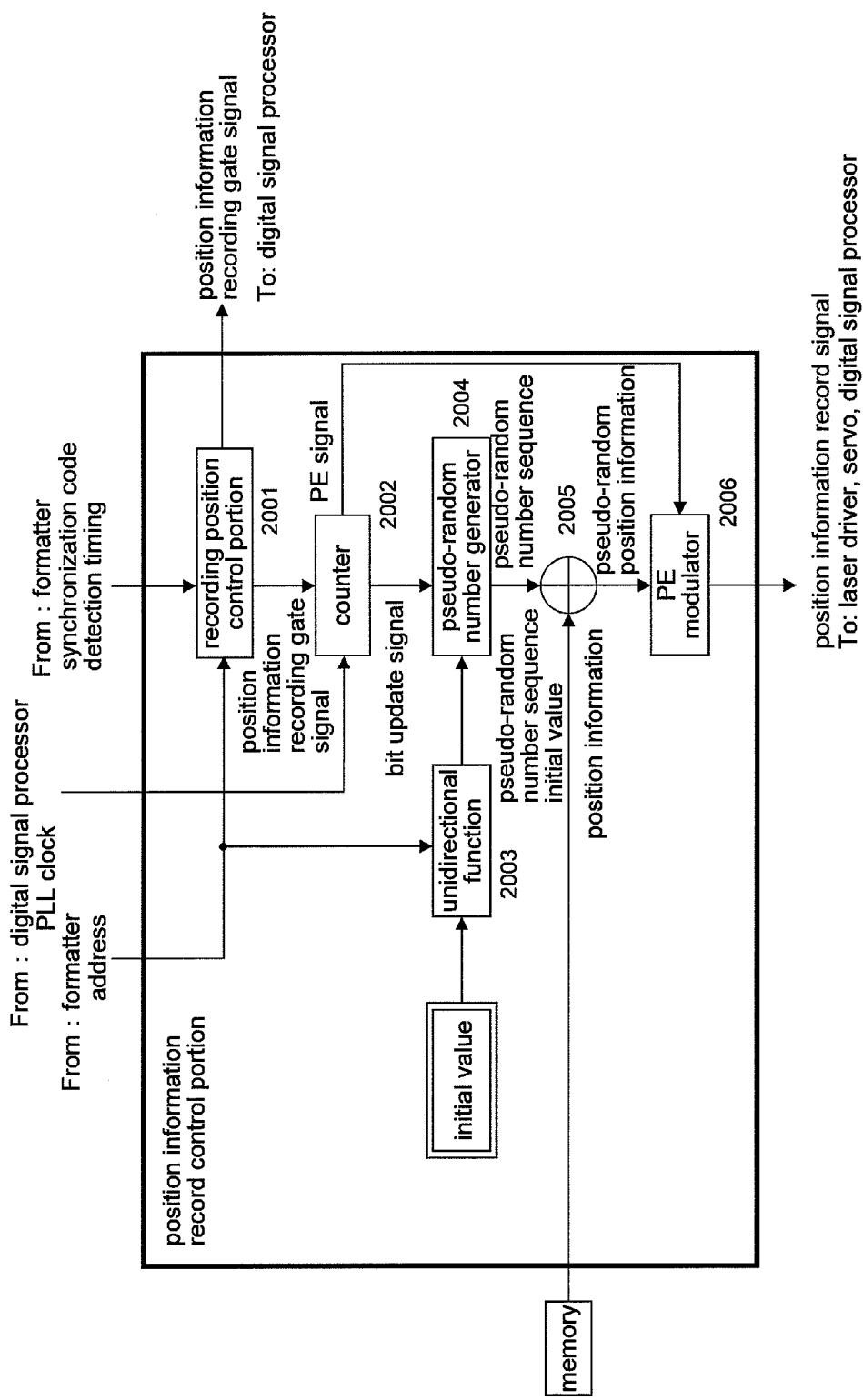
FIG. 24 is a block diagram that shows the configuration of the position information record control portion of the optical disc recording device of the third embodiment.

FIG. 24 is a characteristic block diagram of the position information record control portion according to this embodiment, and this corresponds to the position information record control portions 508 and 908 according to the first embodiment.

The position information record control portion receives the PLL clock from the digital signal processing portion 506/906, and the synchronization code detection timing and addresses from the formatter 507/907, and outputs a position information recording gate signal to the digital signal processing portion 506 and the servo 502, and outputs a position information recording signal to the laser driver 509/909, and is made from a record position control portion 2001, a counter 2002, a unidirectional function 2003, a pseudo-random number generator 2004, an EOR 2005, and a PE modulator 2006.

The position information record control portion 2001 detects a target address for recording the pre-mark position information extracted in disc manufacturing step 3, from the address and the synchronization code detection timing that is input from the formatter 507/907, and creates a position information recording gate signal from the head position of the sector that is indicated by that target address and outputs this to the counter 2002. It should be noted that the position information recording gate signal is output at H until recording of the position information is complete.

The counter 2002 is made of a counter that operates in synchronization with the PLL clock from the digital signal processor 506/906, in the range indicated by the position information recording gate signal that is input. This counter resets (sets to 0) its count value with the synchronization code that is input. It creates a timing signal for recording one bit of position information, as a bit update signal, based on the counter value of the counter, and outputs this to the pseudo-random number generator 2004.

This embodiment describes an implementation in which a Blu-ray disc is used as the disc, and three bits of position information are recorded in the period of one frame (1932 channel bits). In other words, in the period that the position information recording gate signal is H, a single bit of position information is recorded in the unit of 644 channel bits. Based on the remainder when the counter value is divided by 644, the counter 2002 creates a PE signal that is H when the remainder is less than 322, and creates a PE signal that is L when the remainder is 322 or more, and outputs this to the PE modulator 2006.

The unidirectional function 2003 performs data conversion with a unidirectional function of the address that is input from the formatter 507/907, to which a 2 is added (in other words, in a Blu-ray disc, where the address increases by +2 each sector, this is the target address for recording position information immediately prior to the output of the position information recording gate signal), and an initial value held internally. The unidirectional function is a hash function mode in AES or DES encoding, for example. The pseudo-random number sequence initial value that is output due to the unidirectional function is output to the pseudo-random number sequence generator 2004.

The pseudo-random number sequence generator 2004 is a M-sequence code generator or Gold code generator generally made from shift registers, and immediately before the recording gate is output (at any time during reproduction of the sector from which the address immediately before the target address can be detected), it sets the pseudo-random number sequence initial value that is input to an internal shift register. The pseudo-random number sequence generator 2004 also creates a pseudo-random number sequence one bit at a time at the timing of the output of the bit update signal that is input, and outputs this to the EOR 2005.

The EOR 2005 is primarily made of a general exclusive OR gate, and in accordance with the bit update signal from the counter 2002, obtains 1 bit of position information stored on the memory 500/900 at a time, and calculates an exclusive OR with the 1-bit pseudo-random number sequence from the pseudo-random number sequence generator 2004, producing one bit of pseudo-random position information, and outputs this to the PE modulator 2006.

The PE modulator 2006, like the EOR 2005, is primarily constituted by an exclusive OR gate, and calculates the exclusive OR of the PE signal that is input and the pseudo-random position information, creating a position information recording signal, and outputs this to the laser driver 509/909.

The laser driver 509/909 emits a recording laser in a multi-pulse or a rectangular wave during the period that the position information recording signal that is created by the position information record control portion is H, and recording position information that has been spectrum converted with the pseudo-random number sequence and also PE modulated is recorded to the writing layer.

It should be noted that if there are not both a recording head and a reproducing head like in FIG. 13, and the recording laser is to be emitted as a multi-pulse at a band near the reproduction channel frequency (about 2 to 15 times the channel frequency), then the position information recording gate signal that is created by the position information control portion 2001 is output to the digital signal processor 506/906, and the frequency of the PLL clock that is output from the PLL circuit within the digital signal processor 506/906 is not tracked during the period that the recording gate signal is output (the frequency immediately prior to output of the recording gate signal is held). This makes it possible to extract a stable PLL clock, which was difficult to achieve because irradiation with a multi-pulse makes it difficult to separate the multi-pulse band and the channel band from the reproduction channel signal when the laser is emitted from the head, which decreases the accuracy of frequency tracking to the reproduction channel signal with the PLL circuit.

Further, if there are not both a recording head and a reproducing head like in FIG. 13, and the recording laser is not emitted as a multi-pulse at a band near the reproduction channel frequency (about 2 to 15 times the channel frequency) (that is, if the recording laser is a rectangular recording pulse), then the position information recording signal from the PE modulator 2006 is output to the digital signal processing portion 506/906, controlling the gain of the reproduction channel signal when irradiating the recording laser and when irradiating the reproducing laser. Ordinarily, if there is a significant difference in intensity between the recording laser and the reproducing laser with which the disc is irradiated, then the gain of the reproduction channel signal when emitting the recording laser and when emitting the reproducing laser changes and the PLL circuit does not operate stably; however, by doing this it is possible to keep the reproduction channel signal gain equally both when emitting the recording laser and when emitting the reproducing laser, and thus it is possible to stably produce a clock signal with the PLL circuit.

Emission of the recording laser is not contingent on a multi-pulse or a rectangular pulse, and in position recording devices that do not have two heads 901 and 910 for reproducing from the reflective layer and recording to the writing layer, respectively, as shown in FIG. 7, the position information recording signal from the PE modulator 2006 is output to the servo. The servo determines the timings when the recording laser is emitted and when the reproducing laser is emitted from the position information recording signal, and performs tracking control or focus control by controlling the gain of the servo control signal (such as the tracking error signal or the focus error signal) from the reproducing head. Ordinarily, if there is a significant difference in the power intensity of the recording laser and the reproducing laser, then the amplitude of the error signals that are input to the servo is not stable, and it is not possible to stably perform tracking control or focus control, but this gain control keeps the amplitude of the error signals that are input to the servo substantially constant, allowing tracking control and focus control to be performed stably.

Next, the operation of the position information recording device is described in detail.

Figure 25:
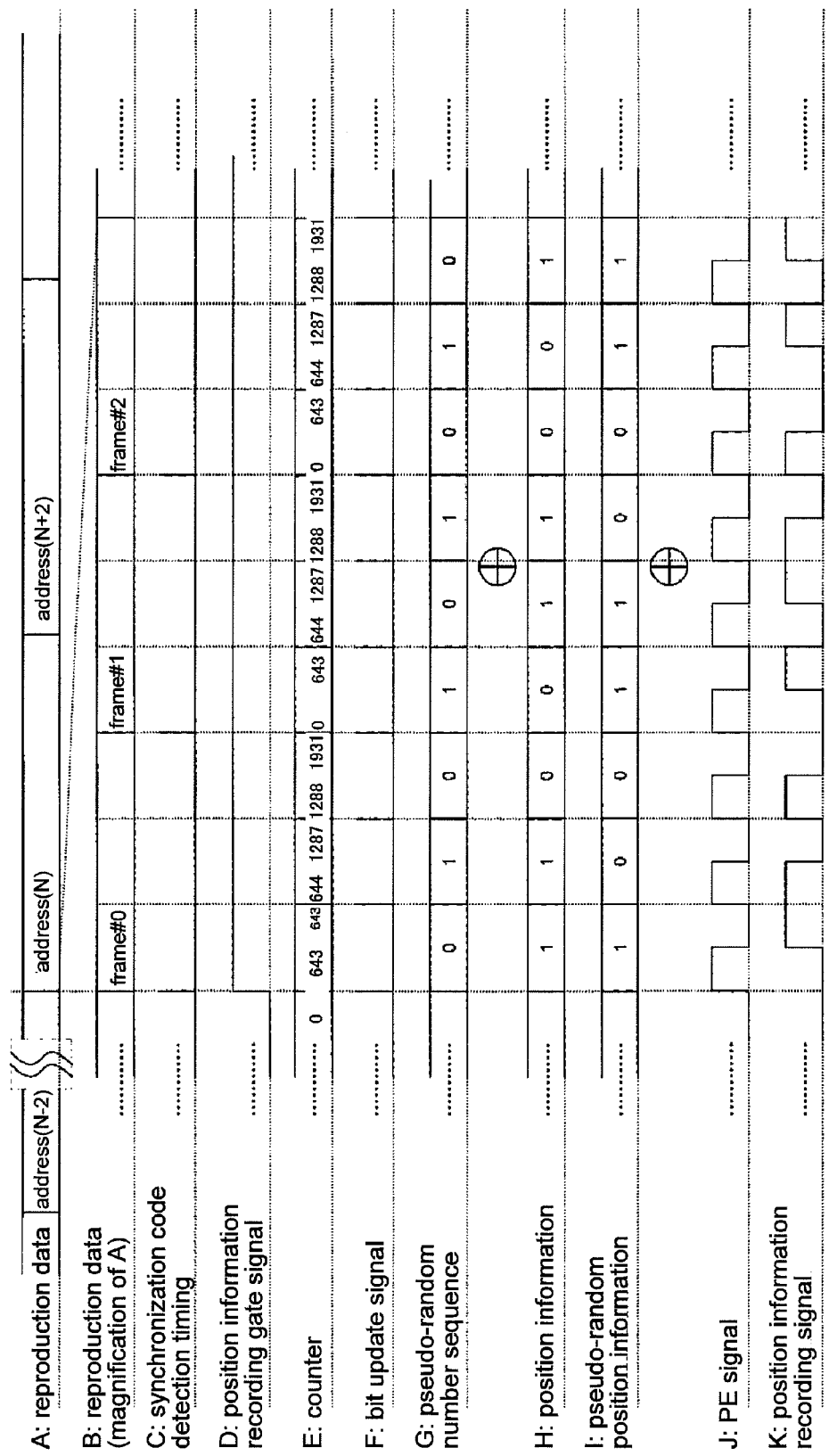
FIG. 25 is a timing chart that shows the operation of the position information record control portion of the optical disc recording device of the third embodiment.

FIG. 25 is a timing chart that shows the characteristic operation of the position information record control portion of the position information recording device.

First, the reflective layer which has uneven marks of the disc is irradiated with a reproducing laser, and a reproduction channel signal is created from the light that is reflected, this signal is digitized and partitioned into frame units with the synchronization code beings detected by the formatter 507/907, and the signal is partitioned into sector units each having address information and made of a plurality of frames, thus creating the reproduction data of FIGS. 25A and 25B. The formatter 507/907 extracts the synchronization code detection timing of FIG. 25C in synchronization with the detection of the synchronization code of the frame units, and inputs this to the position information record control portion.

The record position control portion 2001 creates a position information recording gate signal (FIG. 25D) from the head position of the sector that has the target address for recording position information, which is set in advance in a system controller that is not shown, based on the synchronization code detection timing signal that is input and the address from the formatter 507/907, and outputs this to the counter 2002. In this example, the target address is described as N. In other words, position information is recorded from the sector head with the address N. The position information recording gate signal (FIG. 25D) is output such that it is H over the range where the position information is recorded. In this embodiment, three bits of position information are recorded per frame, and thus for example if 166 bits are to be recorded as position information, then the signal is output at H over a period of 498 frames. Further, if the 166 bits are recorded three times in order to improve the reliability, then a position information recording gate signal (FIG. 25D) is output over a range of 1494 frames (=3 Physical Clusters).

The counter 2002 counts (FIG. 25E) the PLL clock that is input while a position information recording gate signal (FIG. 25D) that is H is input. The counter value is reset to 0 at the timing that the synchronization code detection timing is output from the formatter. The counter outputs a bit update signal (FIG. 25F) when the quotient of its internal counter value (FIG. 25E) and 644 is 0. Thus, the bit update signal (FIG. 25F) is output three times within a single frame.

The pseudo-random number generator 2004 shifts its internal shift registers when a bit update signal that is H is input, and generates a one-bit pseudo-random number sequence and outputs this as a pseudo-random number sequence (FIG. 25G). Consequently, the pseudo-random number sequence generator 2004 generates a one-bit pseudo-random number sequence per 644 channel bits, or, in order words, a three-bit pseudo-random number sequence (FIG. 25G) per frame, and outputs this to the EOR 2005.

The EOR 2005 retrieves one bit of position information (FIG. 25H) at a time from the memory 500/900 in synchronization with the bit update signal (FIG. 25F) from the counter 2002, and calculates an exclusive OR with the pseudo-random number sequence (FIG. 25G) that is input, creating pseudo-random position information (FIG. 25I).

The counter 2002 creates a PE signal (FIG. 25J) that is H when the remainder of the quotient of its internal counter value (FIG. 25E) and 644 is less than 322 and creates a PE signal that is L at other times, and outputs this to the PE modulator 2006. Therefore, the PE signal (FIG. 25J) is created as a three-cycle signal in a single frame of 1932 channel bits.

The PE modulator 2006 calculates the exclusive OR of the PE signal (FIG. 25J) and the pseudo-random position information that is input (FIG. 25I), creating a position information recording signal (FIG. 25K), and outputs this to the laser driver 509/909.

The laser driver 509/909 emits the recording laser during the period that the position information signal record signal that is input is H, and irradiates the reproducing laser when that signal is L, so as to form recording marks in the disc writing layer and record position information that has been spectrum diffused due to the pseudo-random number sequence and PE modulated based on the PE signal.

It should be noted that if there are not both a recording head and a reproducing head like in FIG. 13, and the recording laser is to be emitted as a multi-pulse at a band near the reproduction channel frequency (about 2 to 15 times the channel frequency), then the position information recording gate signal (FIG. 25D) that is created by the position information control portion 2001 is output to the digital signal processor 506/906, and the frequency of the PLL clock that is output from the PLL circuit within the digital signal processor 506/906 is not tracked during the period that the recording gate signal is output (the frequency immediately prior to output for the recording gate signal is maintained). This makes it possible to extract a stable PLL clock, which was difficult to achieve because irradiation with a multi-pulse makes it difficult to separate the multi-pulse band and the channel band from the reproduction channel signal when the laser is emitted from the head, which decreases the accuracy of frequency tracking to the reproduction channel signal with the PLL circuit.

Further, if there are not both a recording head and a reproducing head like in FIG. 13, and the recording laser is not emitted as a multi-pulse at a band near the reproduction channel frequency (about 2 to 15 times the channel frequency) (that is, if it is a rectangular recording pulse), then the position information recording signal (FIG. 25K) from the PE modulator 2006 is output to the digital signal processing portion 506/906, and the gain of the reproduction channel signal when irradiating the recording laser and when irradiating the reproducing laser is controlled. Ordinarily, if there is a significant difference in intensity between the recording laser and the reproducing laser with which the disc is irradiated, then the gain of the reproduction channel signal when emitting the recording laser and when emitting the reproducing laser changes and operation of the PLL circuit is not stable; however, by doing this it is possible to maintain the reproduction channel signal gain equally both when emitting the recording laser and when emitting the reproducing laser, and thus it is possible to stably produce a clock signal with the PLL circuit.

Emission of the recording laser is not contingent on a multi-pulse or a rectangular pulse, and in position recording devices that do not have two heads 901 and 910 for reproducing from the reflective layer and recording to the writing layer, respectively, as shown in FIG. 13, the position information recording signal from the PE modulator 2006 (FIG. 25K) is output to the servo. The servo determines the timings when the recording laser is emitted and when the reproducing laser is emitted from the position information recording signal (FIG. 25K), and performs tracking control or focus control by controlling the gain of the servo control signal from the reproducing head (such as the tracking error signal or the focus error signal). Ordinarily, if there is a significant difference in the power intensity of the recording laser and the reproducing laser, then the amplitude of the error signals that are input to the servo is not stable, and it is not possible to stably perform tracking control or focus control, but this gain control keeps the amplitude of the error signals that are input to the servo substantially constant, allowing tracking control and focus control to be performed stably.

With a position information record control having the above configuration, the position information to be recorded can be recorded after spectrum diffusion with the pseudo-random number sequence and PE modulation. Spectrum diffusion makes it difficult to uncover the position information recording method by back analysis from the reproduced signal of the position information, and thus it is even more difficult to produce illegal copies of the disc. Since the address information of the sector unit is applied with the pseudo-random number sequence that is generated using an initial value obtained by converting with the unidirectional function, this increases the degree of difficulty in back analysis of the unidirectional function.

Through PE modulation it is possible to keep the ratio of sections where recording marks are formed in the writing layer and sections where recording marks are not formed at 50% each. Thus, the recording mark section (or section where recording marks are not formed) does not continue, and thus changes in the modulation properties during reproduction can be stably extracted. This is because if the section where recording marks are formed (or the section where they are not formed) continues, then in some cases the center level may change due to the operation of tracking to the center level of the reproduction channel by the reproducing device, and eliminate changes in the modulation properties of the reproduction channel.

In the above regard, this embodiment can be thought of as a more effective implementation than the first embodiment.

Next, the position information restoring portion of the position information reproducing device (FIG. 15) according to this embodiment is described in detail.

Figure 26:
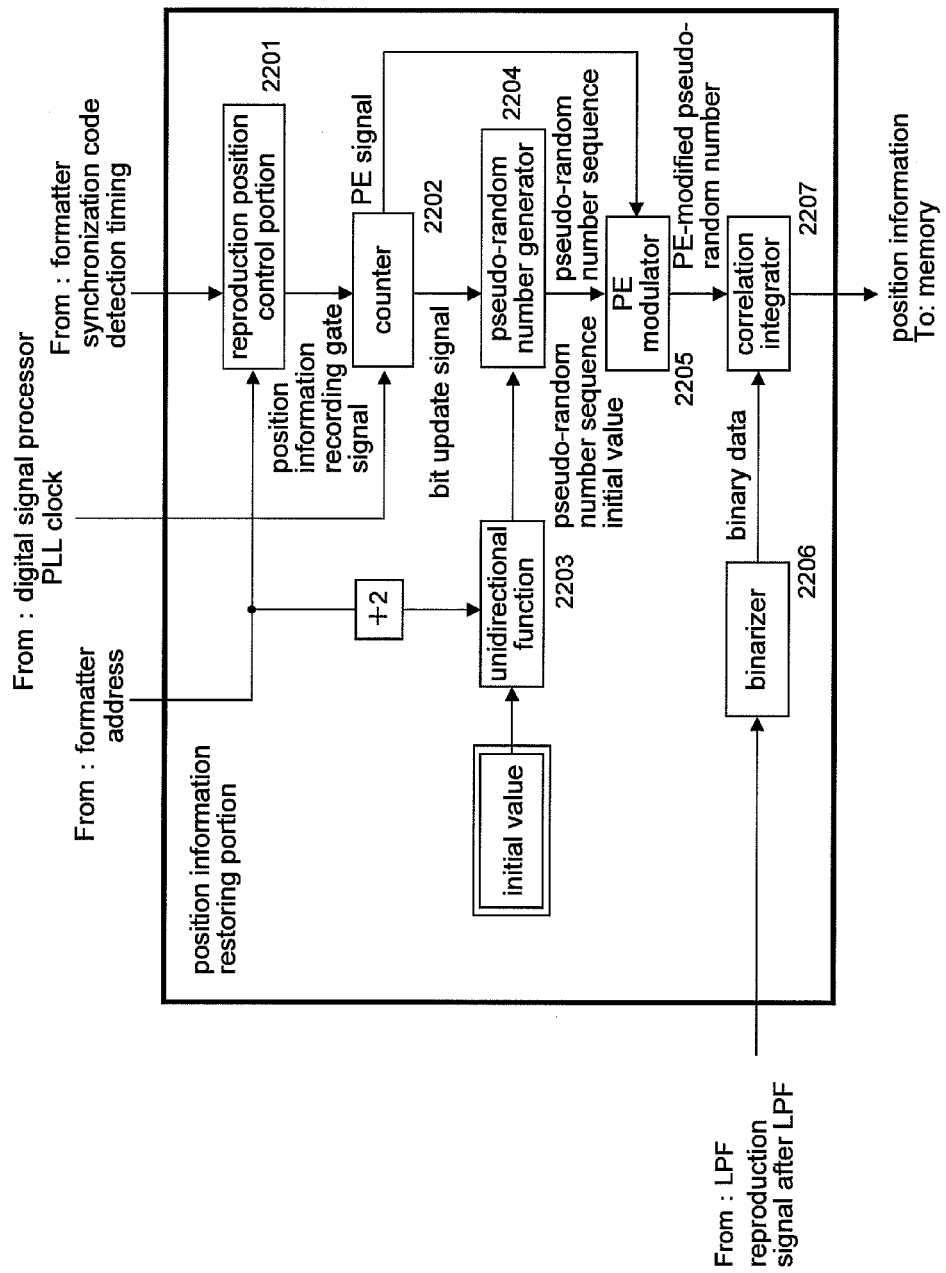
FIG. 26 is a block diagram that shows the configuration of the position information restoring portion of the optical disc reproducing device of the third embodiment.

FIG. 26 is a block diagram of the characteristic features of the position information restoring portion according to this embodiment, which is a section that corresponds to the position information restoring portion 1111 according to the first embodiment.

The position information restoring section is a block for restoring the position information from the recording marks that are recorded to the writing layer after executing spectrum diffusion and PE modulation, and is made of a reproducing position control portion 2201, a counter 2202, a unidirectional function 2203, a pseudo-random number generator 2204, a PE modulator 2205, a binarizing portion 2206, and a correlation integrator 2207.

The reproducing position control portion 2201 is a section that creates a position information detection gate signal from the head position of the sector that has the target address for reproducing the position information, which is set in advance in a system controller that is not shown, based on the address and the synchronization code detection timing from the formatter 1108, and has the same configuration as the record position control portion 2001 in the position information record control portion.

The counter 2202 is made of a counter that counts the PLL clock from the digital signal processor 1106 in the period during which the position information detection gate signal that is input is output, and has the same configuration as the counter 2201 of the position information record control portion.

The unidirectional function 2203, during the interval of the sector that is immediately prior to the sector with the target address, performs data conversion of the address that is input, to which 2 has been added, with a secret initial value that it holds internally, creating a pseudo-random number sequence initial value, and outputs this to the pseudo-random number sequence generator 2204, and the unidirectional function 2203 has the same configuration as the unidirectional function 2203 of the position information record control portion.

The pseudo-random number generator 2204 is a section that sets a pseudo-random number sequence initial value that is input to an internal shift register in the sector in front of the target address, and at the timing of the bit update signal that is input, generates a pseudo-random number sequence one bit at a time in the period that the position information detection gate signal is output, and has the same configuration as the pseudo-random number sequence generator 2204 of the position information record control portion.

The PE modulator 2205 calculates the exclusive OR of the pseudo-random number sequence that is input and the PE signal, creating a PE-modulated pseudo-random coefficient, and outputs this to the correlation integrator 2207.

The binarizing portion 2206 extracts a binary signal that is H on the +side, and L on the –side, with respect to the center position, from the post-LPF reproduction signal that has been subjected to band restriction and that is output from the LPF 1110, and outputs this to the correlation integrator 2207.

The correlation integrator 2207 is a portion that determines the correlation between the binary data and the PE-modulated pseudo-random coefficient, and integrates the correlation value. Over the range that one bit of position information (in this embodiment, a 644 bit period) is reproduced, the correlation integrator 2207, in synchronization with the PLL clock, adds +1 if there is a positive correlation between the binary data and the pseudo-random number sequence, and –1 if this correlation is negative, with an up-down counter that corresponds to the position information bit to be detected. With this configuration, in the period that one bit of position information is recorded, the integrated value when a positive correlation is detected gradually shifts in the +direction and the integrated value when a negative correlation is detected gradually shifts in the –direction, and in the period that one bit of position information is detected, if the integrated value is + then a 0 is created as the one bit of position information, whereas if the integrated value is – then a 1 is created as the one bit of position information, and this is stored in the memory 1113. The EOR 2005 of the position information record control portion calculates and records an exclusive OR of the pseudo-random number sequence and the position information, that is, when the position information bit is a 1 it inverts and records the pseudo-random number sequence bit, and thus in this period, a negative correlation is found, and a 1 can be detected at the time of reproduction.

The operation of the position information restoring portion of the position information reproducing device is described next.

Figure 27:
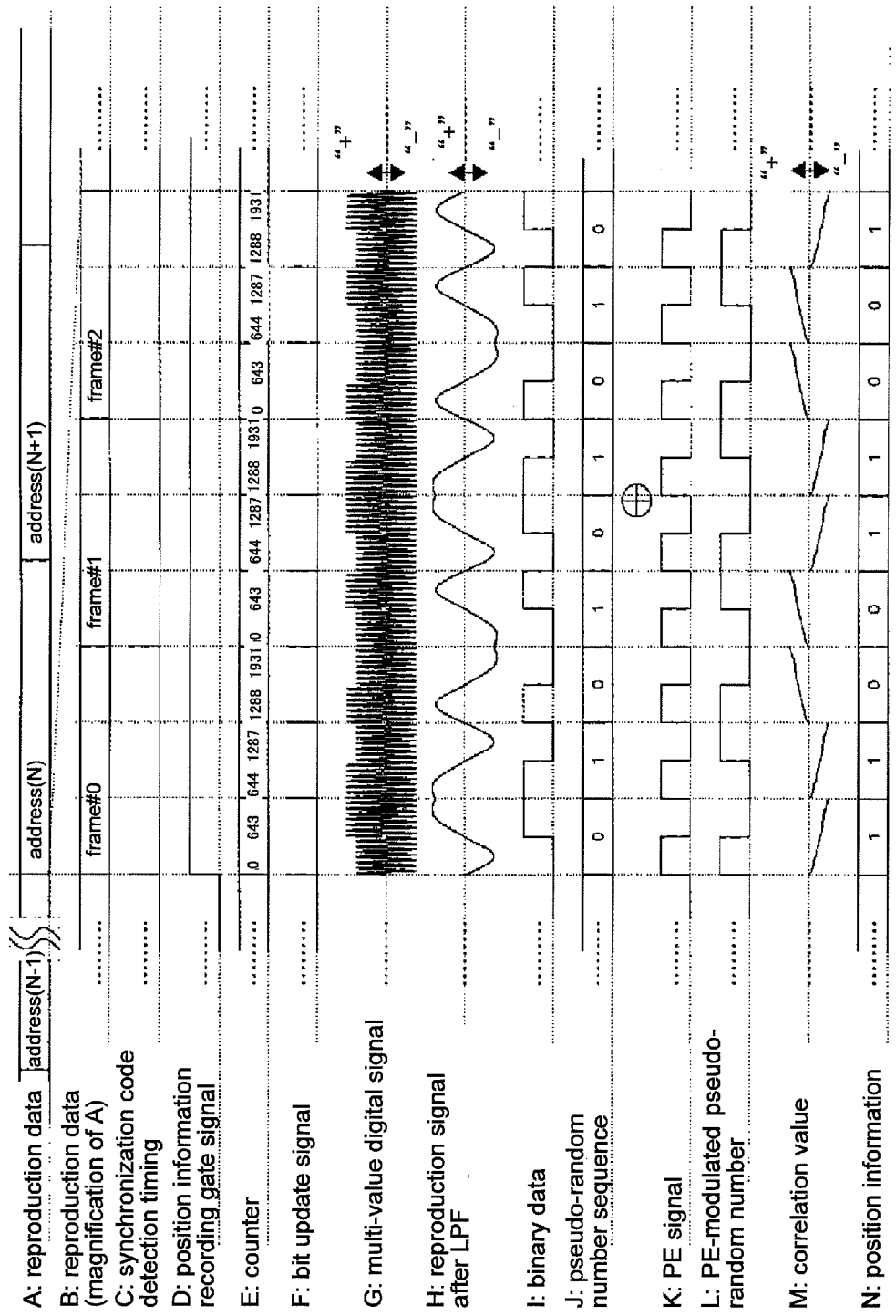
FIG. 27 is a timing chart that shows the operation of the position information restoring portion of the optical disc reproducing device of the third embodiment.

FIG. 27 is a timing chart that shows the characteristic operation of the position information restoring portion.

First, the reflective layer which has uneven marks, of the disc is irradiated with a reproducing laser, and a reproduction channel signal is created from the light that is reflected, this signal is digitized and partitioned into frame units with the synchronization code beings detected by the formatter 1108, and the signal is partitioned into sector units each having address information and made of a plurality of frames, thus creating the reproduction data (FIGS. 27A and 27B). The formatter 1108 extracts the synchronization code detection timing (FIG. 27C) in synchronization with the timing of the detection of the synchronization code of the frame units, and inputs this to the position information restoring portion.

The reproducing position control portion 2201 creates a position information detection gate signal (FIG. 27D) from the head position of the sector that has the target address for detecting position information, which is set in advance in a system controller that is not shown, based on the synchronization code detection timing signal that is input and the address from the formatter 1108, and outputs this to the counter 2002. In this example, the target address is described as N. In other words, position information is detected from the sector head with the address N. The position information detection gate signal (FIG. 27D) is output such that it is H over the range where the position information is detected. In this embodiment, three bits of position information are detected per frame, and thus for example if 166 bits are recorded as position information, then the signal is output at H over a period of 498 frames. Further, if the 166 bits are recorded three times in order to improve the reliability, then a position information detection gate signal (FIG. 27D) is output over a range of 1494 frames (=3 Physical Clusters).

The counter 2202 counts (FIG. 27E) the PLL clock that is input while a position information detection gate signal (FIG. 27D) that is H is input. The counter value is reset to 0 when the synchronization code detection timing is output from the formatter 1108. The counter outputs a bit update signal (FIG. 27F) when the quotient of its internal counter value (FIG. 27E) and 644 is 0. Thus, the bit update signal (FIG. 27F) is output three times within a single frame.

The pseudo-random number generator 2204 shifts its internal shift registers when an "H" bit update signal (FIG. 27F) is input, and generates a one-bit pseudo-random number sequence and outputs this as a pseudo-random number sequence (FIG. 27J). Consequently, the pseudo-random number sequence generator 2204 generates a one-bit pseudo-random number sequence (FIG. 27J) per 644 channel bits, or, in order words, three bits per frame, and outputs this to the PE modulator 2205.

The counter 2202 creates a PE signal (FIG. 27K) that is H when the remainder of the quotient of its internal counter value (FIG. 27E) and 644 is less than 322 and creates a PE signal that is L at other times, and outputs this to the PE modulator 2205. Therefore, the PE signal (FIG. 27K) is created as a three-cycle signal in a single frame of 1932 channel bits.

The PE modulator 2205 calculates the exclusive OR of the PE signal (FIG. 27K) and the pseudo-random number sequence that is input (FIG. 27J), creating a PE-modulated pseudo-random sequence (FIG. 27L).

The band of the multi-value digital signal (FIG. 27G) that is obtained by the AD 1105 digitizing the reproduction channel signal is restricted by the LPF 1110, creating a post-LPF reproduction signal (FIG. 27H), and this is input to the position information restoring portion.

The binarizing portion 2206 creates binary data (FIG. 27I) that are H on the +side, and L on the –side, of a central position of the post-LPF reproduction signal that is input, and outputs the data to the correlation integrator 2207.

The correlation integrator 2207 is a portion that integrates the correlation between the binary data (FIG. 27I) that are input and the PE-modulated pseudo-random coefficient (FIG. 27L) in synchronization with the PLL clock, with an up-down counter in the period that one bit of position information is detected. In other words, if the binary data (FIG. 27I) is 0 and the PE-modulated pseudo-random coefficient (FIG. 27L) also is 0, then the correlation integrator 2207 adds +1 to the counter value, whereas conversely, if the PE-modulated pseudo-random coefficient (FIG. 27L) is 1, then the correlation integrator 2207 adds −1 to the counter value. Further, if the binary data (FIG. 27I) is 1 and the PE-modulated pseudo-random coefficient (FIG. 27L) is 0, then the correlation integrator 2207 adds −1 to the counter value, whereas conversely, if the PE-modulated pseudo-random coefficient (FIG. 27L) is 1, then the correlation integrator 2207 adds +1 to the counter value. Thus, a correlation value (FIG. 27M) that corresponds to one bit of position information is found. Based on the correlation value, it is possible to extract the position information (FIG. 27N) by detecting a 0 for the one bit of position information for a +correlation value, and detecting a 1 for the one bit of position information for a −correlation value.

The position information record control portion and the position information restoring portion with the above configuration allow for recording to the writing layer after performing spectrum diffusion and PE modulation of the position information, and also allow position information to be detected by detecting the correlation between the binary data that are reproduced and the PE-modulated pseudo-random sequence.

The effect of spectrum diffusion is that it is difficult to decode the method of recording the position information from the reproduction signal that is reproduced, and therefore it is possible to increase resistance against illegal copying and imitations. Because a pseudo-random number sequence is created by setting a pseudo-random number sequence initial value that is obtained by converting data of the address information with the unidirectional function each sector, this also makes decoding from the reproduction signal difficult and also does not allow correct position information to be recorded and reproduced without knowing the initial value for data conversion of the address with the unidirectional function.

It should be noted that this embodiment describes an implementation in which the address is subjected to data conversion and used as the pseudo-random number sequence initial value, but it is also possible to use a media identifier that is recorded with bar-code modulation or an initial value table prepared in advance, for example.

Further, in this embodiment, a signal that is obtained by binarizing the post-LPF reproduction data is input to the correlation integrator, but the same effect can be attained by integrating the post-LPF reproduction signal before binarization, or by integrating the multi-value reproduction signal before LPF.

Fourth Embodiment

Figure 28:
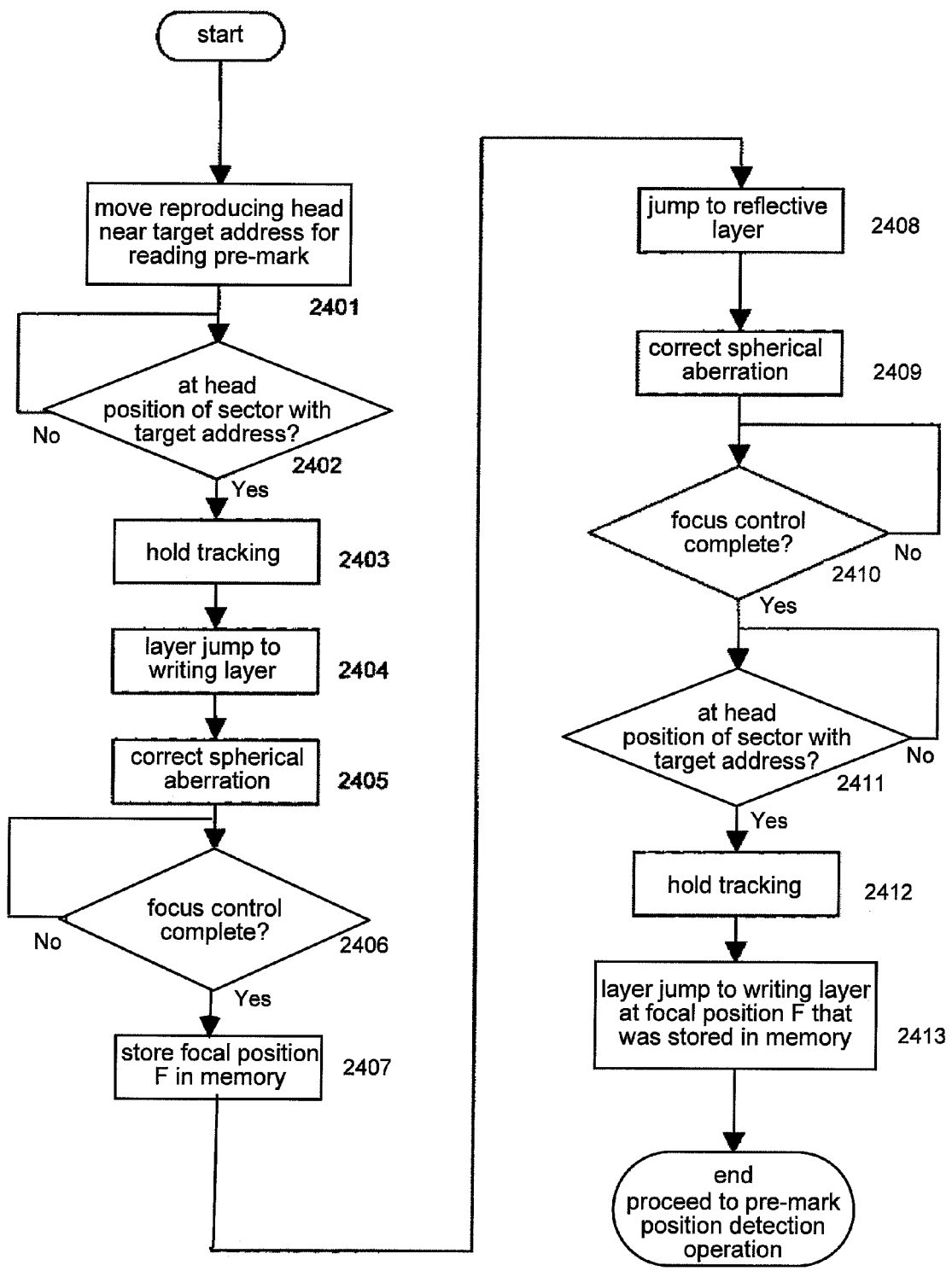
FIG. 28 is a flowchart that shows the focus switching operation of the fourth embodiment.

This embodiment discloses a method of quickly executing a layer jump from the reflective layer to the writing layer, with the servo 408 of the pre-mark position detection device (FIG. 5), the servo 502 of the pre-mark recording device (FIG. 5) for recording pre-mark position information by jumping to the writing layer, and the servo 1406 of the optical disc reproducing device (FIG. 17) according to the first embodiment, or the servo 1713 of the recording and reproducing device (FIG. 21) and the servo 1916 of the reproducing device (FIG. 23) according to the second embodiment. FIG. 28 is a flowchart that shows the procedure of the layer jump operation according to this embodiment. Through this procedure, if a layer jump is to be made by moving the focal position from the reflective layer to the writing layer, then the focal position is controlled to the writing layer in advance and that controlled position is stored, and then when making the jump to the writing layer in order to detect the pre-mark position with the position information detection device or the reproducing device, the layer jump is executed using the focal position that has been stored.

First, a system controller, which is not shown, moves the head 401, 501, 1401, 1701, or 1901 to the radial position that corresponds to the target address, based on the target address for detecting the pre-mark position that has been set in advance (S2401).

Next, based on the reproduction signal that is reproduced, it is determined whether the focal position is at the head position of the target address sector (S2402). If it is determined that it is at the head position, then the servo stops tracking control and maintains a state in which the tracking is held (S2403). On the other hand, if it is determined that the head is before the head position of the target address sector, then the reproduction operation is continued until the head position of the target address sector is reached. If it is determined that the head is past the head position of the target address sector, then the head is moved to the radial position that corresponds to the head position of the target address sector.

After performing control to maintain the tracking hold state, the servo performs a layer jump to the writing layer with its internal focus control portion (S2404).

Ordinarily, it is not possible to perform accurate focus control due to nonuniformities in the thickness of the disc, even when the focal position is moved by only the distance between the reflective layer and the writing layer. Thus, after the layer jump is performed, spherical aberration correction is executed (S2405) to correct the shift in the focal position due to thickness nonuniformities. Ordinarily, this spherical aberration correction requires about several 100 ms of time.

Next, spherical aberration correction is completed and it is determined whether or not focus control is complete (S2406), and if complete, that focal position is stored in the memory (S2407). On the other hand, if focus control is not complete, then the device remains on standby until focus control is completed.

When focus control is complete and the focus control position has been stored in the memory, another a layer jump is performed, to the reflective layer (S2408).

After jumping to the reflective layer, spherical aberration correction with the reflective layer is performed (S2409) and it is determined whether focus control onto the reflective layer is complete (S2410).

If it is determined that control of the focus onto the reflective layer is complete, then once again the head position of the sector with the target address is searched for (S2411).

If it is determined that the head is at the head position of the target address, then tracking control that is performed based on the recording marks of the reflective layer is interrupted, and the radial position of the head is fixed (S2412).

Lastly, the focal point of the laser of the head, whose tracking position has been fixed, is jumped to the writing layer, using the focal position that has been stored in the memory (S2413).

Thus, using this procedure, it is possible to form a recording mark in the writing layer immediately below or immediately above (that is, at the same radial position as) a recording mark that has been recorded to the reflective layer, from the sector head position with the target address. Ordinarily, when jumping between layers it is necessary to perform spherical aberration correction after the focal position is changed, in order to correct for nonuniformities in the thickness of the disc. This spherical aberration correction requires about several 100 ms to complete. With Blu-ray discs, a time on the order of several 100 ms corresponds to several revolutions, and thus it is not possible to jump the focus from the sector head position of the target address to the writing layer and then immediately form recording marks in the writing layer. Further, shifts in the focal position of several µm constantly occur unless spherical aberration correction is performed, making it impossible to stably form recording marks in the writing layer.

With the layer jump method of this embodiment, first, a layer jump is made in advance from the head position of the sector of the target address to the writing layer, spherical aberration correction is performed, and the focal position is obtained and stored in the memory. As soon as the focal position is obtained, a layer jump is made to the reflective layer, and once again a layer jump is made from the head position of the sector of the target address to the writing layer. At this time, using the focal position that was stored in advance obviates the need for spherical aberration correction, and thus it is possible to instantaneously jump from the head position of the sector of the target address to the writing layer and form a recording mark immediately below or immediately above the recording mark of the reflective layer.

It should be noted that the position information recording device of the first embodiment was described with regard to an implementation in which the position information is recorded by irradiating the writing layer with a defocused recording laser, and an implementation in which there is a reproducing head for reproducing the reflective layer and a recording head for recording position information to the writing layer, but it is also beneficial to adopt this embodiment for the position information recording device of the first embodiment.

As shown in FIG. 29, in this embodiment the focal position is moved from the reflective layer to the writing layer at the target address for recording position information, and then position information is recorded.

The position information recording device of this embodiment is a device for recording position information to the writing layer by moving the focal position from the reflective layer to the writing layer at the target address for recording position information and irradiating the writing layer, which is focused, with a recording laser, and the characteristic configuration of this device is the same as the position information recording device that was described in the first embodiment, which is shown in FIG. 7.

The major difference between the position information recording device of this embodiment and the position information recording device of the first embodiment is that the servo 502 has a memory for recording the focal position of the writing layer.

With this position information recording device, the recording of position information to the writing layer takes place while being focused on the writing layer, and thus it is not necessary to shorten the distance between the reflective layer and the writing layer like in the position information recording device of the first embodiment, which performs defocused recording. On the other hand, with this position information recording device, it is necessary to perform a layer jump when recording to the writing layer.

The position information recording device of this embodiment moves the focal position from the reflective layer to the writing layer at the address position for recording position information, performs spherical aberration correction, and stores the focus control position on the writing layer within the memory.

If the focal position is to be moved from the reflective layer to the writing layer in order to record position information, then a layer jump is performed based on the focus control position that has been stored in the memory, and thus, as described above, the time that it takes to move the focal position can be significantly reduced.

In this case as well, like with the position information recording device of the first embodiment, position information is recorded to the writing layer holding a PLL output clock frequency of the digital signal processor 506. Thus, if the PLL output clock is held for a long time, then the PLL output clock and the reproduction signal of the recording marks of the reflective layer become out of synchronization. In particular, holding the PLL for longer than one revolution of the disc requires that the tracking position be changed during the period that the PLL is being held, and it becomes impossible to record position information to the writing layer in synchronization with the recording marks of the reflective layer. Accordingly, if the layer jump time can be shortened, then the time that a PLL frequency is held is shortened also, and thus it is possible to retain the synchronous relationship between the position information that is recorded to the writing layer and the recording marks of the reflective layer, which is formed behind or in front of the writing layer.

It should be noted that it is necessary to consider the operation time of the actuator even when a jump is made from the reflective layer to the writing layer at a focus control position that has been saved in advance, and thus ideally the focal position is moved one or two sectors prior the position of the target address for recording the position information.

In this way, it is possible to maintain the synchronous relationship between the recording marks of the reflective layer and the recording marks that are recorded to the writing layer, and it is possible to prevent a drop in the detection precision of the position information that is detected in synchronization with the recording marks of the reflective layer.

Fifth Embodiment

This embodiment describes an effective servo tracking control method for the pre-mark position recording device according to the first embodiment, particularly for a case where the head for reproducing the reflective layer and the head for recording to the writing layer are constituted by the same head.

Figure 30:
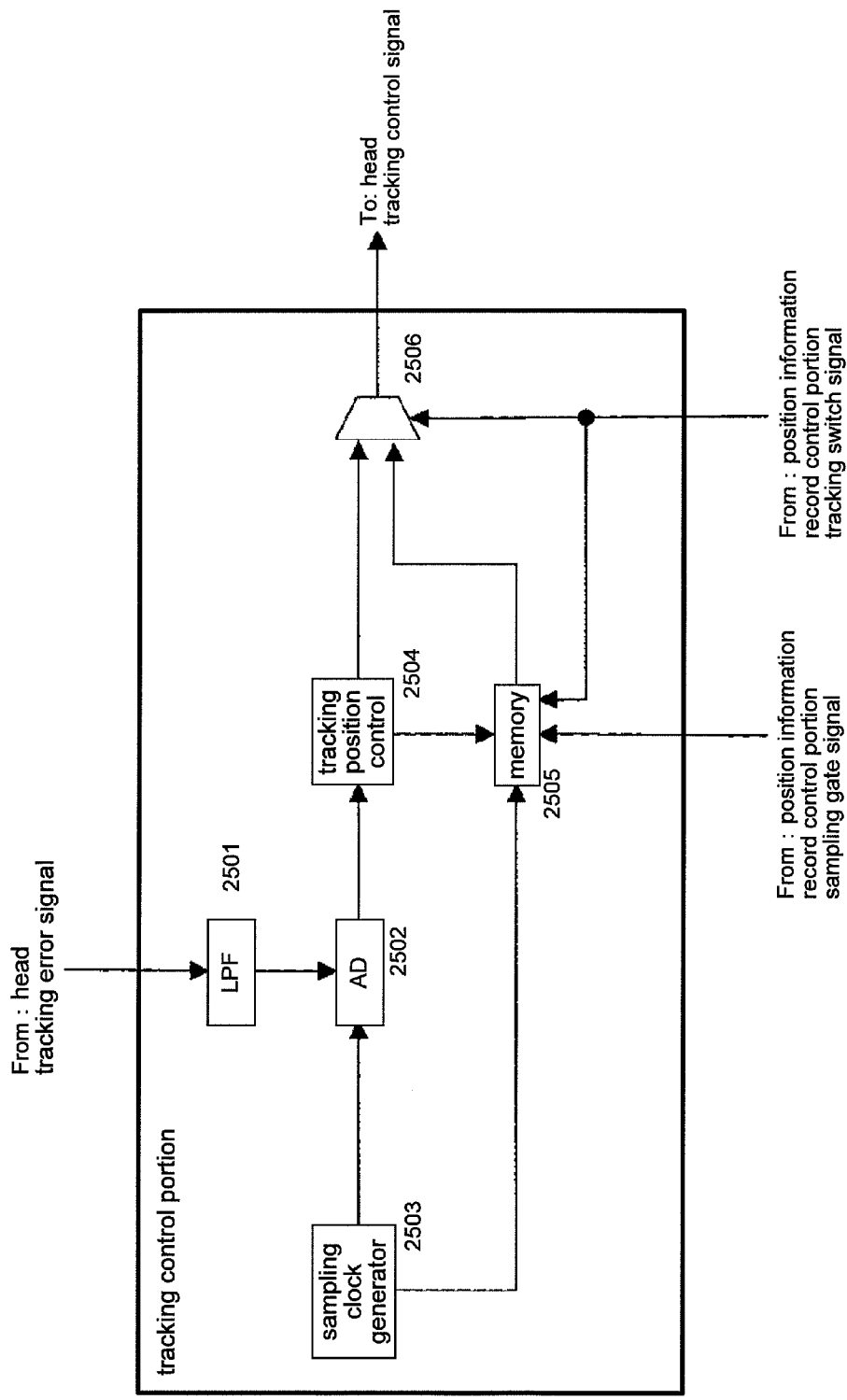
FIG. 30 is a block diagram that shows the configuration of the tracking control portion of a fifth embodiment.

FIG. 30 is a block diagram that shows the characteristic features of the tracking control portion in the servo of the pre-mark recording device.

The tracking control portion receives a tracking error signal from the head 501 (FIG. 7) and a sampling gate signal and a tracking switch signal from the position information record control portion 508 (FIG. 7), and outputs a tracking control signal to the head 501, and is made from an LPF 2501, an AD 2502, a sampling clock generator 2503, a tracking position information control portion 2504, a memory 2505, and a selector 2506.

First, the LPF 2501 is made of a general low-pass filter for restricting the pass band of the tracking error signal input from the head 501. The pass band at this time is restricted to several kilohertz. The tracking error signal that has been subjected to band restriction is output to the AD 2502.

The AD 2502 is made of a general analog-digital converter, and samples and quantizes the input tracking error signal that has been subjected to band restriction in synchronization with the clock that is generated by the sampling clock generator 2503, and outputs the result to the tracking position information control portion 2504 as a multi-value digital error signal.

The sampling clock generator 2503 generates a clock signal that is several kilohertz to several hundred kilohertz, and outputs it to the AD 2502. In this embodiment, the sampling clock generator 2503 is constituted by an ordinary clock generator; however, it is also possible for the sampling clock generator 2503 to receive the single revolution signal from the head and generate a clock signal that is synchronized to the single revolution signal.

The tracking position information control portion 2504 creates a tracking control signal for controlling movement, in the radial direction, of the spot position of the laser that is emitted from the head, based on the tracking error signal that has been quantized, and outputs this to the memory 2505 and the selector 2506.

The memory 2505 sequentially records the tracking control values of the tracking control signals that are input, in synchronization with the clock from the sampling clock generator 2503, during the period indicated by the sampling gate that is input from the position information record control portion 508. The memory 2505 retrieves the tracking control values that are stored in the memory in synchronization with the clock in the order that they are stored, during the period that the tracking switch control signal is output from the position information record control portion 508, and outputs these to the selector 2506.

The selector 2506, in the period that the tracking switch signal is output from the position information record control portion 508, outputs the tracking control values that are recorded in the memory 2505, and at other times outputs the tracking control values that are output by the tracking position control portion 2504, to the head 501 as tracking control signals.

Next, the operation of the tracking control is described.

Figure 31:
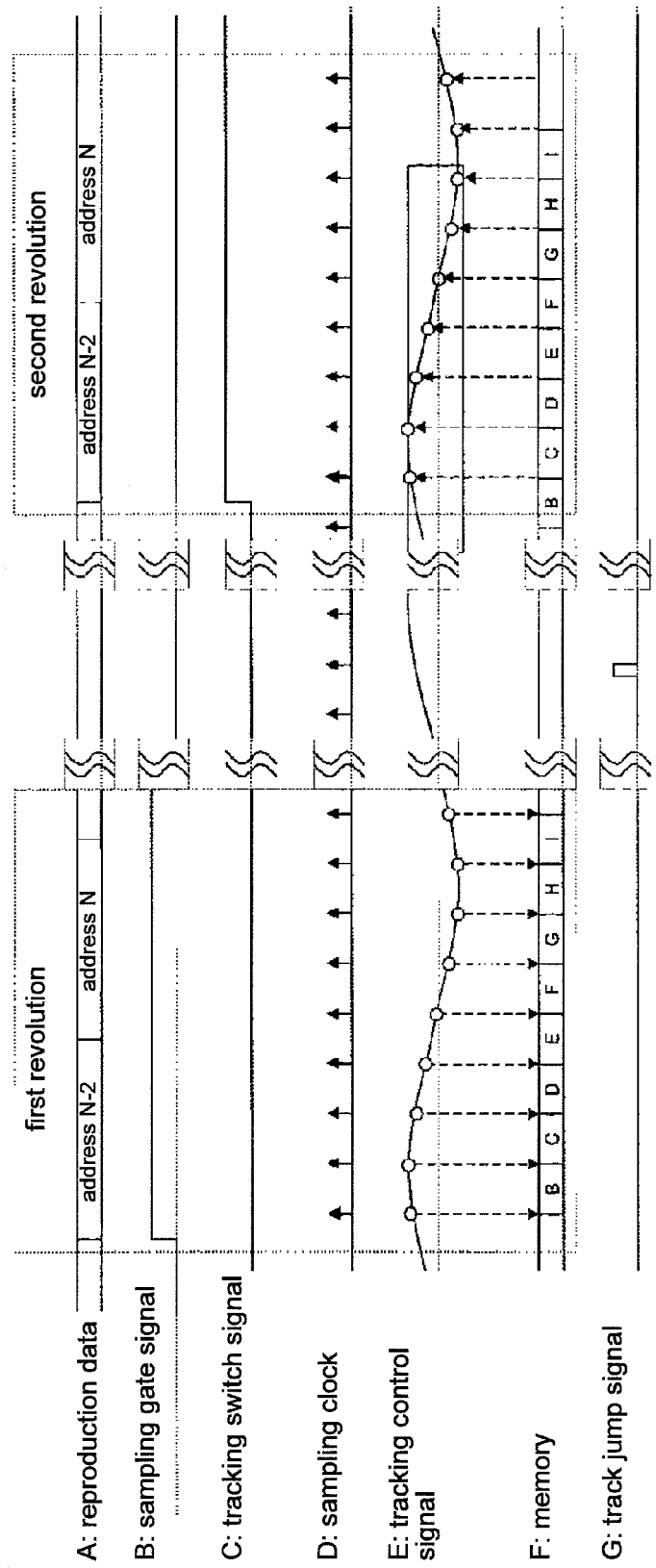
FIG. 31 is a timing chart that shows the operation of the tracking control portion of the fifth embodiment.

FIG. 31 is a timing chart that shows the characteristic operation of the tracking control portion.

First, the head 501 reproduces the recording marks of the reflective layer, extracting the reproduction data (FIG. 31A). The reproduction data have synchronization code provided to each frame, and are partitioned into minimum units (sectors) that have an address based on the detection timing of the synchronization code. In the case of a Blu-ray disc, the address in each sector increases in increments of +2. The radial position of the head is moved based on this address information that is reproduced and the target address (N) for recording the position information, which is set in advance in the system controller, which is not shown. When the reproduced position reaches the head position of the sector one before the target address (N), the position information record control portion 508 outputs a sampling gate signal (FIG. 31B) from the sector head position one before the target address (N).

In the period that the sampling gate signal (FIG. 31B) is H, the memory 2505 stores (FIG. 31F) the tracking control value of the tracking control signal (FIG. 31E) that is created by the tracking position control portion 2504, in synchronization with the sampling clock (FIG. 31D) that is generated by the sampling clock generator, based on the tracking error signal that has been quantized by the AD 2502.

It should be noted that the sampling gate signal (FIG. 31B) is output from the head position of the sector with the target address (N) for recording the position information, while recording at least some of the position information (for example, 1 physical cluster).

If based on the sampling gate signal it is determined that the period in which at least some of the position information is recorded is finished, then a track jump signal (FIG. 31G) is created internally, and the tracking position is changed inward by one track in accordance with that track jump signal.

When the head position of the sector one prior to the sector with the target address (N) is reached again, the position information record control portion 2504 creates a tracking switch signal (FIG. 31C).

In the period that the tracking switch signal (FIG. 31C) is output, the tracking control values that have been recorded in the memory 2505 are fetched sequentially in synchronization with the sampling clock (FIG. 31D), and the selector 2506 outputs the tracking control values that have been acquired from the memory 2505 to the head 501 as the tracking control signal (FIG. 31E).

Lastly, after tracking control has been switched based on the tracking control values stored in the memory 2505, a layer jump is made to the writing layer at the head position of the sector with the target address (N), and a recording mark is recorded to the writing layer in accordance with the position information recording signal from the position information record control portion 508.

As illustrated above, it is possible to form the recording marks that are recorded to the reflective layer based on tracking control values that are extracted based on the recording marks of the reflective layer, and thus recording marks can be formed in the writing layer immediately below or immediately above the recording marks of the reflective layer. If it is possible to form recording marks in the writing layer immediately below or immediately above the recording marks of the reflective layer, then the impact of the writing layer recording marks when reproducing the reflective layer (a change in the degree of modulation of the reproduction signal when reproducing the recording marks of the reflective layer) can be utilized to reproduce the information that has been formed in the writing layer.

No recording marks or guide grooves are formed in the region in which the recording marks are formed in the writing layer of this embodiment, and thus recording with the tracking controlled on the writing layer is not possible. Further, it is not possible to form recording marks immediately below or immediately above the reflective layer recording marks due to deviation from the center of the disc, even when recording marks are formed in the writing layer without performing tracking control.

Other Embodiments

The foregoing first through fifth embodiments describe the best modes for implementing the invention, with regard to the optical disc, methods for manufacturing those optical disc, the recording devices, and the reproducing devices of the invention, however, the invention should not be limited to these implementations. The follow describes other conceivable embodiments of the invention. In particular, implementations of the recording marks of the writing layer of the optical disc of the invention, and the physical structure of the optical disc of the invention, that could not be described in the first through fifth embodiments are described.

1.

As shown in FIG. 16, for example, the first embodiment describes a mode in which three bits of position information are recorded per frame as recording marks on the writing layer, however the invention is not limited to this.

In Blu-ray discs, one frame is for example 1932 channel bits, and the standard channel bit frequency is 66 MHz, and thus the recording of three bits of position information per frame results in a position information recording frequency of approximately 102 KHz. On the other hand, the reproducing device ordinarily is provided with central position control for the reproduction signal. The central position control for the reproduction signal is controlled in which, when the uneven recording marks of the reflective layer of the optical disc are reproduced, the central position of the reproduction signal of the reflective layer (for example, FIG. 16C) is 0. In this case, the recording marks of the writing layer must be formed at a recording frequency that is higher than the tracking frequency of center position control for the reproduction signal. This is because when the recording marks of the writing layer are recorded within the tracking band of the reproduction signal under the central position control of the reproduction signal, the recording marks of the writing layer are reproduced as fluctuations in the central position of the reproduction signal, and thus this information cannot be faithfully reproduced.

Thus, with Blu-ray discs it is desirable for the recording marks of the writing layer to be recorded at a frequency in the range of 3 MHz to 30 KHz. Recording the position information at such a recording frequency allows the position information to be reproduced stably because the position information are outside the tracking band of the central position control for the reproduction signal discussed before. This corresponds to a frequency that is 1/22 to 1/2200 of the 66 MHz of the recording frequency for the uneven recording marks of the reflective layer.

2.

With modulation of the uneven recording marks of the reflective layer of a Blu-ray disc standard, the longest mark length or space length is 9 T. Thus, in order to set the frequency described above, it is desirable for the recording marks of the writing layer to be 3 or more times the length of the marks/spaces of the uneven recording marks of the reflective layer. By doing this, it is possible to accurately separate the signal band of the uneven recording marks and the recording band of the position information by filtering the reproduction signal, and the two do not interfere with one another when reproduced.

3.

The recording marks of the writing layer in the present invention are preferably recorded to a radial position that corresponds to a control data region that is always reproduced when starting the disc for lead-in or lead-out of the uneven recording marks of the reflective layer.

Thus, when starting the optical disc, it is possible to reproduce the control data from the uneven recording marks of the reflective layer, as well as reproduce the recording marks of the writing layer from the change in the reflectance of that reproduction signal. Even if the recording marks of the reflective layer are added, it is not necessary to provide special time for reproducing these, and the start time, for example, is not increased either.

4.

Ordinarily, it is not possible to start the optical disc if the control data cannot be reproduced. Thus, in order to withstand bust errors as well, there are optical discs (for example, Blu-ray discs) in which the same control data are recorded a plurality of times, at shifted radial positions. Like with control data in the form of uneven marks in the reflective layer, when it is not possible to reproduce the decoding key or authenticity information for verifying whether or not the optical disc is an illegal copy, which are recorded as recording marks in the writing layer, then it is not possible to start up or reproduce the disc contents. Thus, if the control data are recorded a plurality of times and dispersed, it is desirable for the information that is recoded through the recording marks of the writing layer also be to recorded a plurality of times in a dispersed manner, in conjunction with the positions where the control data are recorded. By doing this, it is possible to correctly reproduce the optical disc even if the disc is dirtied by fingerprints or is scratched, for example.

5.

The first embodiment describes an implementation in which the physical position information of the pre-marks, which are long in the radial direction, was recorded as a recording mark in the writing layer, and whether or not the optical disc is an illegal copy is confirmed by comparing the position information when the disc is created and the position information during reproduction, but the information that can be recorded with the recording marks of the writing layer is not limited to this.

The recording marks of the writing layer of the invention also are effective for recording a decoding key for decoding the encoded content information that is recorded to the reflective layer as uneven recording marks.

As for the recording marks of the reflective layer, it is not possible to record unique information for each disc as uneven recording marks because a plurality of discs are produced with a single stamper, but it is possible to record unique information for each disc if the recording marks of the writing layer of the invention are used. For example, in a case where the content recorded to an optical disc is to be linked with a service from a server via a network, it is possible to identify each medium. In other words, for example, even in the case of a read-only optical disc, if these recording marks of the writing layer are used it is possible to register identification information to the server that indicates that the disc has been copied after the contents recorded to that disc have been copied a single time to a separate medium. If this medium-specific identification information is managed with a server, then it is possible to provide an optical disc that not only protects the copyright but also is convenient for the user in that it is possible produce a backup copy only a single time.

6.

Using the characteristic that the information recorded via the recording marks of the writing layer of the invention is difficult to copy unless the manner in which the information was recorded is known, it is effective to record information as authentication information for determining whether an optical disc has been illegally copied or whether it is a normal optical disc. Illegally copied optical discs do not have recording marks formed in their writing layer, and thus are recognized as illegal discs because they lack authentication information, and the reproduction operation can be stopped or the medium ejected, for example.

7.

FIG. 12 illustrates an implementation in which the radial direction width of the recording marks of the writing layer is wider than the width of the uneven recording marks of the reflective layer (in practice, they are equal to five tracks of uneven recording marks). In this regard, it was shown to have benefit in that a laser with a long wavelength, which is low cost, can be used for the light source for recording the reflective layer recording marks, and also in that it increases the precision of detecting the recording marks of the writing layer.

However, despite these merits, the writing layer recording marks cause a large change in the reflectance of the reproduction signal of the uneven recording marks of the reflective layer, and the presence of the writing layer recording marks may be ascertained from the signal that is reproduced from the uneven recording marks, and this provides a window of opportunity for someone to decode the disc with ill intent. Other demerits include the fact that a large space is necessary for recording that same amount of information.

Consequently, it is also possible to make the width of the recording marks of the writing layer more narrow than the width of the uneven recording marks of the reflective layer in the radial direction, or to shorten the track pitch of the recording marks of the writing layer compared to the track pitch of the uneven recording marks of the reflective layer. By doing this, it is possible to increase the secrecy of the recording marks of the writing layer, as well as shorten the time that is required for detection by reducing the recording region for the recording marks of the writing layer.

Thus, it is desirable for the width and the length of the recording marks of the writing layer to be determined in light of the reliability and the secrecy that is needed for the information to be recorded through the recording marks of the writing layer. In other words, the security information is recorded in accordance with the recording format of the uneven marks of the reflective layer, by irradiating with a laser to form recording marks whose reflectance changes in the writing layer, which includes the position immediately above and immediately below the uneven recording mark track.

8.

In the first through fifth embodiments, pre-recording marks that are long in the radial direction are formed in the writing layer of the disc, and a recording device or a reproducing device extracts the information on the position of the pre-marks based on the clock number of the reproduction clock, which has a fixed frequency, in reference to the recording marks of the reflective layer. The count of the clock number at this time is the same as estimating the time until the pre-mark is detected, and thus has the same meaning as extracting the distance (length) based on the product of the rotational velocity with which the disc is rotated and the time indicated by the clock number up to the detection of the pre-mark.

Further, in the above embodiments, tracking control of the reproducing head or the recording and reproducing head was stopped in order to detect the pre-mark position. In other words, since the radial position where the head is located does not change, the time of a single rotation is substantially the same, that is, the clock count is substantially the same for each rotation. Thus, the quotient of the clock count number for a single rotation and the clock number until detection of the pre-mark is, in order words, the angle information from a reference position on the reflective layer to the position where the pre-mark is detected on the writing layer. Counting the clock number from the recording mark of the reflective layer to the pre-mark of the writing layer in this way is the same as extracting the length information and the angle information between the two points.

9.

In the foregoing embodiments, the position information from the recording mark of the reflective layer to the pre-mark of the writing layer was extracted, but the same effects can also be achieved by extracting in reference to the wobble of the reflective layer. Ordinarily, the wobble that is formed on the optical disc has address information, and can ensure synchronization for recording the recording marks in sector units. In other words, with only the wobble it is possible to determine the address and the head position of the sector with that address, and thus the same effects can be achieved. Of course, it is not necessary for there to be recording marks in this region if the wobble is used as the reference. 10.

The foregoing embodiments describe a writing film that can be recorded only once as the writing layer, but the same effects can also be achieved if the writing layer is a phase-change film that can be rewritten a plurality of times, or a recording film that can be written to magnetically.

Other Embodiments

The optical disc reproducing devices and recording devices that were described in the above embodiments can be achieved in part or entirely by a single chip through a semiconductor device such as an LSI. Further, some or all of the section that is indicated by the broken line in FIGS. 5, 7, 13, 14, 17, 21, and 23 can be provided as a single chip.

It should be noted that here an LSI is adopted, but depending on differences in the degree of integration, it may be referred to as an IC, system LSI, super LSI, or an ultra LSI.

The method of circuit integration is not limited to an LSI, and it is also possible to adopt a dedicated circuit or a generalized processor. After LSI fabrication, it is possible to employ a programmable FPGA (Field Programmable Gate Array) or a reconfigurable processor in which the connections and settings of the circuit cells within the LSI can be reconfigured.

Further, if other technologies that improve upon or are derived from semiconductor technologies introduce integration technology that supplants LSI, then naturally it is also possible to integrate the functional blocks using that technology. Biotechnology applications are one conceivable example.

It should be noted that the specific configuration of the invention is not limited to the embodiments discussed above, and various modifications and alterations are possible within a scope that does not deviate from the gist of the invention.

Attachments

The present invention can also be expressed as follows.

1. Content of the Attachments (Attachment 1)

An optical disc, comprising:

a first recording layer that has a spiral track made of uneven recording marks or uneven guide grooves; and a second recording layer that can be recorded to by laser irradiation, and that is behind or in front of a read-side surface of the first recording layer;

wherein the second recording layer has a marking region in which pre-recording marks that are long in the radial direction are formed, and a wobble region in which uneven spiral guide grooves are formed; and wherein information on the physical position of the pre-recording marks of the second recording layer is recorded to the wobble region in reference to a predetermined position of the uneven recording marks or the uneven guide grooves of the first recording layer.

(Attachment 2)

A device for reproducing an optical disc that is made from a first recording layer that has a spiral track made of uneven recording marks or uneven guide grooves, and a second recording layer that is behind or in front of a read-side surface of the first recording layer, and that has a marking region to which pre-recording marks that are long in the radial direction are recorded, and a wobble region to which information on the physical position of the pre-recording marks when recording is recorded on uneven spiral guide grooves, the optical disc reproducing device comprising:

physical position information reproducing means for reproducing the physical position information when recording, from the wobble region of the second recording layer;

physical position information extraction means for extracting the physical position information when reproducing the pre-recording marks that are recorded to the pre-recording region of the second recording layer, in reference to a predetermined position of the uneven recording marks or the uneven guide grooves of the first recording layer;

comparing and verifying means for comparing and verifying the physical position information when recording and the physical position information when reproducing; and reproduction stopping means for stopping the reproduction operation based on the result of the comparing and verifying means.

(Attachment 3)

A device for recording an optical disc that is made from a first recording layer that has a spiral track made of uneven recording marks or uneven guide grooves, and a second recording layer that is behind or in front of a read-side surface of the first recording layer, and to which recording marks can be formed by laser irradiation and that has a marking region and a wobble region in which uneven spiral guide grooves are formed, the optical disc recording device comprising:

marking means for forming pre-recording marks in the marking region of the second recording layer;

position information extraction means for extracting the physical position information of the pre-recording marks that are formed in the marking region of the second recording layer with the marking means, in reference to a predetermined position of the uneven recording marks or the uneven guide grooves of the first recording layer; and position information recording means for recording the physical position information that is extracted by the position information extraction means to the wobble region of the second recording layer.

(Attachment 4)

An optical disc manufacturing method, comprising:

a first mastering step of cutting uneven recording marks or uneven guide grooves to produce a first stamper of an optical disc that has spiral tracks;

a second mastering step of producing a second stamper of an optical disc that has a marking region and a wobble region into which uneven guide grooves are cut;

a first recording layer creation step of forming a first recording layer by applying a reflective film to an optical disc substrate after stamping with the first stamper;

a second recording layer creation step of forming a second recording layer by applying a recording film to which recording marks can be formed by laser irradiation, to the optical disc substrate after stamping with the second stamper;

a marking step of forming pre-recording marks into the marking region of the second recording layer;

a position information extraction step of extracting the physical position information of the pre-recording marks that are formed in the marking region of the second recording layer in the marking step, in reference to a predetermined position of the uneven recording marks or the uneven guide grooves of the first recording layer; and a position information recording step of recording the physical position information that is extracted in the position information extraction step to the wobble region of the second recording layer.

2. Explanation of the Attachments

According to the inventive aspects of Attachment 1, Attachment 3, and Attachment 4, marks are formed in the marking region of the second recording layer of the optical disc, and with the recording marks or the guide grooves of the first recording layer as a reference, the physical position information when reproducing the marks is extracted and recorded to the wobble region of the second recording layer.

According to the inventive aspect of Attachment 2, the physical position information of the marks of the second recording layer when recording is reproduced from the wobble region of the second recording layer, and it is confirmed whether the physical position information of the same mark changes between when recording and when reproducing in order to determine whether the disc is a normal disc.

INDUSTRIAL APPLICABILITY

As described above, if this invention is adopted, not only it is possible to record unique identification information to each disc, even if the disc is a read-only disc, but also it is not possible for the identification information of that disc to be illegally copied to another disc, and thus it is possible to provide an optical disc with which the copyright of the content data recorded to the optical disc will not be illegally infringed, and the disc can be adopted for an Internet-compatible copyright management system that requires that each disc be managed.

The invention claimed is:

1. An optical disc to and from which information can be reproduced and recorded by laser irradiation, comprising:
   a first recording layer in which a first recording mark is formed in a spiral track; and
   a second recording layer that is behind or in front of a read-side surface of the first recording layer and on which neither a wobble track nor a track for reproducing or recording information by laser irradiation is formed;
   wherein the second recording layer can be formed with, by laser irradiation, a second recording mark that is positioned in the radial direction of the optical disc according to a predetermined position on the spiral track of the first recording layer, and
   the second recording layer has a marking region in which a pre-recording mark that is long in the radial direction is formed, on an inner circumferential side or an outer circumferential side from the region in which the second recording mark is formed;
   the second recording mark includes physical position information for the pre-recording mark; and
   the physical position information is information on a distance or an angle of the pre-recording mark of the second recording layer, with respect to a fixed position of the first recording mark of the first recording layer.

2. An optical disc to and from which information can be reproduced and recorded by laser irradiation, comprising:
   a first recording layer in which a first recording mark is formed in a spiral track; and
   a second recording layer that is behind or in front of a read-side surface of the first recording layer and on which neither a wobble track nor a track for reproducing or recording information by laser irradiation is formed;
   wherein the second recording layer
   can be recorded to by laser irradiation, and
   has a second recording mark that is positioned in the radial direction of the optical disc according to a predetermined position on the spiral track of the first recording layer, and a marking region in which a pre-recording mark that is long in the radial direction is formed, on an inner circumferential side or an outer circumferential side from the region in which the second recording mark is formed,
   the second recording mark includes physical position information for the pre-recording mark; and
   the physical position information is information on a distance or an angle of the pre-recording mark of the second recording layer, with respect to a fixed position of the first recording mark of the first recording layer.

3. The optical disc according to claim 1,
wherein the length of the pre-recording mark in the radial direction is larger than the width of the track of the first recording layer.

4. The optical disc according to claim 2,
wherein the length of the pre-recording mark in the radial direction is larger than the width of the track of the first recording layer.

5. The optical disc according to claim 1,
wherein the first recording mark of the first recording layer includes address information for each predetermined interval; and
the physical position information is recorded in association with the position of the address information of the first recording mark of the first recording layer.

6. The optical disc according to claim 2,
wherein the first recording mark of the first recording layer includes address information for each predetermined interval; and
the physical position information is recorded in association with the position of the address information of the first recording mark of the first recording layer.

7. The optical disc according to claim 1,
wherein the physical position information is recorded encoded or a digital signature is added thereto.

8. The optical disc according to claim 2,
wherein the physical position information is recorded encoded or a digital signature is added thereto.

9. A reproducing device for an optical disc that has a first recording layer on which a spiral track is formed with a first recording mark, and a second recording layer that is behind or in front of a read-side surface of the first recording layer and on which a second recording mark that includes identification information of the optical disc is formed,
the second recording layer having a marking region where a pre-recording mark that is long in the radial direction is recorded;
the identification information including first physical position information that indicates a physical position of the pre-recording mark as recorded, with respect to a fixed position of the first recording mark of the first recording layer,
the reproducing device comprising:
a focus portion that controls a focal position of the laser that irradiates the first recording layer;
a tracking portion that controls the laser irradiation spot based on the track of the first recording layer;
a reproduction signal extraction portion that irradiates the optical disc with a laser based on the focus portion and the tracking portion, and extracts a reproduction signal from the light that is reflected from the laser irradiation;
a first reproduction portion that reproduces the first recording mark of the first recording layer, based on a first frequency component of the reproduction signal; and
a second reproduction portion that reproduces the second recording mark of the second recording layer from a second frequency amplitude component, which is different from the first frequency component, of the reproduction signal, and extracts the identification information
a physical position information extraction portion that extracts second physical position information that indicates a physical position of the pre-recording mark as reproduced, with respect to the fixed position of the first recording mark of the first recording layer;
a comparing and verifying portion that compares and verifies the first physical position information and the second physical position information; and
a reproduction stopping portion that stops the reproduction operation based on the results of the comparing and verifying portion.

10. The optical disc reproducing device according to claim 9, further comprising:
a focal position movement portion that moves the focal position from the first recording layer to the second recording layer; and
a focus storage portion that stores focus control information of the second recording layer, after the focal position has been moved;
wherein the physical position information extraction portion extracts the second physical position information based on the focus control information that is stored in the focus storage portion after the focal position has been moved.

11. The optical disc reproducing device according to claim 9, further comprising:
an address extraction portion that extracts address information that has been added at a predetermined interval of the first recording mark of the first recording layer;
wherein the address extraction portion extracts a target address for extracting the second physical position information;
the physical position information extraction portion extracts information pertaining to a distance or an angle from a sector position of the first recording layer at the target address up to the pre-recording mark of the second recording layer, as the second physical position information;
the comparing and verifying portion compares and verifies the first physical position information, which is information on the distance or the angle when recording the pre-recording mark, and the second physical position information that has been extracted by the physical position information extraction portion, which is information on the distance or the angle when reproducing the pre-recording mark; and
the reproduction stopping portion stops the reproduction operation if the comparing and verifying portion determines that they do not match one another.

12. A recording device for an optical disc that has a first recording layer on which a spiral track is formed by a first recording mark, and a second recording layer that is behind or in front of a read-side surface of the first recording layer and on which a recording mark can be formed by laser irradiation,
the recording device comprising:
a marking portion that records a pre-recording mark in the second recording layer; and
a position information extraction portion that extracts physical position information, with respect to a fixed position of the first recording mark of the first recording layer, of the pre-recording mark;
a focus portion that controls a focal position of laser that irradiates the first recording layer;
a tracking portion that controls a radial position of laser irradiation according to the track of the first recording layer; and
an identification information recording portion that records identification information for the optical disc by forming a second recording mark including the physical position information on the second recording layer, based on the control by the tracking portion.

13. The optical disc recording device according to claim 12,
- wherein the marking portion records a pre-recording mark to the second recording layer of the optical disc through CAV (Constant Angular Velocity)-type rotation control; and
- the pre-recording mark is recorded such that in the radial direction of the optical disc, the pre-recording mark is equal to or greater than a width of the track of the first recording mark of the first recording layer.

14. The optical disc recording device according to claim 12, further comprising:
- an address extraction portion that extracts address information from the first recording mark of the first recording layer;
- wherein the position information extraction portion extracts information pertaining to a distance or an angle of the pre-recording mark of the second recording layer, with respect to the fixed position of the first recording layer, based on the address information that is extracted.

15. The optical disc recording device according to claim 12, further comprising:
- an address extraction portion that extracts address information from the first recording mark of the first recording layer;
- wherein the physical position information is information that correlates the address information and the fixed position of the first recording layer.

16. An optical disc manufacturing method, comprising:
- a mastering step of creating a stamper in which a first recording mark is formed, producing a spiral track structure;
- a first recording layer creation step of forming a first recording layer by adding a reflective film to a substrate of an optical disc after stamping with the stamper;
- a second recording layer creation step of forming a second recording layer that applies a recording film, on which a recording mark can be formed by laser irradiation, to the substrate of the optical disc before or after stamping by the stamper;
- a marking step of recording a pre-recording mark to the second recording layer;
- a position information extraction step of extracting physical position information of the pre-recording mark, with reference to a fixed position of the first recording mark of the first recording layer;
- a tracking step of performing tracking control that is in accordance with the first recording mark of the first recording layer; and
- an identification information recording step of recording identification information of the optical disc by forming a second recording mark including the physical position information in the second recording layer, based on the tracking control of the tracking step.

17. The optical disc manufacturing method according to claim 16,
- wherein the marking step records the pre-recording mark to the second recording layer by performing rotation control of the optical disc through CAV (Constant Angular Velocity) control; and
- the pre-recording mark is recorded at a width that, in the radial direction of the optical disc, is equal to or greater than a track width of the first recording mark of the first recording layer.

18. The optical disc manufacturing method according to claim 16, further comprising:
- a focus movement step of moving focus control from the first recording layer to the second recording layer; and
- a focus storage step of storing the result of focus control on the second recording layer, after the focus control has been moved from the first recording layer to the second recording layer;
- wherein the position information extraction step involves extraction of the physical position information of the pre-recording mark of the second recording layer, with respect to the fixed position of the first recording mark of the first recording layer, by moving the focus control from the first recording layer to the second recording layer based on the focus control result that is stored in the focus storage step.

19. The optical disc manufacturing method according to claim 16, further comprising:
- an address extraction step of extracting address information from the first recording mark of the first recording layer;
- wherein the position information extraction step involves extraction of information pertaining to a distance or an angle of the pre-recording mark of the second recording layer with respect to the fixed position of the first recording layer, based on the address information that is extracted in the address extraction step.

20. The optical disc manufacturing method according to claim 16, further comprising:
- an address extraction step of extracting address information from the first recording mark of the first recording layer;
- wherein the physical position information is information that is correlated to the address information of the first recording layer that is extracted by the address extraction step.

* * * * *